United States Patent
Tajima et al.

(10) Patent No.: US 7,885,762 B2
(45) Date of Patent: *Feb. 8, 2011

(54) DESTINATION DISPLAY APPARATUS AND DESTINATION DISPLAY METHOD

(75) Inventors: Takashi Tajima, Tokyo (JP); Takahiro Kudoh, Kanagawa (JP); Jun Ozawa, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/713,808

(22) Filed: Feb. 26, 2010

(65) Prior Publication Data
US 2010/0161213 A1    Jun. 24, 2010

Related U.S. Application Data

(62) Division of application No. 12/521,935, filed as application No. PCT/JP2008/002994 on Oct. 22, 2008.

(30) Foreign Application Priority Data
Oct. 23, 2007    (JP)    ............................ 2007-275825

(51) Int. Cl.
*G01C 21/36*    (2006.01)
(52) U.S. Cl. ..................................... 701/201
(58) Field of Classification Search ......... 701/200–202, 701/208, 211, 213–215; 340/988, 995.1
See application file for complete search history.

(56) References Cited
U.S. PATENT DOCUMENTS 5,908,465 A * 6/1999 Ito et al. ..................... 701/211
6,144,318 A 11/2000 Hayashi et al.

(Continued)

FOREIGN PATENT DOCUMENTS
JP    10-177338    6/1998

(Continued)

OTHER PUBLICATIONS

International Search Report issued Jan. 20, 2009 in corresponding International Application No. PCT/JP2008/002994.

(Continued)

*Primary Examiner*—Yonel Beaulieu
(74) *Attorney, Agent, or Firm*—Wenderoth, Lind & Ponack, L.L.P.

(57) ABSTRACT

A destination display apparatus includes: a position obtaining unit (114) which obtains a current position of a mobile terminal; a situation obtaining unit (100) which obtains a current situation of the mobile terminal; a history accumulating unit (101) which obtains the current situation and a destination history; a destination predicting unit (102) which predicts destinations; a destination obtaining unit (103) which obtains the predicted destinations; a label accumulating unit (104) which accumulates a name label as a hierarchical structure including parent-child relationships between name labels; a number-to-be-displayed obtaining unit (105) which obtains the number of the name labels to be displayed on the mobile terminal; a label selecting unit (106) which selects a label to be displayed; an information obtaining unit (111) which obtains information from an external network medium (200); and a display unit (113) which displays the selected label and calculated information.

1 Claim, 79 Drawing Sheets

U.S. PATENT DOCUMENTS

| | | |
|---|---|---|
| 7,218,246 B2 | 5/2007 | Chiba |
| 2004/0164877 A1 | 8/2004 | Chiba |

FOREIGN PATENT DOCUMENTS

| | | |
|---|---|---|
| JP | 11-149596 | 6/1999 |
| JP | 2001-147126 | 5/2001 |
| JP | 2003-57049 | 2/2003 |
| JP | 2004-29901 | 1/2004 |
| JP | 2004-184563 | 7/2004 |
| JP | 2005-181020 | 7/2005 |
| JP | 2006-53132 | 2/2006 |
| JP | 2006-221123 | 8/2006 |

OTHER PUBLICATIONS

Office Action dated Jun. 4, 2010 in U.S. Appl. No. 12/521,935.

* cited by examiner

FIG. 2

| Departure place | Destination |
|---|---|
| Home | Office |
| Office | Home |
| Home | Office |
| Office | H convenience store |
| H convenience store | Home |
| Home | B restaurant |
| B restaurant | Home |
| Home | Office |
| ... | ... |

FIG. 40A

| Node ID | Node position (longitude) | Node position (latitude) | Connection node ID |
|---|---|---|---|
| 001 | 134.3.0.9 | 34.6.3.6 | 002、003、004、005 |
| 002 | 134.3.0.9 | 34.5.30.0 | 001、005、006 |
| 003 | 134.3.0.9 | 34.6.36.0 | 001、007、008 |
| 004 | 134.4.10.9 | 34.6.3.6 | 001、006、009、010 |
| 005 | 134.2.20.9 | 34.6.3.6 | 001、011、012 |
| 006 | 134.4.10.9 | 34.5.30.0 | 002、004、013、014 |
| ... | ... | ... | ... |

FIG. 40B

| Link ID | Start node ID | End node ID | Link distance |
|---|---|---|---|
| 001 | 001 | 002 | 1km |
| 002 | 001 | 003 | 1km |
| 003 | 001 | 004 | 4km |
| 004 | 001 | 005 | 1km |
| 005 | 002 | 006 | 4km |
| ... | ... | ... | ... |

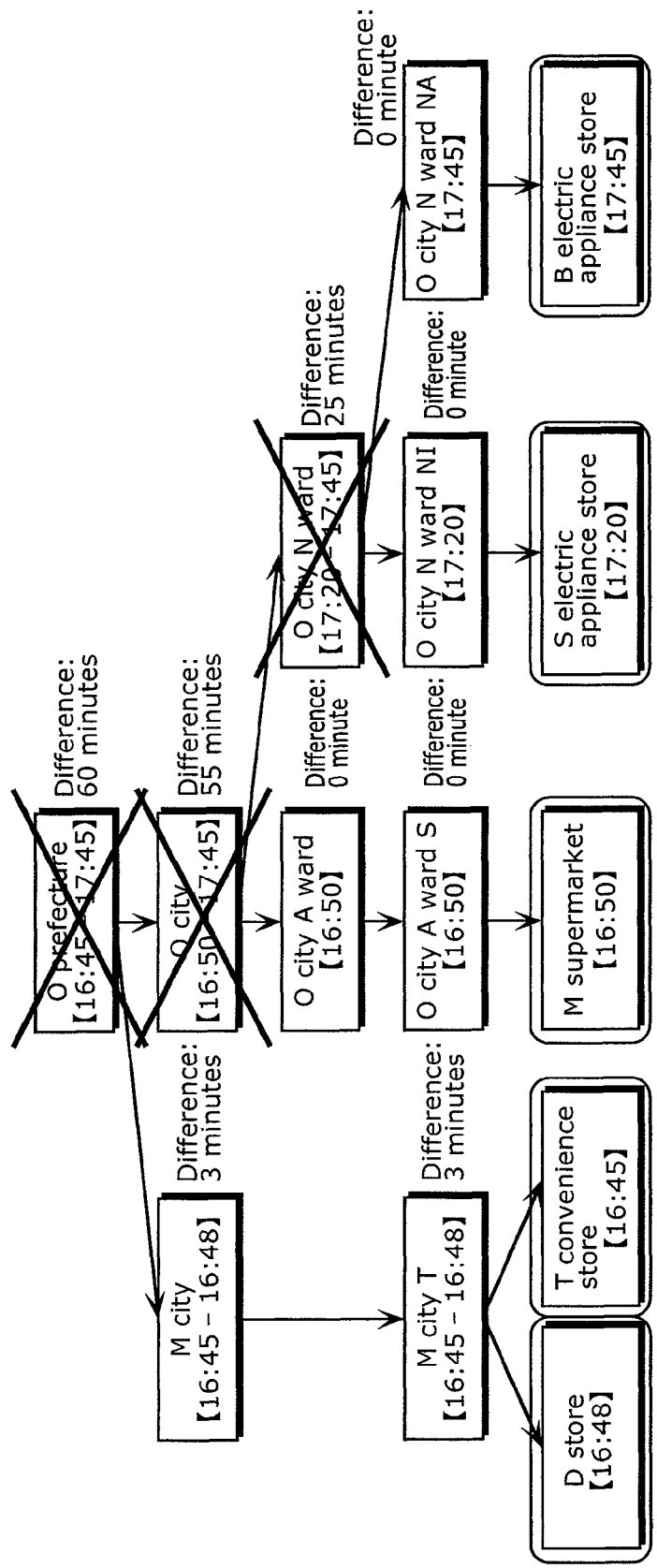

FIG. 52

| Required time (minute) | Threshold value (minute) |
|---|---|
| 0 – 10 | 1 |
| 10 – 30 | 5 |
| 30 – 60 | 10 |
| 60 – | 15 |

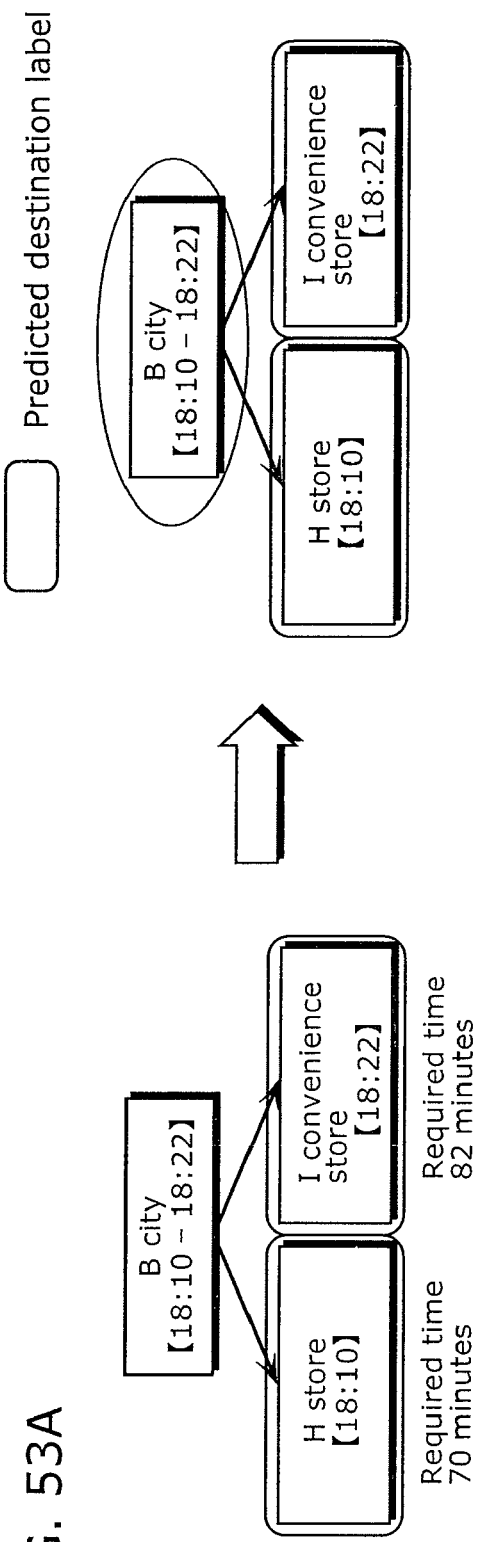
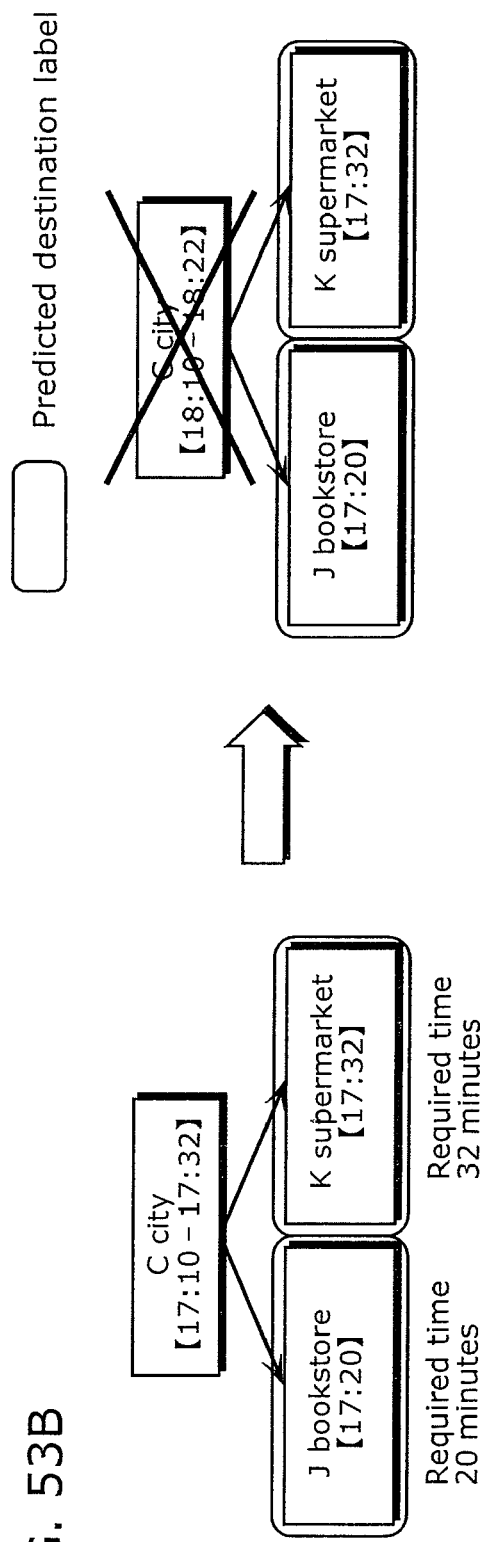
FIG. 53A
FIG. 53B

| Distance (km) | Threshold value (minute) |
|---|---|
| 0 – 10 | 1 |
| 10 – 30 | 5 |
| 15 – 30 | 10 |
| 30 – | 15 |

…

DESTINATION DISPLAY APPARATUS AND DESTINATION DISPLAY METHOD

This application is a divisional of application Ser. No. 12/521,935 filed Jul. 1, 2009, which is the National Stage of International Application No. PCT/JP2008/002994, filed Oct. 22, 2008.

TECHNICAL FIELD

The present invention relates to a destination display apparatus and a destination display method for displaying, on a mobile terminal such as an in-vehicle apparatus, a name indicating a destination together with at least one of a route to the destination, traffic information regarding the route, and commercial information.

BACKGROUND ART

As a method for predicting destinations and displaying the predicted destinations, there has conventionally been a method for displaying, for each predicated destination, a name label indicating the destination and information such as an arrival time at the destination (for instance, refer to Patent Reference 1). FIG. 73 is a diagram showing a display example of destinations described in Patent Reference 1. In this conventional display method, for example, as shown in FIG. 73, two sets of a predicted destination place name label and information such as an arrival time at the predicted destination are displayed in list in an information window.

Moreover, there has been proposed a method for displaying in list sets of a destination facility name label and information (for instance, refer to Patent Reference 2). FIG. 74 is a diagram showing a display example of destinations described in Patent Reference 2. In this conventional display method, for example, as shown in FIG. 74, three sets of a destination facility name label and information regarding an estimated arrival time are displayed in list in an information window. FIG. 74 shows that an estimated arrival time at a destination "Home" is "17:21", an estimated arrival time at a destination "AAA supermarket" is "17:34", and an estimated arrival time at a destination "BBB restaurant" is "17:45".

In general, the number of destination name labels that can be displayed on a screen is limited. In the case of the example shown in FIG. 73, the number is two; and in the case of the example shown in FIG. 74, the number is three. This is because displaying many destination name labels makes it difficult for a user to view the screen. Particularly, in the case of the in-vehicle apparatus, as a time for viewing the screen is limited while driving, it is not possible to display much information.

Patent Reference 1: Japanese Unexamined Patent Application Publication No. 2003-57049

Patent Reference 2: Japanese Unexamined Patent Application Publication No. 2001-147126

DISCLOSURE OF INVENTION

Problems that Invention is to Solve

However, with the above conventional structures, as the number of the destination name labels that can be displayed on the screen is limited, there is a case where information cannot be displayed, even for a destination predicted as one for which a user is highly likely to head, on the screen. For example, as in FIG. 75(a), it is assumed that five destinations, "Home", "AAA supermarket", "BBB restaurant", "CCC home center store", and "DDD bookstore", have been predicted as destinations which the user is highly likely to head for. When the number of destinations that can be displayed on a terminal is three, only three destinations can be displayed among the five predicted destinations. For instance, as shown in FIG. 75(b), the predicted destinations "CCC home center store" and "DDD bookstore" are not displayed on the screen, and "Home", "AAA supermarket", and "BBB restaurant" are displayed on the screen. For this reason, there are many cases where information regarding a destination which the user would actually head for is not displayed.

On the other hand, it is conceivable to display predicted destinations with labels for which a degree of detail in representation is lowered so that destinations can be displayed. For example, as a municipality name label has a low degree of detail and indicates a large map area, the municipality name label can show destinations. For instance, as in FIG. 76(a), it is assumed that destinations, which the user is highly likely to head for, "Home", "AAA supermarket", "BBB restaurant", and "CCC restaurant", and "DDD bookstore", are in "M town" and "S town", respectively. When the predicted destinations are displayed using the municipality names, as shown in FIG. 76(b), information regarding all the predicted destinations can be displayed such that an arrival time at "M town" is "17:00" and an arrival time at "S town" is "18:00". However, as the municipality label that is a label having a low degree of detail indicates the large map area, an accurate position cannot be known. Consequently, information unique to the position cannot be presented. For example, as a map area indicated by the labels in the example shown in FIG. 75 is small, the arrival times can be displayed with accuracy of minute; however, as the map area indicated by the labels in the example shown in FIG. 76 is large, the arrival times can be displayed with accuracy of hour. As stated above, there is a problem that using a label with a low degree of detail reduces accuracy of information to be presented.

The present invention has been devised in view of the above situations, and the objective of the present invention is to provide a destination display apparatus and a destination display method which can display information regarding predicted destinations whose number of labels is greater than the number of destination name labels to be displayed, even when the number of the destination name labels to be displayed is limited. It is to be noted that the destinations here include not only a final destination but also a stopover.

Means to Solve the Problems

In order to achieve the above objective, a destination display apparatus according to the present invention is a destination display apparatus which displays a name of a destination of a mobile terminal and information regarding the destination, the destination display apparatus comprising: a destination obtaining unit configured to obtain a plurality of destinations of the mobile terminal; a label obtaining unit configured to obtain labels indicating display names of the plurality of destinations as a hierarchical structure based on degrees of detail of display patterns each regarding a position; a number-to-be-displayed determining unit configured to determine the number of the labels to be displayed on a display screen; a label selecting unit configured to select, from the labels including the plurality of the destinations obtained by the destination obtaining unit, one or more labels using the hierarchical structure obtained by the label obtaining unit so that the number of labels becomes equal to or below the number of the labels to be displayed, the number of the labels to be displayed being obtained by the number-to-be-displayed; an information obtaining unit configured to obtain information regarding each of the plurality of destinations; and a display unit configured to display the information regarding each of the plurality of destinations, together with the one or more labels selected by the label selecting unit, the information being obtained by the information obtaining unit.

With this, even when the number of labels indicating display names of destinations is limited, information regarding destinations in number above the number of the labels can be displayed by separately using a name label having a high degree of detail of a map area indicated by the name label and another name label having a low degree of detail of a map area indicated by another name label.

It is to be noted that the present invention can be realized not only as such a destination display apparatus but also as a destination display method having as steps characteristic components included by the destination display apparatus and a program causing a computer to execute the steps. Needless to say, such a program can be distributed through recording media such as a CD-ROM and via transmission media such as the Internet.

Effects of Invention

With the destination display apparatus and the destination display method according to the present invention, it is possible to display information regarding destinations in number above the number of labels by using a label including destinations and having a low degree of representational detail.

BRIEF DESCRIPTION OF DRAWINGS

FIG. 2 is a diagram showing an example of information accumulated in a history accumulating unit.

FIG. 40A is a diagram showing an example of map information accumulated in a map accumulating unit.

FIG. 40B is a diagram showing an example of map information accumulated in the map accumulating unit.

FIG. 41B is a diagram showing an example where the time determining unit determines whether or not the label is available based on the arrival time.

FIG. 52 is a diagram showing an example of a rule defining threshold values which is accumulated in a threshold value accumulating unit.

FIG. 53A is a diagram showing an example where a threshold value for determining label availability based on each of required times to a corresponding one of predicted destinations.

FIG. 53B is a diagram showing an example where a threshold value for determining label availability based on each of required times to a corresponding one of predicted destinations.

NUMERICAL REFERENCES

Figure 1:
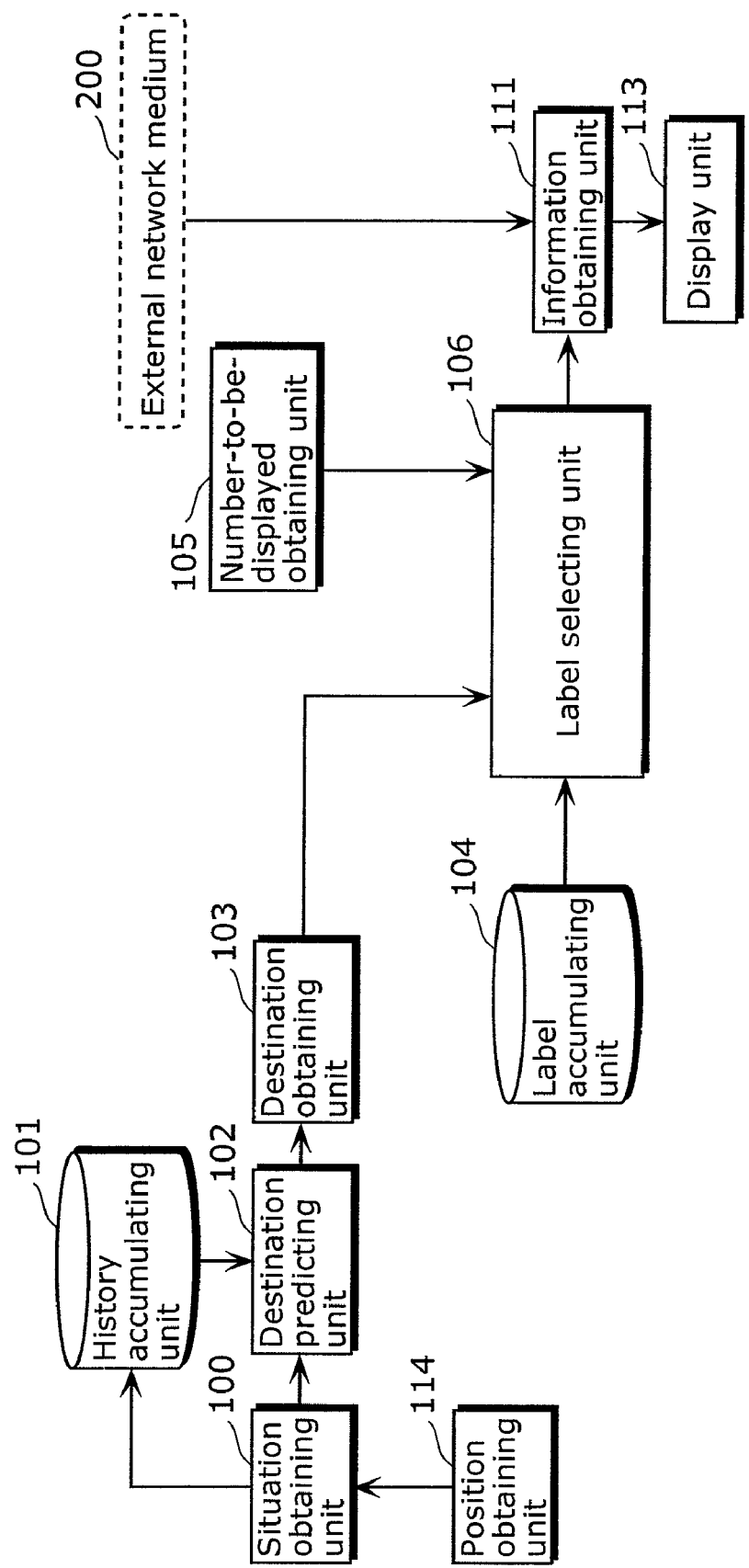
FIG. 1 is a block diagram showing a structure of a destination display apparatus according to a first embodiment of the present invention.

100 Situation obtaining unit
100K Situation obtaining unit
101 History accumulating unit 102 Destination predicting unit
103 Destination obtaining unit
104 Label accumulating unit
104K Label accumulating unit
105 Number-to-be-displayed obtaining unit
106 Label selecting unit
106G Label selecting unit
106K Label selecting unit
107 Destination selecting unit
108 First label selecting unit
108A First label selecting unit
108G First label selecting unit
108K First label selecting unit
108Q First label selecting unit
109 Second label selecting unit
109A Second label selecting unit
111 Information obtaining unit
112 Second information calculating unit
113 Display unit
114 Position obtaining unit
130 Distance calculating unit
131K Label obtaining unit
132 Information display unit
200 External network medium
1302 Destination predicting unit
1303 Destination obtaining unit
1306 Label selecting unit
1307 Destination selecting unit
1308 First label selecting unit
1311 Information obtaining unit
1315 Map accumulating unit
1316 Route calculating unit
1317 First information calculating unit
1317A First information calculating unit
1318 Time calculating unit
1319 Availability determining unit
1319A Availability determining unit
1320 Time determining unit
1340 Required time calculating unit
1341 Threshold value accumulating unit
1343 Determining unit
2318 Traffic jam calculating unit
2320 Traffic jam determining unit
2651 Type determining unit
2706 Label selecting unit
2708 First label selecting unit
2721 Label generating unit
2722 Target selecting unit
2723 Name determining unit

BEST MODE FOR CARRYING OUT THE INVENTION

A destination display apparatus according to the present invention is a destination display apparatus which displays a name of a destination of a mobile terminal and information regarding the destination, the destination display apparatus comprising: a destination obtaining unit configured to obtain a plurality of destinations of the mobile terminal; a label obtaining unit configured to obtain labels indicating display names of the plurality of destinations as a hierarchical structure based on degrees of detail of display patterns each regarding a position; a number-to-be-displayed determining unit configured to determine the number of the labels to be displayed on a display screen; a label selecting unit configured to select, from the labels including the plurality of the destinations obtained by the destination obtaining unit, one or more labels using the hierarchical structure obtained by the label obtaining unit so that the number of labels becomes equal to or below the number of the labels to be displayed, the number of the labels to be displayed being obtained by the number-to-be-displayed; an information obtaining unit configured to obtain information regarding each of the plurality of destinations; and a display unit configured to display the information regarding each of the plurality of destinations, together with the one or more labels selected by the label selecting unit, the information being obtained by the information obtaining unit.

With this, even when the number of labels (destination name labels) indicating display names of destinations is limited, information regarding destinations in number above the number of the labels can be displayed by separately using a name label having a high degree of detail of a map area indicated by the name label and another name label having a low degree of detail of a map area indicated by another name label. Furthermore, when the number of the predicted destinations indicated by the destination name labels is equal to the number to be displayed, it is possible to provide more accurate information regarding a precise position by preferentially displaying a destination name label having a high degree of detail, that is, a label having a narrow map area indicated thereby.

It is to be noted that a degree of detail of a display pattern regarding a position denotes a size of a map area indicated by a label indicating a display name. Moreover, a label indicating a destination is a label indicating an area including the destination.

Here, the label selecting unit may select one or more labels having a high degree of detail and including all of the plurality of destinations included in the selected one or more labels in number equal to or below the number to be displayed.

In addition, the label selecting unit may select one or more low-rank labels having a highest degree of detail and including the plurality of destinations, and select the one or more low-rank labels having the highest degree of detail when the number of destinations included in one or more high-rank labels for which a degree of detail is lowered does not increase in the case where a degree of detail is lowered for the selected one or more low-rank labels.

Furthermore, the destination display apparatus may further include: a position obtaining unit configured to obtain a current position of the mobile terminal; a map accumulating unit configured to accumulate map information; a route calculating unit configured to calculate information regarding each of routes from the current position to a corresponding one of the plurality of destinations, using the map information; and an availability determining unit configured to determine that the labels obtained as the hierarchical structure by the label obtaining unit are unavailable when pieces of information each regarding the route to the corresponding one of the plurality of destinations are not similar, the plurality of destinations being included in descendant labels of the labels, which are located at a low rank, wherein the label selecting unit may select one or more labels from labels other than the labels determined as unavailable by the availability determining unit.

Moreover, the destination display apparatus may further include an information calculating unit configured to calculate, from the information obtained by the information obtaining unit, information regarding each route to the corresponding one of the plurality of destinations, wherein the availability determining unit may determine the one or more labels as unavailable when a difference between the pieces of information regarding the route to the corresponding one of the plurality of destinations included in the descendant labels of the labels is large, and the display unit may display the information regarding each route, together with the one or more labels selected by the label selecting unit.

Furthermore, the information regarding each route to the corresponding one of the plurality of destinations may be an arrival time at one of the plurality of destinations, the availability unit may determine the one or more labels as unavailable when a difference between arrival times at the plurality of destinations included in the descendant labels of the labels is greater than a predetermined value, and the display unit may display the arrival time, together with the one or more labels selected by said label selecting unit.

Moreover, the predetermined value may increase as a distance of each route to the corresponding one of the plurality of destinations increases.

In addition, the information regarding each route to the corresponding one of the plurality of destinations may be traffic jam information regarding each route, the availability determining unit may determine the one or more labels as unavailable when pieces of traffic jam information each regarding the route to the corresponding one of the plurality of destinations included in the descendant labels of the one or more labels do not match, and the display unit may display the traffic jam information, together with the one or more labels selected by the label selecting unit.

Furthermore, the destination display apparatus may further include a label generating unit configured to generate one or more labels to be common parent labels ranking higher in the hierarchical structure for the labels that are obtained as the hierarchical structure by the label obtaining unit and that indicate positions within a predetermined range, wherein the label selecting unit may select one or more labels from the labels that are obtained as the hierarchical structure by the label obtaining unit or the one or more labels generated by the label generating unit.

Moreover, the destination obtaining unit may obtain a ranking indicating certainty of each of the plurality of destinations, and the label generating unit may generate, for the labels that indicate the positions within the predetermined range, one or more labels each having a name including a portion of a name of or an entire name of a label which includes, in the label itself or in a low rank, a destination having a highest ranking.

The following will describe each of embodiments of the present invention with reference to the drawings.

First Embodiment

FIG. 1 is a block diagram showing a structure of a destination display apparatus according to a first embodiment of the present invention.

The destination display apparatus is an apparatus which predicts destinations and displays the predicted destinations. As shown in FIG. 1, the destination display apparatus includes: a position obtaining unit 114 which obtains a current position of a mobile terminal; a situation obtaining unit 100 which obtains a current situation of the mobile terminal; a history accumulating unit 101 which accumulates the current situation and a destination history; a destination predicting unit 102 which predicts destinations; and a destination obtaining unit 103 which obtains the predicted destinations. The destination display apparatus further includes: a label accumulating unit 104 which accumulates a name label in a hierarchical structure including parent-child relationships between name labels; a number-to-be-displayed obtaining unit 105 which obtains the number of name labels to be displayed on a mobile terminal; a label selecting unit 106 which selects a label to be displayed; an information obtaining unit 111 which obtains information from an external network medium 200; and a display unit 113 which displays the selected label and the obtained information. Hereinafter, each of the components will be first described with reference to the drawings, and operations of the present device will be subsequently described.

The position obtaining unit 114 obtains a current position of a mobile terminal mainly through a Global Position System (GPS) antenna, an IC tag, communication with a base station, or image recognition. For example, information regarding longitude and latitude of the current position of the mobile terminal, such as longitude "134.5.59.9" east and latitude "34.5.15.6" north, is obtained.

The situation obtaining unit 100 obtains a current situation of the mobile terminal using the current position of the mobile terminal which is obtained by the position obtaining unit 114. A situation indicates, for instance, a place (departure place) from which the mobile terminal has departed in a current movement. In the case of a vehicle, the departure place is, for example, a place where an engine of the vehicle is recently turned on. Furthermore, when the mobile terminal arrives at a destination, the situation obtaining unit 100 obtains a position and a name of the destination as the destination. A destination is, for instance, a place where the engine is turned off. A destination name is, for example, a facility name of a facility located closest to the position of the destination.

The history accumulating unit 101 accumulates a set of a situation of the mobile terminal and a destination as a history. For instance, the history accumulating unit 101 accumulates a set of a departure place and a destination as a history. For example, as shown in FIG. 2, the history accumulating unit 101 accumulates a history in which a departure place "Home" is corresponded to a destination "Office".

The destination predicting unit 102 predicts one or more destinations from the current situation obtained by the situation obtaining unit 100 and the histories accumulated in the history accumulating unit 101. For instance, all of the destinations each included in more than ten histories among histories having a current departure place are predicted destinations.

The destination obtaining unit 103 obtains destinations predicted by the destination predicting unit 102. More specifically, the destination obtaining unit 103 obtains positions and name labels of the predicted destinations. For example, the destination obtaining unit 103 obtains five predicted destinations, "Home", "H convenience store", "A center", "B restaurant", and "T store".

Figure 3:
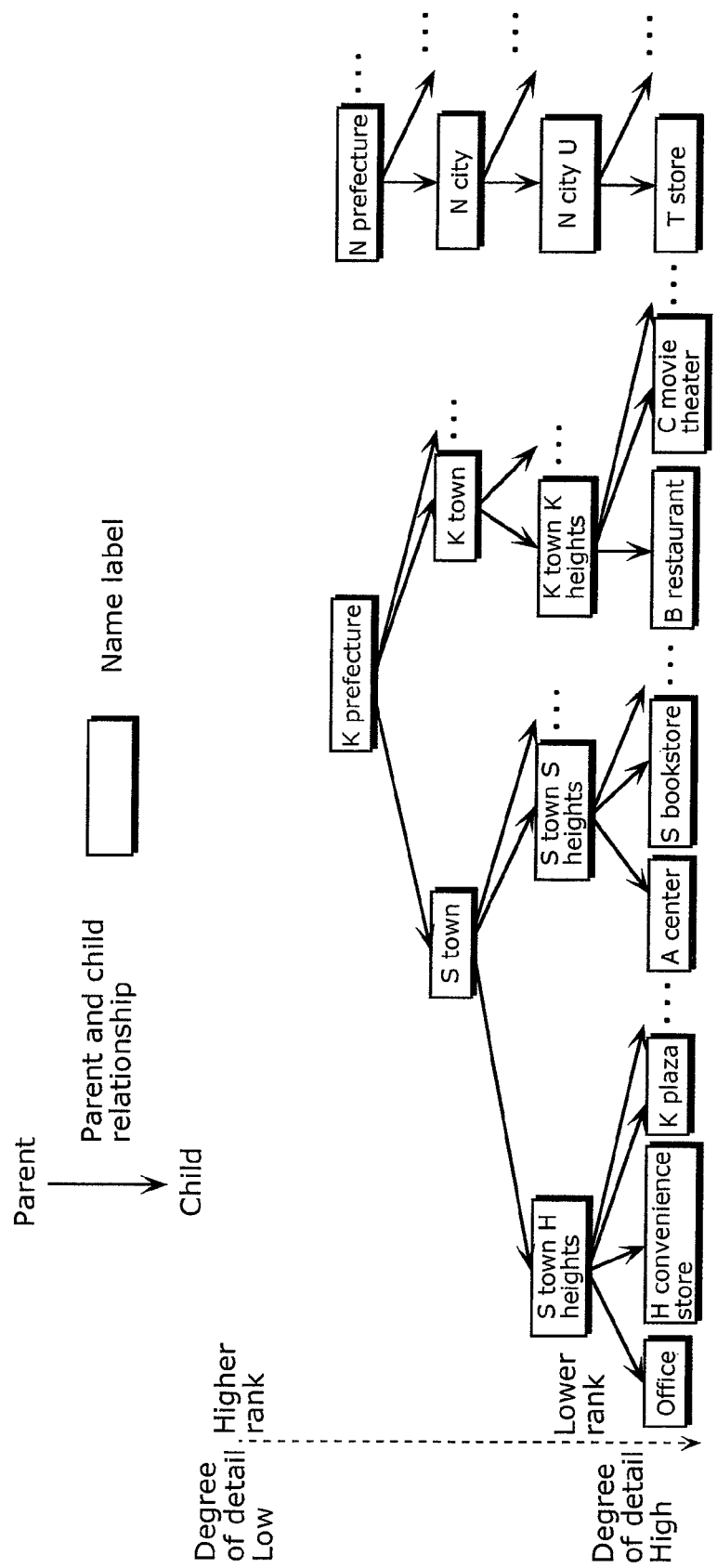
FIG. 3 is a diagram showing an example of a part of a hierarchical structure accumulated in a label accumulating unit.

As shown in FIG. 3, the label accumulating unit 104 accumulates name data in a hierarchical structure including parent-child relationships between name labels. The data accumulated in the label accumulating unit 104 will be described. In the hierarchical structure, a parent and a child in a parent-child relationship are arranged to be at a higher rank and a lower rank, respectively. A child label has a degree of detail higher than a parent label. A map area indicated by the child label is included in a map area indicated by the parent label. Inversely, a parent label has a degree of detail lower than a child label, and a map area indicated by the parent label includes a map area indicated by one or more child labels. Accordingly, a lower-rank label has a higher degree of detail than a higher-rank label does. A label is generally a place name label such as an address, and the label accumulating unit 104 accumulates an address in a hierarchical structure. For instance, a facility name that is a specific destination name having a high degree of detail and a point name registered by a user are accumulated as a label in the lowest-rank layer. A label at one rank higher than the lowest-rank layer (hereinafter, referred to as a middle layer) indicates a map area including a map area indicated by a label in the lowest-rank layer, and has the parent-child relationship with the label in the lowest-rank layer (the label having the highest degree of detail). Likewise, the higher a rank of a layer is, a label in the layer is designed to include a positional relationship on a map with a label in a lower-rank layer and to have a lower degree of detail. For example, when "Office" belongs to "K prefecture", "S town", and "S town H heights", as shown in FIG. 3, the lowest-layer label "Office" (child) has the parent-child relationship with a middle-layer label "S town H heights" (parent). Similarly, the middle-layer label "S town H heights" (child) has the parent-child relationship with a label "S town" (parent).

Here, the map area indicated by the parent label is larger than the map area indicated by each of labels that are child labels of the parent label, and includes the map area indicated by the child labels. More specifically, in the case of an example shown by FIG. 3, a map area indicated by the label "S town" (parent) is larger than a map area indicated by the label "S town H heights" (child). Moreover, the map area indicated by the label "S town H heights" (child) is included in the map area indicated by the label "S town" (parent).

The number-to-be-displayed obtaining unit 105 obtains the number of destination name labels that the display unit 113 displays on a screen of the mobile terminal. For instance, when specifications of the terminal allow up to three destinations to be displayed, the number-to-be-displayed obtaining unit 105 obtains a number to be displayed 3.

The label selecting unit 106 selects, from the label hierarchical structure accumulated in the label accumulating unit 104, one or more labels in number equal to or below the number to be displayed obtained by the number-to-be-displayed obtaining unit 105, using the predicted destinations obtained by the destination obtaining unit 103. The label selecting unit 106 selects the labels so that the selected one or more labels or descendants of the one or more labels include all of the predicted destinations in the hierarchical structure. In other words, the labels each indicating a corresponding one of the obtained predicted destinations are descendants of a label among the selected labels or the selected labels themselves. To put it differently, the label selecting unit 106 selects the labels so that a map area indicated by at least one of the labels includes map areas indicated by the obtained predicted destinations. In addition, a condition that the labels indicating all of the predicted destinations are selected can be satisfied, and labels starting from a low-rank label having a possible high degree of detail can be selected.

The information obtaining unit 111 obtains information regarding each label selected by the label selecting unit 106 from the external network medium 200 such as a VICS (a registered trademark: Vehicle Information and Communication System). Information regarding a label includes information regarding a map area indicated by the label, information regarding a route from a present location to the map area indicated by the label, information regarding a predicted destination indicated by the label, and information regarding a route from a present location to the predicted destination indicated by the label. The information is traffic information such as a required time, an arrival time, traffic jam information, and construction information, or commercial information such as information introducing a destination facility. For example, when the label selecting unit 106 selects three labels, "S town", "B restaurant", and "T store", the information obtaining unit 111 obtains an estimated arrival time at a predicted destination indicated by each of the labels. When predicted destinations, which are included in the label "S town" and obtained by the destination obtaining unit 103, are "Office", "H convenience store", and "A center", the information obtaining unit 111 obtains arrival time information for each of "B restaurant", "T store", "Office", "H convenience store", and "A center".

Figure 4:
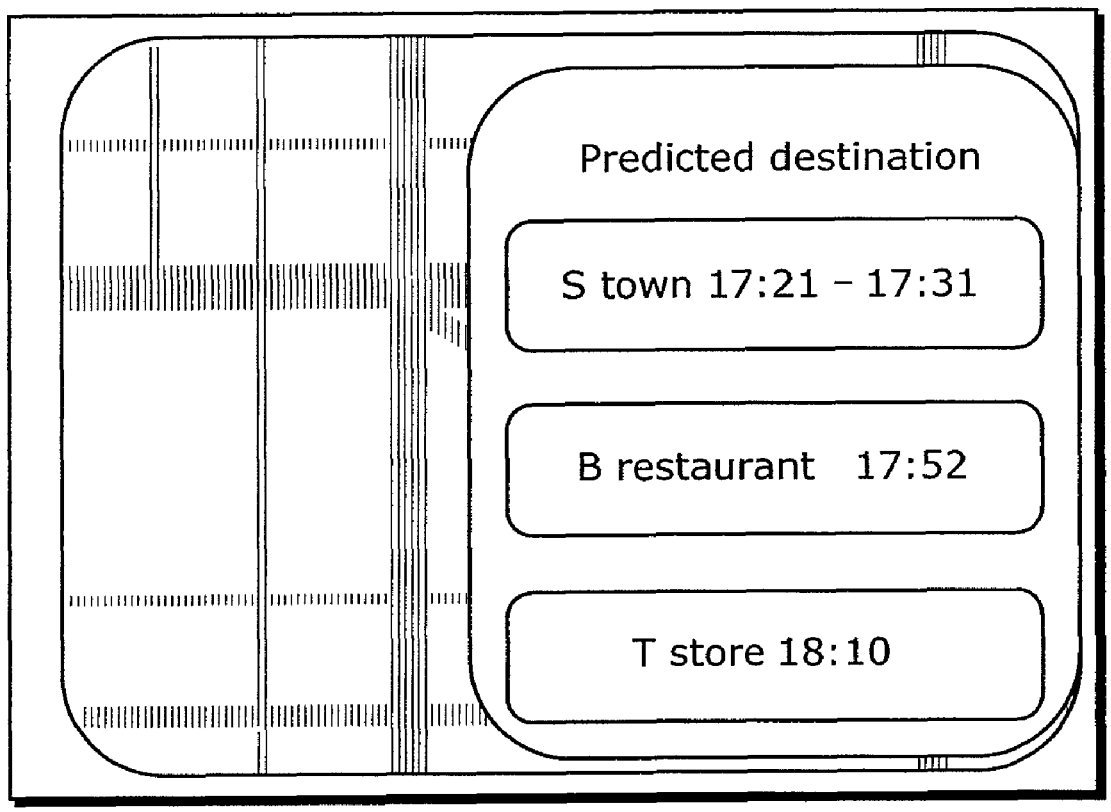
FIG. 4 is a diagram showing an example where a display unit displays labels and information.

The display unit 113 displays, together with names of the labels selected by the label selecting unit 106, the information regarding each label which is obtained by the information obtaining unit 111. For instance, when the label selecting unit 106 selects the three labels, "S town", "B restaurant", and "T store", and respective arrival times for each label are "17:21 to 17:31", "17:52", and "18:10", as shown in FIG. 4, sets of the label and the information are displayed on the mobile terminal.

Next, the label selecting unit 106 will be described in detail.

Figure 5:
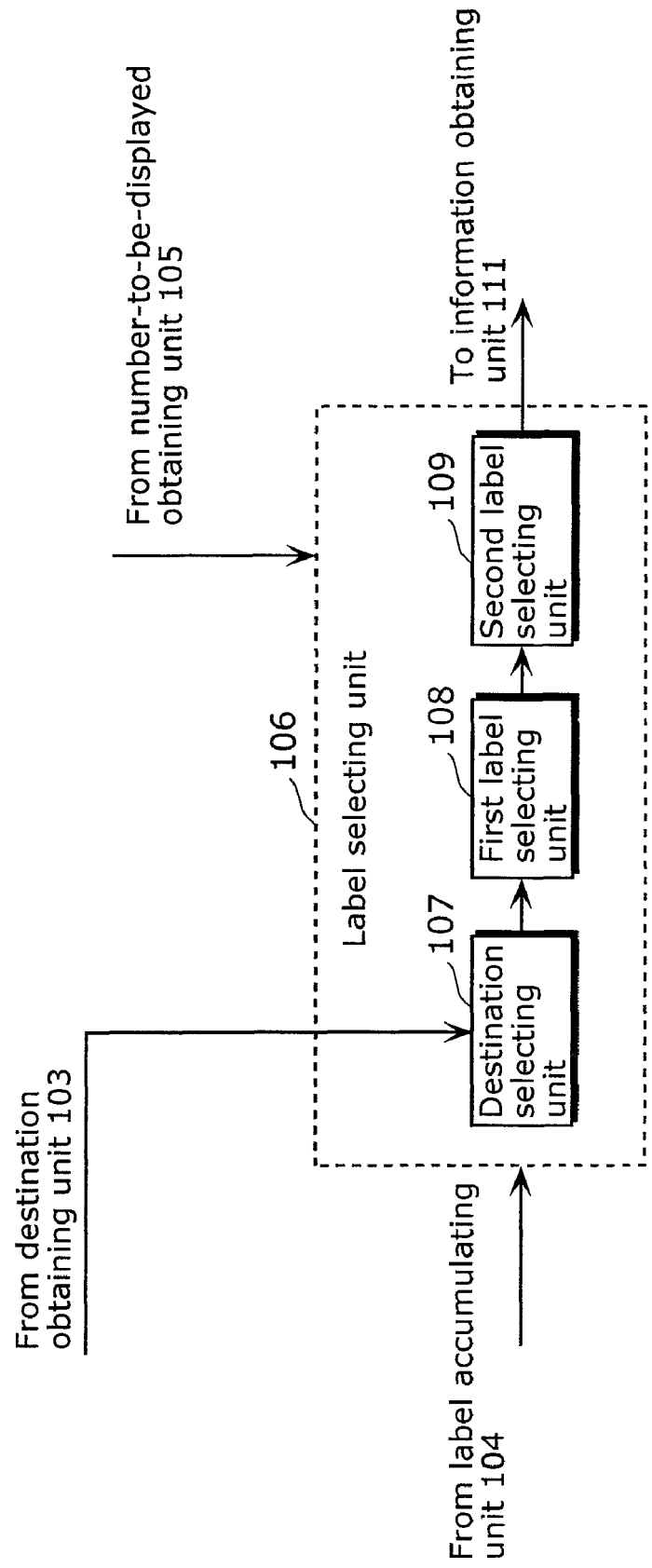
FIG. 5 is a block diagram showing a structure of a label selecting unit.

FIG. 5 is a block diagram showing a structure of the label selecting unit 106 according to the present embodiment.

As shown in FIG. 5, the label selecting unit 106 includes: a destination selecting unit 107 which selects, in the label hierarchical structure accumulated in the label accumulating unit 104, labels of the predicted destinations obtained by the destination obtaining unit 103; a first label selecting unit 108 which selects, instead of the labels selected by the destination selecting unit 107, labels for which a degree of detail is lowered until the number of labels becomes equal to or below the number to be displayed; and a second label selecting unit 109 which selects, instead of the labels selected by the destination selecting unit 107, labels for which a degree of detail is raised.

Figure 6A:
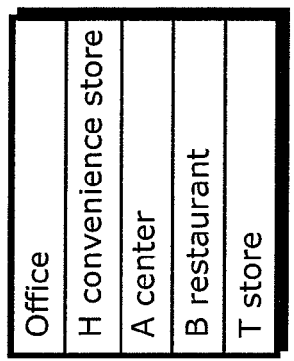
FIG. 6A is a diagram showing an example of destinations obtained by a destination obtaining unit.
Figure 6B:
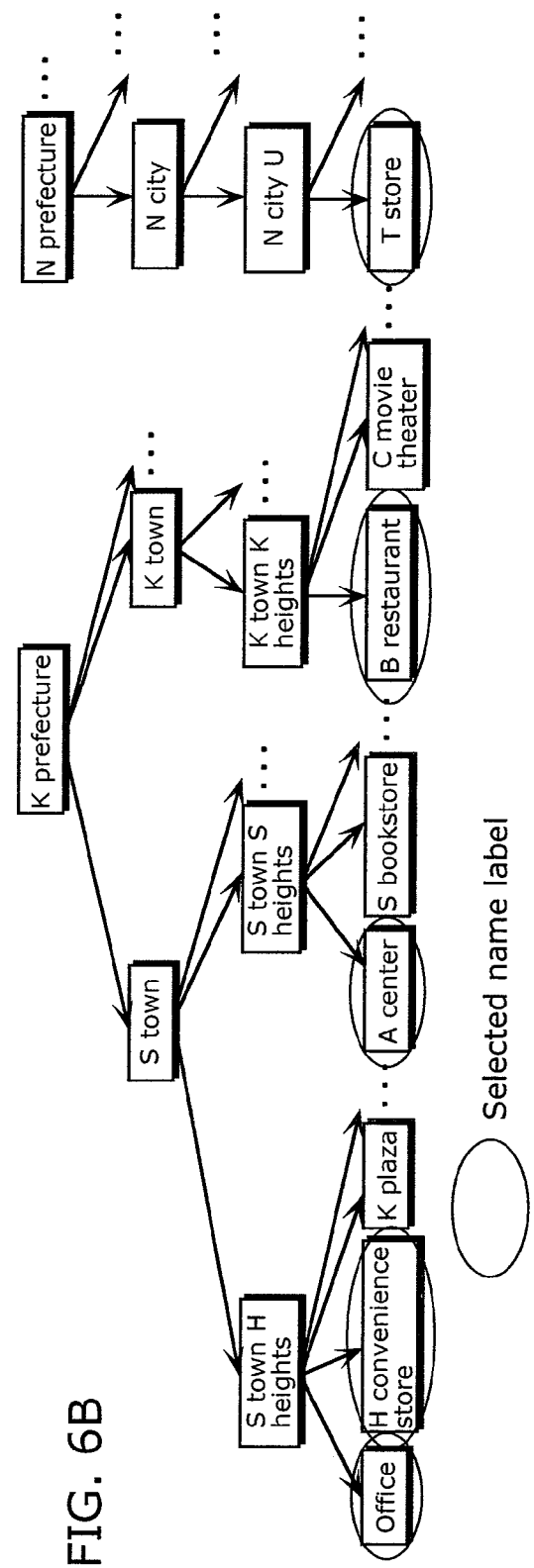
FIG. 6B is a diagram showing an example where a destination selecting unit selects destinations.

The destination selecting unit 107 selects, in the label hierarchical structure accumulated in the label accumulating unit 104, all of the destinations obtained by the destination obtaining unit 103. For example, when the destination obtaining unit 103 obtains five predicted destinations, "Office", "H convenience store", "A center", "B restaurant", and "T store", as shown in FIG. 6A, the destination selecting unit 107 selects name labels (hereinafter, simply referred to labels), "Office", "H convenience store", "A center", "B restaurant", and "T store", which are in the lowest-layer in the hierarchical structure, as shown in FIG. 6B.

Figure 7:
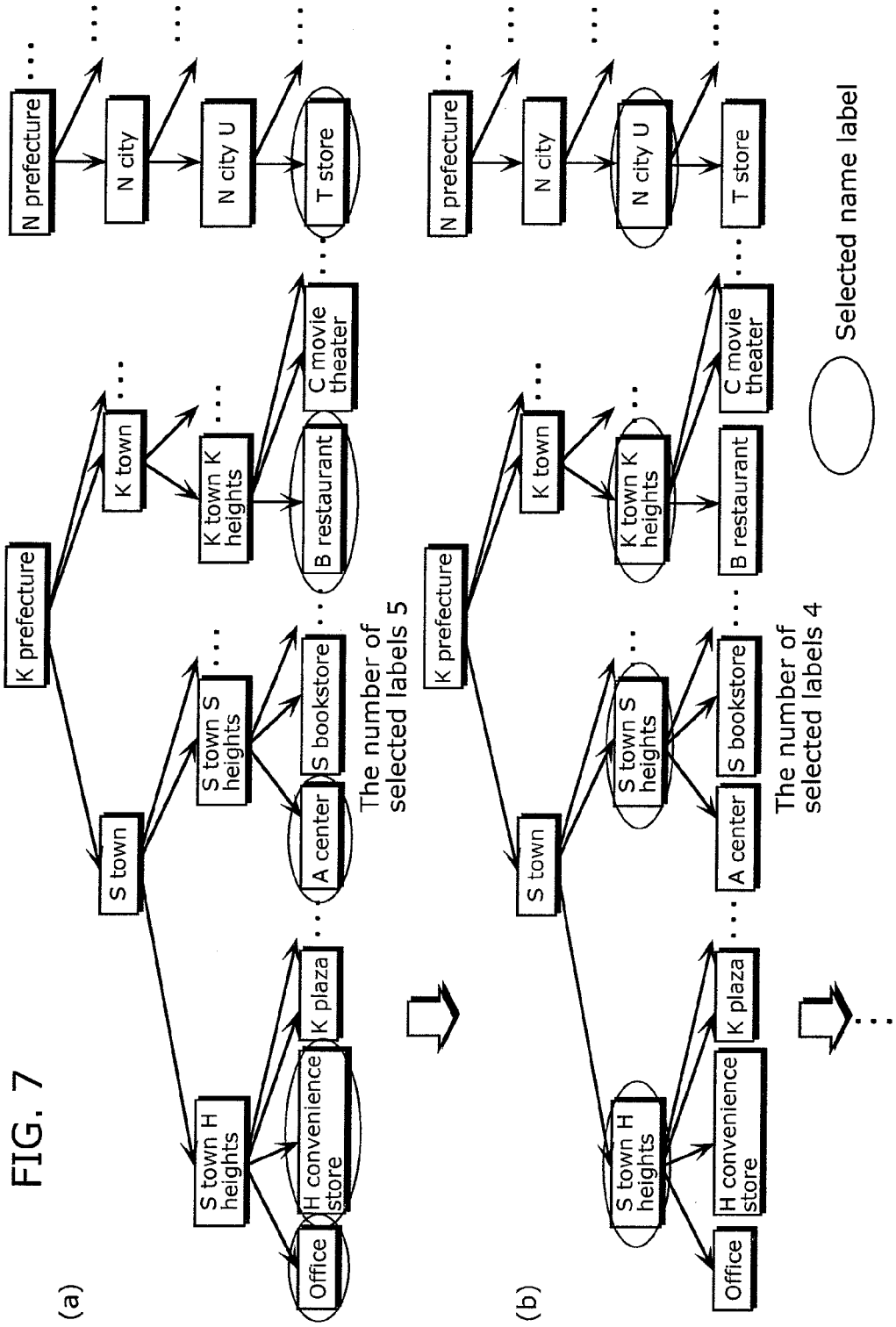
FIG. 7 is a diagram showing an example where a first label selecting unit lowers a degree of detail for each selected label.
Figure 8:
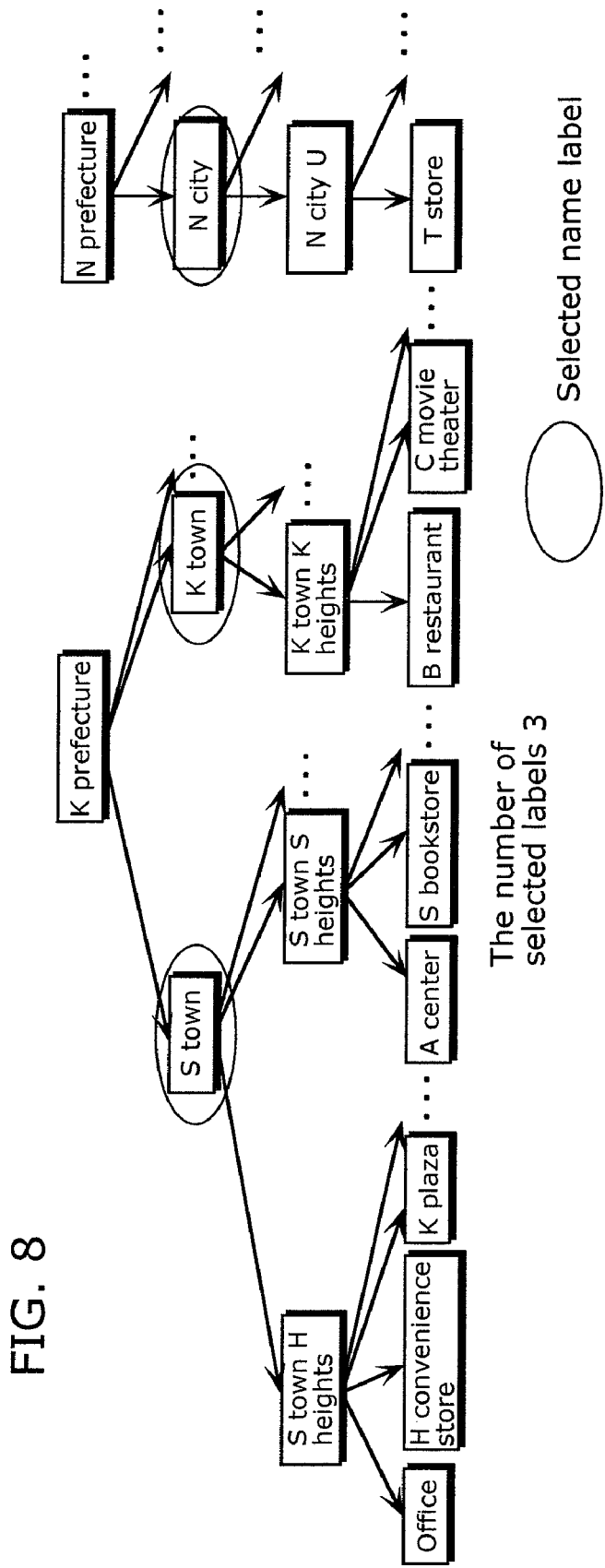
FIG. 8 is a diagram showing an example of a result in which the first label selecting unit has lowered the degree of detail for each selected label.

The first label selecting unit 108 lowers, for each of the labels selected by the destination selecting unit 107, a degree of detail until the number of the selected labels becomes equal to or below the number to be displayed. More specifically, the first label selecting unit 108 repeatedly selects, in the label hierarchical structure, parent labels of all of the labels selected by the destination selecting unit 107 until the number of the selected labels becomes equal to or below the number to be displayed. For instance, as shown in FIG. 7(*a*), it is assumed that the label accumulating unit 104 has accumulated a hierarchical structure, that the destination selecting unit 107 has selected five labels, "Office", "H convenience store", "A center", "B restaurant", and "T store", and that a number to be displayed, which is obtained by the number-to-be-displayed obtaining unit 105, has been "3". In this case, the first label selecting unit 108 selects respective parent labels of each selected label because the number of the selected labels "5" exceeds the number to be displayed "3". Stated differently, as shown in FIG. 7(*b*), the first label selecting unit 108 selects four labels, "S town H heights" that is a parent label common to "Office" and "H convenience store", "S town S heights" that is a parent label of "A center", "K town K heights" that is a parent label of "B restaurant", and "N city U" that is a parent label of "T store". The first label selecting unit 108 repeats such selection of the respective parent labels of each selected label until the number of selected labels becomes equal to or below the number to be displayed "3". In the example shown in FIG. 7, eventually, as shown in FIG. 8, three labels, "S town" that is a parent label common to "S town H heights" and "S town S heights", "K town" that is a parent label of "K town K heights", and "N city" that is a parent label of "N city U", are selected.

The second label selecting unit 109 selects, instead of the labels selected by the first label selecting unit 108, labels having a high degree of detail, while maintaining the number of the predicted destinations that are selected by the destination selecting unit 107 and are indicated by the labels selected by the first label selecting unit 108. More specifically, the second label selecting unit 109 selects, in the hierarchical structure accumulated in the label accumulating unit 104, child labels of the selected labels on a one-on-one basis per selected label. Here, when the selection of a child label reduces the number of predicted destinations indicated by a label, the selection of the child label is suspended. Here, the number of the predicted destinations indicated by the label is the number of the predicted destinations indicated by the label itself or descendants of the label. When the number of the predicted destinations does not decrease, the second label selecting unit 109 repeatedly selects a child label until the lowest-rank label of a predicted destination is selected. The second label selecting unit 109 performs such selection of the child label on all of the labels selected by the first label selecting unit 108. For example, as shown in FIG. 9(a), it is assumed that the first label selecting unit 108 has selected three labels, "S town", "K town", and "N city". Labels of predicted destinations, which are included in the label "S town", are three labels, "Office", "H convenience store", and "A center". The selection of any of the child labels included in the label "S town" reduces the number of the labels of the predicted destinations included in the selected child label. For instance, selecting "S town H heights" reduces the number of the labels included therein because "S town H heights" includes two child labels, "Office" and "H convenience store". Thus, the selection of the child label is not performed for "S town" any longer. Next, the label "K town" includes a label of a predicted destination, "B restaurant". Selecting "K town K heights" does not affect the number of the labels of the predicted destinations included in "K town K heights" because "K town K heights", which is one of child labels of "K town", includes "B restaurant". Thus, instead of "K town", "K town K heights" is selected. In the same manner, "B restaurant", the child label of "K town K heights", is selected. Finally, as shown in FIG. 9(b), the second label selecting unit 109 selects the three labels, "S town", "B restaurant", and "T store". These labels include all of the five predicted destinations, "Office", "H convenience store", "A center", "B restaurant", and "T store", obtained by the destination obtaining unit 103.

Accordingly, the label selecting unit 106 can satisfy a condition that the labels indicating all of the predicted destinations are selected, and select, starting from a lower-rank label having a possible high degree of detail, labels in number equal to or below the number to be displayed.

Next, the display unit 113 will be described in detail.

Figure 10:
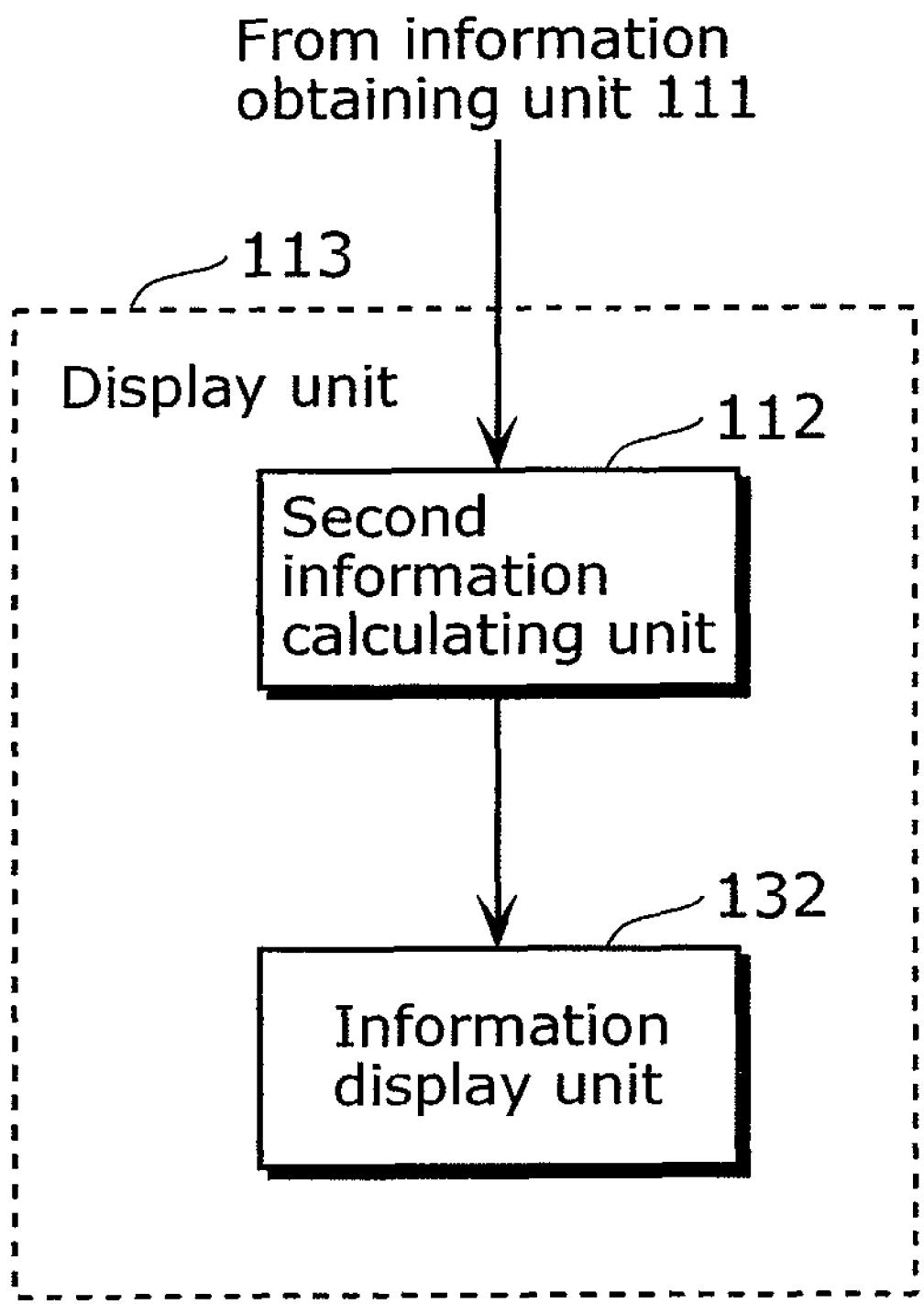
FIG. 10 is a block diagram showing a structure of a display unit.

FIG. 10 is a block diagram showing a structure of the display unit 113 according to the present embodiment.

As shown in FIG. 10, the display unit 113 includes: a second information calculating unit 112 which combines pieces of information each regarding a destination indicated by a corresponding one of the labels, which is obtained by the information obtaining unit 111, and calculates information regarding each of labels selected by the label selecting unit 106; and an information display unit 132 which displays the information regarding the label together with a label name of the label.

Figure 11:
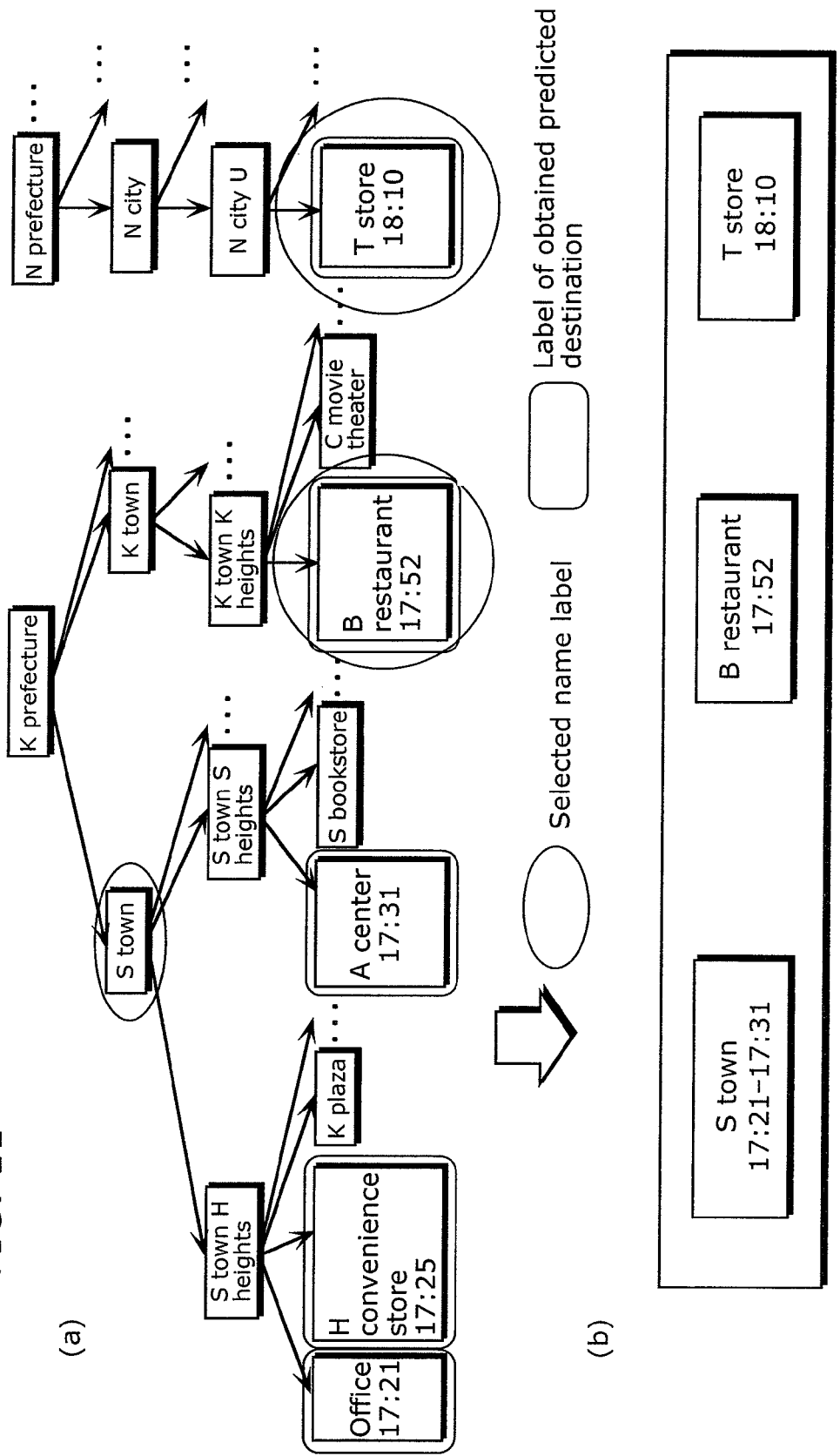
FIG. 11 is a diagram showing an example where a second information calculating unit combines pieces of information each regarding a corresponding one of predicted destinations.

The second information calculating unit 112 combines the pieces of information regarding the destination indicated by the corresponding one of the labels, which is obtained by the information obtaining unit 111, and calculates the information regarding each of the labels selected by the label selecting unit 106. More specifically, the minimum value and the maximum value of the information regarding the destination indicated by the corresponding one of the obtained labels are used as the information regarding the selected label. For example, as shown in FIG. 11(a), it is assumed that the label selecting unit 106 has selected three labels, "S town", "B restaurant", and "T store", and that the second information calculating unit 112 has obtained: an arrival time "17:21" at "Office", an arrival time "17:25" at "H convenience store", and an arrival time "17:31" at "A center", which are the predicted destinations indicated by the label "S town"; an arrival time "17:52" at "B restaurant", which is the predicted destination indicated by the label "B restaurant"; and an arrival time "18:10" at "T store", which is the predicted destination indicated by the label "T store". Here, the minimum value of the arrival time at the predicted destination indicated by the label "S town" is "17:21" at "Office". The largest value is "17:31" at "A center". Thus, the arrival time of the label "S town" is "17:21 to 17:31". Similarly, the arrival time of the label "B restaurant" is "17:52" because both the minimum and maximum values of the arrival time at the predicted destination indicated by the label "B restaurant" are the arrival time "17:52" at "B restaurant". In the same manner, the arrival time of the label "T store" is "18:10".

The information display unit 132 displays, together with each name of a corresponding one of the labels selected by the label selecting unit 106, the information regarding each label which is obtained by the second information calculating unit 112. For instance, when the label selecting unit 106 selects the three labels, "S town", "B restaurant", and "T store" and respective arrival times for each label are "17:21 to 17:31", "17:52", and "18:10", as shown in FIG. 11(b), the information display unit 132 displays sets of the label and the information on the mobile terminal.

As a result, it is possible to obtain the information efficiently because the user can obtain the information that is obtained by combining the information regarding each destination indicated by the corresponding one of the labels.

Next, operations of the destination display apparatus structured as above will be described.

Figure 12:
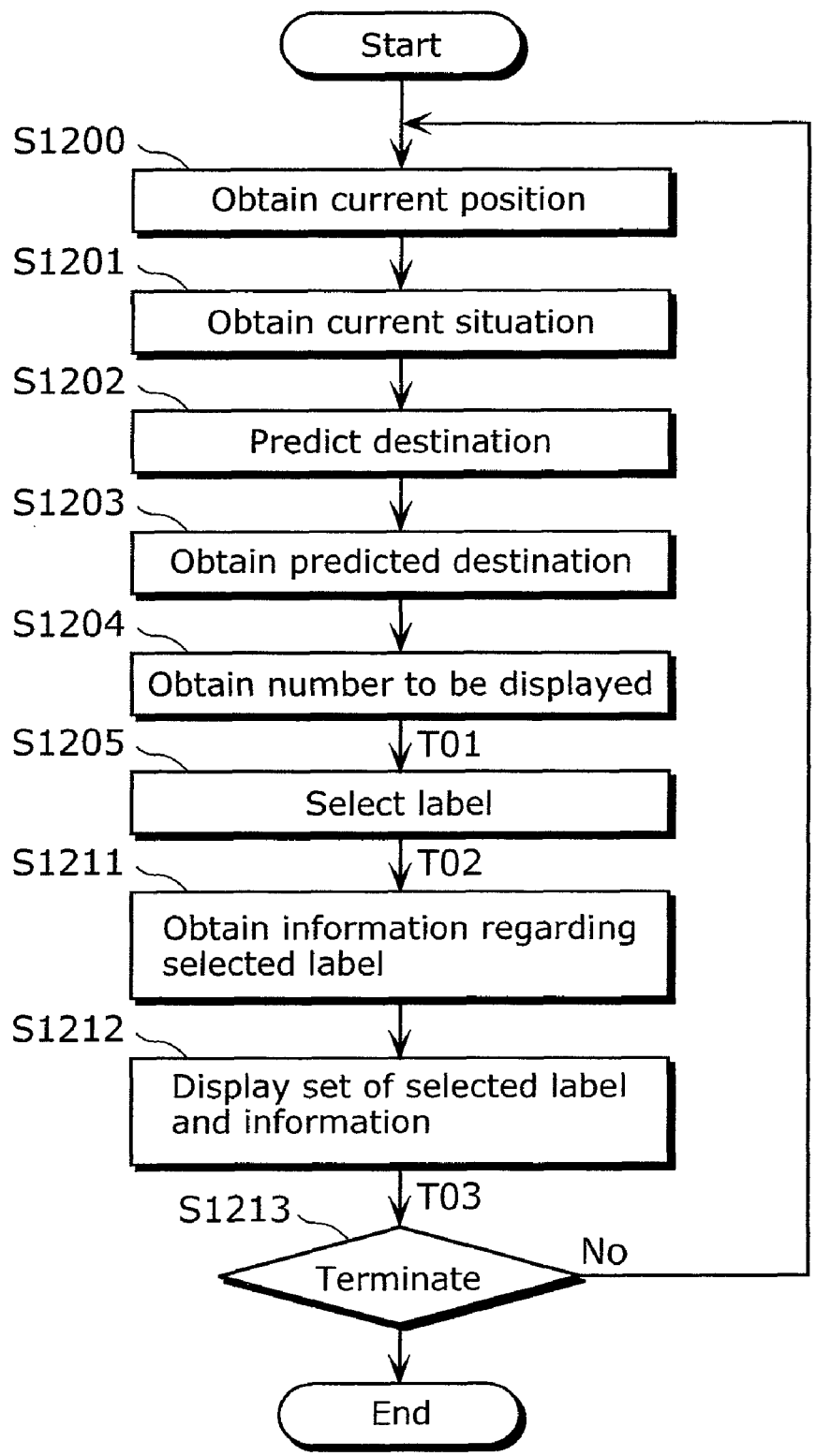
FIG. 12 is a flow chart showing an example of operations of the destination display apparatus according to the first embodiment of the present invention.
Figure 13:
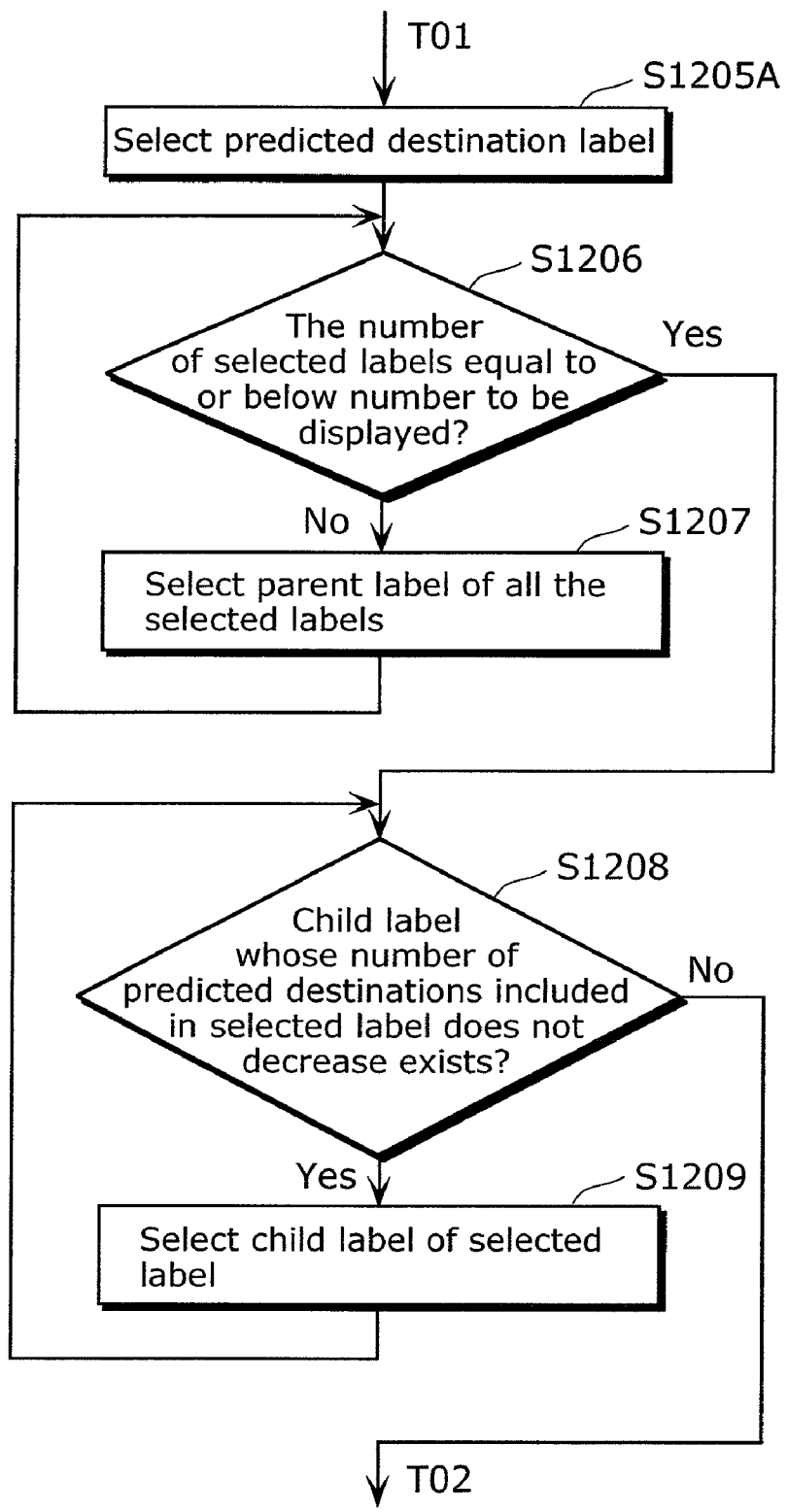
FIG. 13 is a flow chart showing an example of operations of the label selecting unit according to the first embodiment of the present invention.

FIG. 12 is a flow chart showing a flow of the operations of the destination display apparatus, and FIG. 13 is a flow chart showing a flow of operations of the label selecting unit 106.

The position obtaining unit 114 obtains a current position of a mobile terminal (Step S1200). The situation obtaining unit 100 obtains a current situation of the mobile terminal, using the position information obtained by the position obtaining unit 114 (Step S1201). The destination predicting unit 102 predicts destinations from the current situation obtained by the situation obtaining unit 100 and histories accumulated in the history accumulating unit 101 (Step S1202). The destination obtaining unit 103 obtains the destinations predicted by the destination predicting unit 102 (Step S1203). The number-to-be-displayed obtaining unit 105 obtains the number of destination name labels that the display unit 113 displays on a screen of a mobile terminal (Step S1204). The label selecting unit 106 selects, from a label hierarchical structure accumulated in the label accumulating unit 104, labels in number equal to or below a number to be displayed obtained by the number-to-be-displayed obtaining unit 105, using the predicted destinations obtained by the destination obtaining unit 103 (Step S1205). The information obtaining unit 111 obtains, from the external network medium 200 such as a VICS, information regarding each label selected by the label selecting unit 106 (Step S1211). The display unit 113 displays, together with names of the labels selected by the label selecting unit 106, the information regarding each label which is obtained by the information obtaining unit 111 (Step S1212). The destination display apparatus determines whether the processing is terminated (Step S1213), and ends the flow when the processing is terminated (Yes in Step S1213). The flow returns to Step S1200 when the processing is not terminated (No in Step S1213).

Next, label selection operations (S1205) performed by the label selecting unit 106 will be described in detail with reference to FIG. 13.

When the number-to-be-displayed obtaining unit 105 obtains the number of destination name labels to be displayed (Step S1204 in FIG. 12), the destination selecting unit 107 selects, in the label hierarchical structure accumulated in the label accumulating unit 104, all of the destinations obtained by the destination obtaining unit 103 (Step S1205A). The first label selecting unit 108 determines whether the number of labels indicating the destinations selected by the destination selecting unit 107 is equal to or below the number to be displayed obtained by the number-to-be-displayed obtaining unit 105 (Step S1206). When the number of the labels is equal to or below the number to be displayed, the flow advances to Step S1208 (Yes in Step S1206). When the number of the labels exceeds the number to be displayed, the flow advances to Step S1207 (No in Step S1206). When the number of the selected labels exceeds the number to be displayed, the first label selecting unit 108 selects parent labels of all of the selected labels (Step S1207), and the flow returns to Step S1206. When the number of the selected labels is equal to or below the number to be displayed, the second label selecting unit 109 determines whether a selected label including a child label whose number of predicted destinations does not decrease exists (Step S1208). When the selected label exists, the flow advances to Step S1209 (Yes in Step S1208). When the selected label does not exist, the flow advances to Step S1211 in FIG. 12 (No in Step S1208). When the selected label including the child label whose number of the predicted destinations does not decrease exists, the second label selecting unit 109 selects, instead of the selected label, the child label whose number of the predicted destinations does not decrease and which is included in the selected label (Step S1209), and the flow returns to Step S1208. When the selected label including the child label whose number of the predicted destinations does not decrease does not exist, the flow advances to Step S1211 in FIG. 12.

Figure 14:
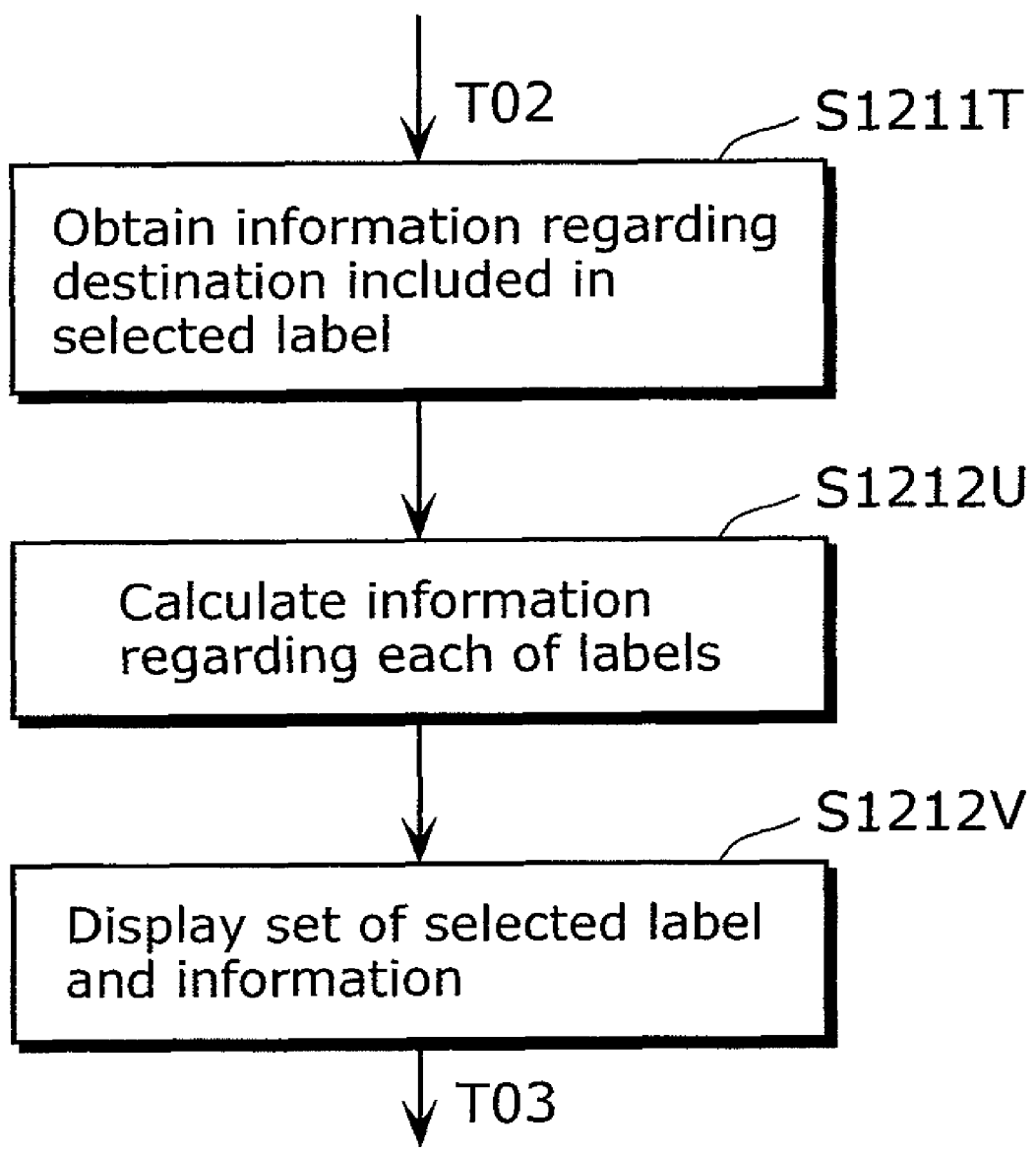
FIG. 14 is a flow chart showing an example of operations of the display unit.

Next, display operations (S1211 and S1212) performed by the display unit 113 will be described in detail with reference to FIG. 14.

The information obtaining unit 111 obtains the information regarding each destination indicated by the corresponding one of the labels (Step S1211T) after the label selecting unit 106 selects the labels (Step S1205 in FIG. 12). The second information calculating unit 112 combines the pieces of information regarding the destination indicated by the corresponding one of the labels, which is obtained by the information obtaining unit 111, and calculates the information regarding each of the labels selected by the label selecting unit 106 (Step S1212U). The information display unit 132 displays, together with each name of the corresponding one of the labels selected by the label selecting unit 106, the information regarding each label which is obtained by the second information calculating unit 112 (Step S1212V). The flow then advances to Step S1213 in FIG. 12.

Figure 15:
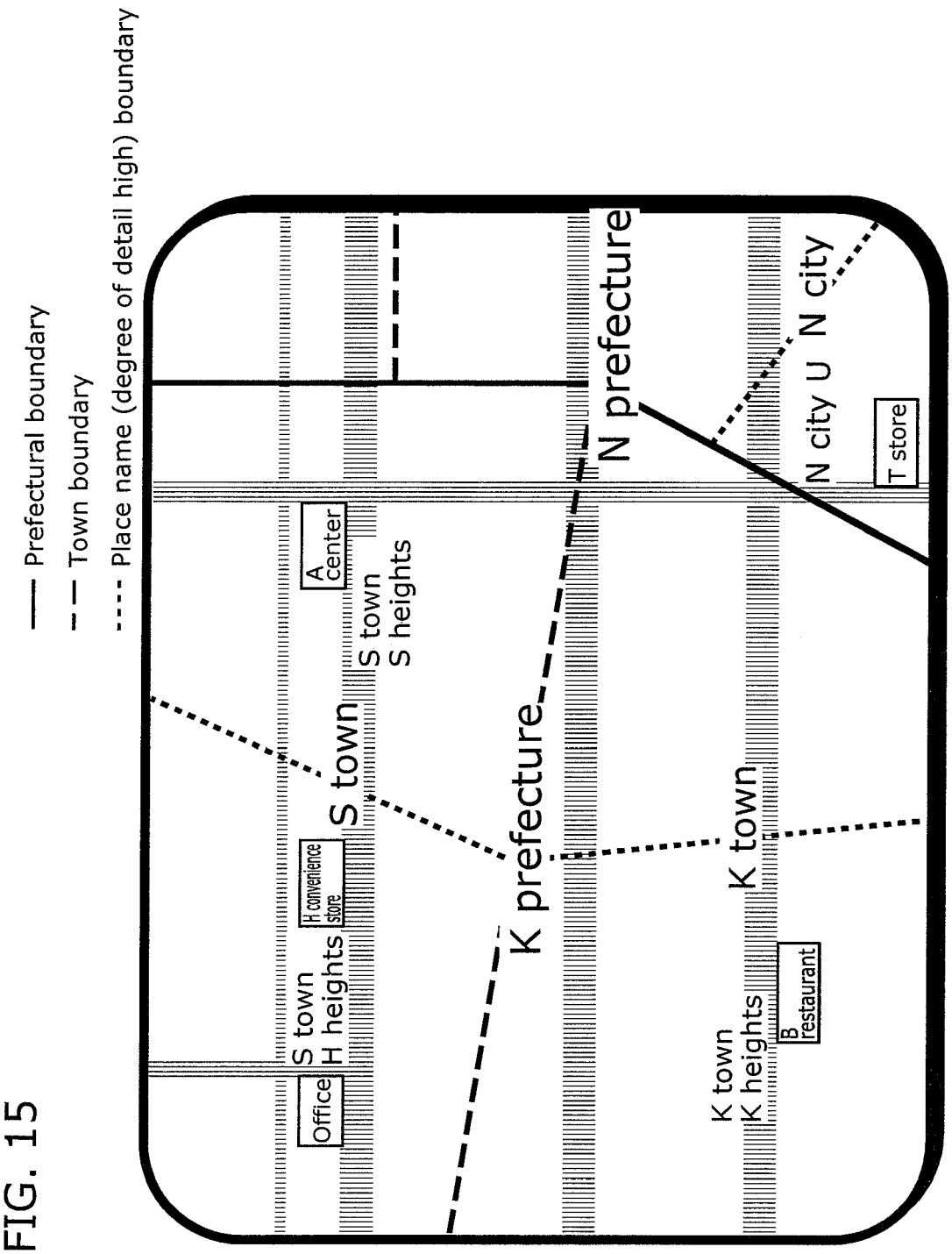
FIG. 15 is a diagram showing an example of a map area indicated by labels.

Consequently, the information regarding all of the predicted destinations can be presented even when the number of the destination name labels to be displayed is limited. Moreover, highly accurate information can be presented because name labels having the highest degree of detail are selected from among the labels which can present the information regarding all of the predicted destinations. A specific example will be described. It is assumed that, as shown in FIG. 15, position areas each indicated by a corresponding one of labels are distributed on a map. When the number of the destinations to be displayed is 3, even assuming that the five predicted destinations, "Office", "H convenience store", "A center", "B restaurant", and "T store", have been obtained as the predicted destinations, using the label "S town" including "Office", "H convenience store", and "A center" allows the three labels, "S town", "B restaurant", and "T store", to indicate the obtained five destinations as shown in FIG. 11(b). Furthermore, this combination is a combination of labels having the highest degree of detail among combinations of three labels including "Office", "H convenience store", "A center", "B restaurant", and "T store".

(Label Selecting Unit in First Modification)

Although the destination names obtained by the destination obtaining unit 103 are specific destination names which have the high degree of detail and are accumulated at the lowest rank in the hierarchical structure, only destination names having a low degree of detail such as place names may be predicted depending on prediction methods. For this reason, destination names to be obtained by the destination obtaining unit 103 may be destination labels other than destination labels at the lowest-rank layer in the hierarchical structure. For example, the destination names may be labels in a middle layer. Here, the second label selecting unit does not perform selection of a label having a degree of detail as high as a degree of detail held by the lowest-layer label, and suspends raising the degree of detail when labels of predicted destinations are just selected. Even when the number of the selected labels falls short of the number to be displayed, a label having a degree of detail higher than a degree of detail held by the labels of the predicted destinations is not selected. This can prevent information regarding the predicted destinations from not being displayed due to too much selection of the label having the high degree of detail.

Figure 16:
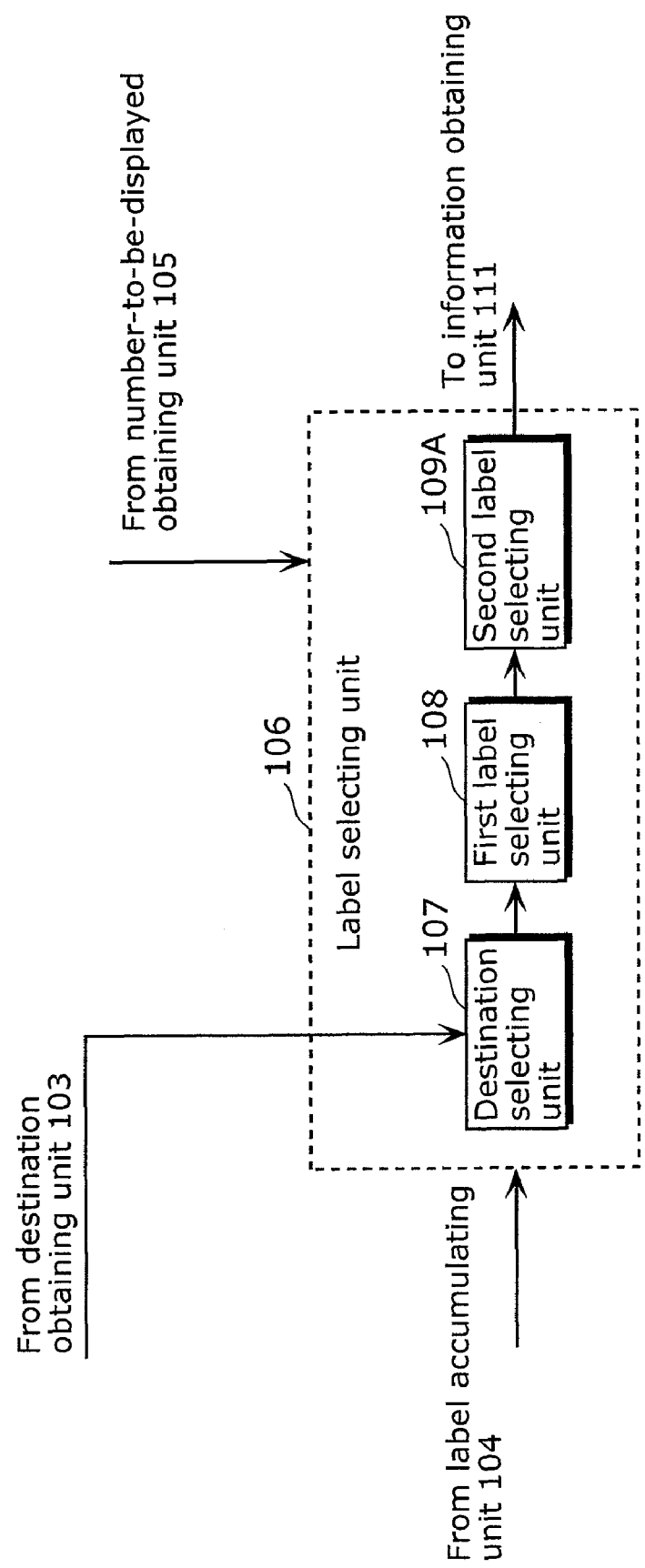
FIG. 16 is a block diagram showing a structure of the label selecting unit.

FIG. 16 is a block diagram showing a structure of a label selecting unit 106 according to the present modification.

The label selecting unit 106 includes: the destination selecting unit 107 which selects, in the label hierarchical structure accumulated in the label accumulating unit 104, the labels of the destinations obtained by the destination obtaining unit 103; the first label selecting unit 108 which selects, instead of the selected labels, labels for which a degree of detail is lowered so that the number of the labels becomes equal to or below the number to be displayed; and a second label selecting unit 109A which selects, instead of the labels selected by the first label selecting unit 108, labels for which a degree of detail is raised. Hereinafter, each of the components will be first described with reference to the drawings, and operations of the present device will be subsequently described. The same numerals are given to the same components as the above embodiment, and description of the components is not repeated.

Figure 17:
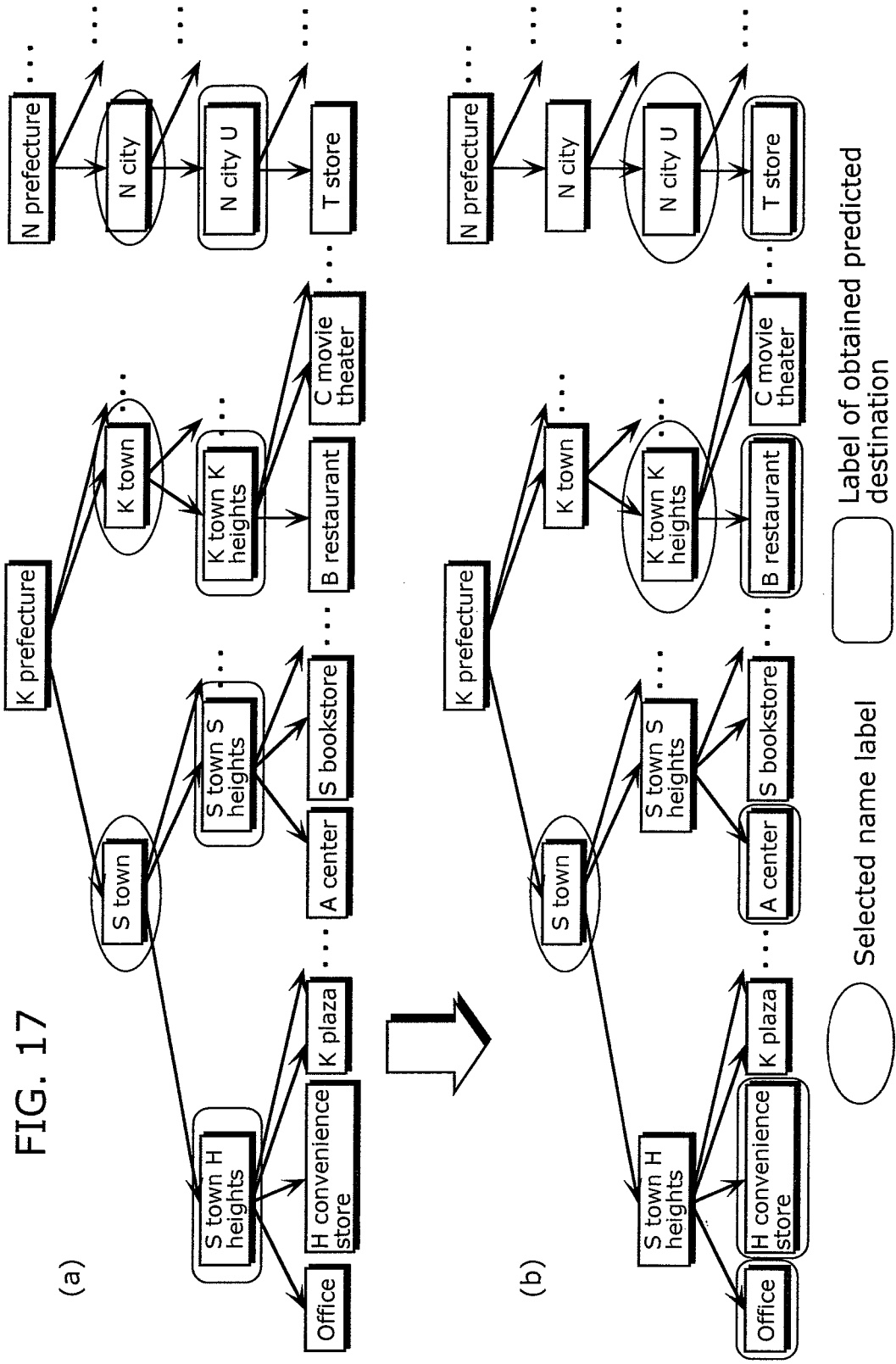
FIG. 17 is a diagram showing an example where the second label selecting unit raises a degree of detail for each selected label.

The second label selecting unit 109A selects, instead of the selected labels, labels having a high degree of detail, while maintaining the number of the predicted destinations that are selected by the destination selecting unit 107 and are indicated by the labels selected by the first label selecting unit 108. However, the second label selecting unit 109A does not select labels having a degree of detail higher than the degree of detail held by the destinations obtained by the destination obtaining unit 103. More specifically, the second label selecting unit 109A selects, in the hierarchical structure accumulated in the label accumulating unit 104, child labels of the selected labels on a one-on-one basis per selected label. Here, when the selection of a child label decreases the number of predicted destinations indicated by a label, the selection of the child label is suspended. When the number of the predicted destinations does not decrease, the second label selecting unit 109A repeatedly selects the child labels until the labels of the predicted destinations are selected. Even when the labels of the predicted destinations are not in the lowest layer and when the selected labels are the labels of the predicted destinations, the selection of the child label is suspended accordingly. The second label selecting unit 109A performs such selection of the child label on all of the labels selected by the first label selecting unit 108. For instance, it is assumed that, as shown in FIG. 17(*a*), the destination selecting unit 107 has selected four labels of predicted destinations, "S town H heights", "S town S heights", "K town K heights", and "N city U", and that the first label selecting unit 108 has selected three labels, "S town", "K town", and "N city". The label "S town" includes two labels of predicted destinations, "S town H heights" and "S town S heights". The selection of any of child labels of the label "S town" decreases the number of the labels of the predicted destinations included in the selected child label. For example, when "S town H heights" is selected, a label of a predicted destination included therein is one label, "S town H heights". As a result, the number of the labels included therein decreases. Thus, the selection of the child label is not performed for "S town" any longer. Next, the label "K town" includes a label of a predicted destination, "K town K heights". Because "K town K heights", which is one of child labels of "K town", includes "K town K heights", selecting "K town K heights" does not affect the number of the labels of the predicted destinations included in "K town K heights". Thus, instead of "K town", "K town K heights" is selected. As "K town K heights" is the label of the predicted destination, the selection of the child label is not performed for "K town K heights" any longer. Finally, as shown in FIG. 17(*b*), the second label selecting unit 109A selects the three labels, "S town", "K town K heights", and "N city U". These labels include all of the obtained four labels of the predicted destinations, "S town H heights", "S town S heights", "K town K heights", and "N city U".

Figure 18:
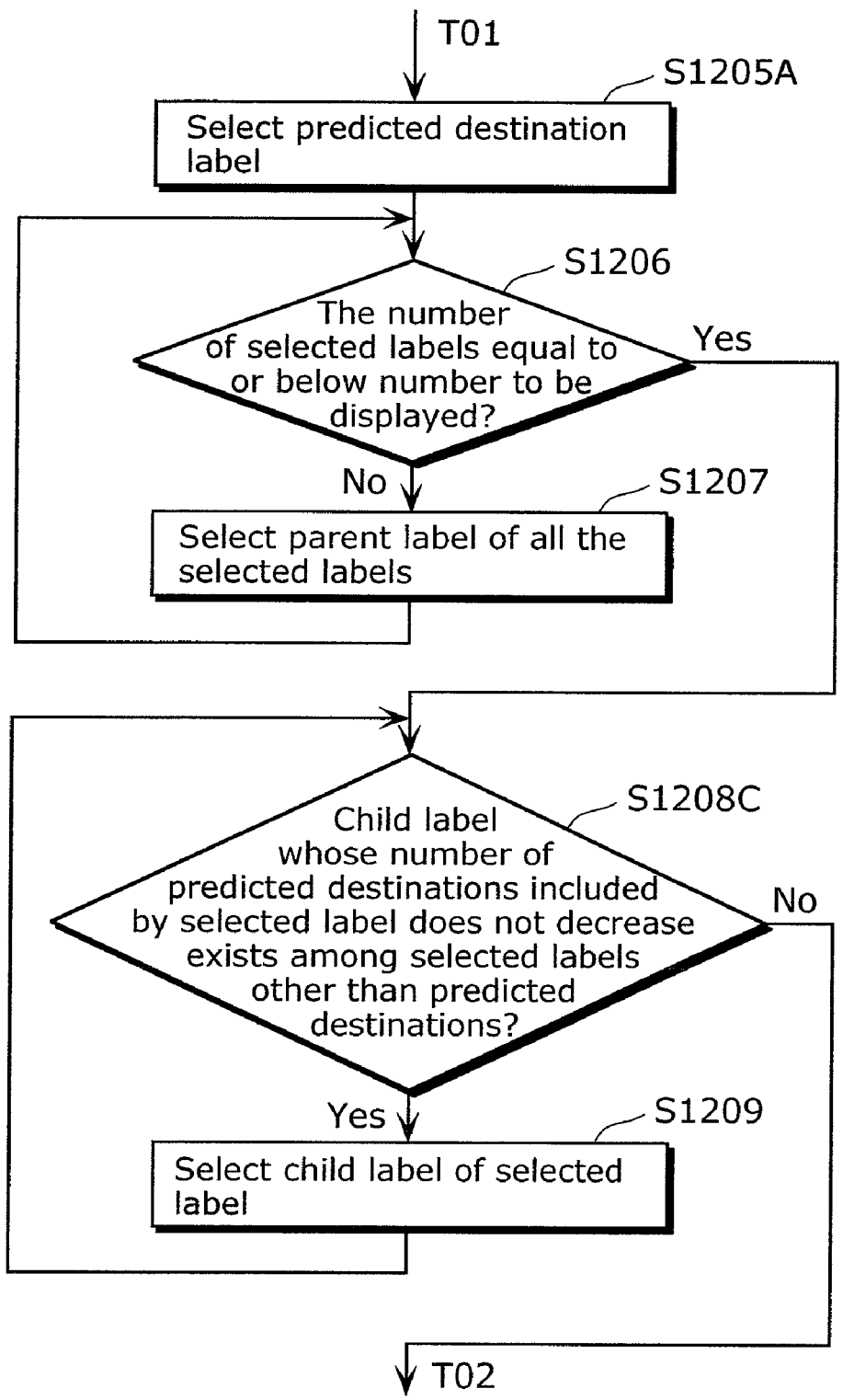
FIG. 18 is a flow chart showing an example of operations of the label selecting unit in a first modification.

Hereinafter, label selection operations (S1205) performed by the label selecting unit 106 according to the present modification will be described with reference to FIG. 18.

As with the above embodiment, when the number of the selected labels is equal to or below a number to be displayed (Yes in Step S1206), the second label selecting unit 109A determines whether a selected label including a child label whose number of destinations does not decrease exists among selected labels other than the labels of predicted destinations (Step S1208). When the selected label exists, the flow advances to Step S1209 (Yes in Step S1208C). When the selected label does not exist, the flow advances to Step S1211 in FIG. 12 (No in Step S1208C). Steps following the above are the same as the above embodiment.

(Label Selecting Unit in Second Modification)

In the above embodiment, after the first label selecting unit 108 raises a degree of detail for all of the labels, the second label selecting unit 109 lowers the degree of detail for labels, each of which the degree of detail can be lowered for. Instead, the second label selecting unit 109 may not be included, and when the first label selecting unit 108 selects labels having a low degree of detail, the labels having the low degree of detail may be selected only in the case where predicted destinations can be combined.

Figure 19:
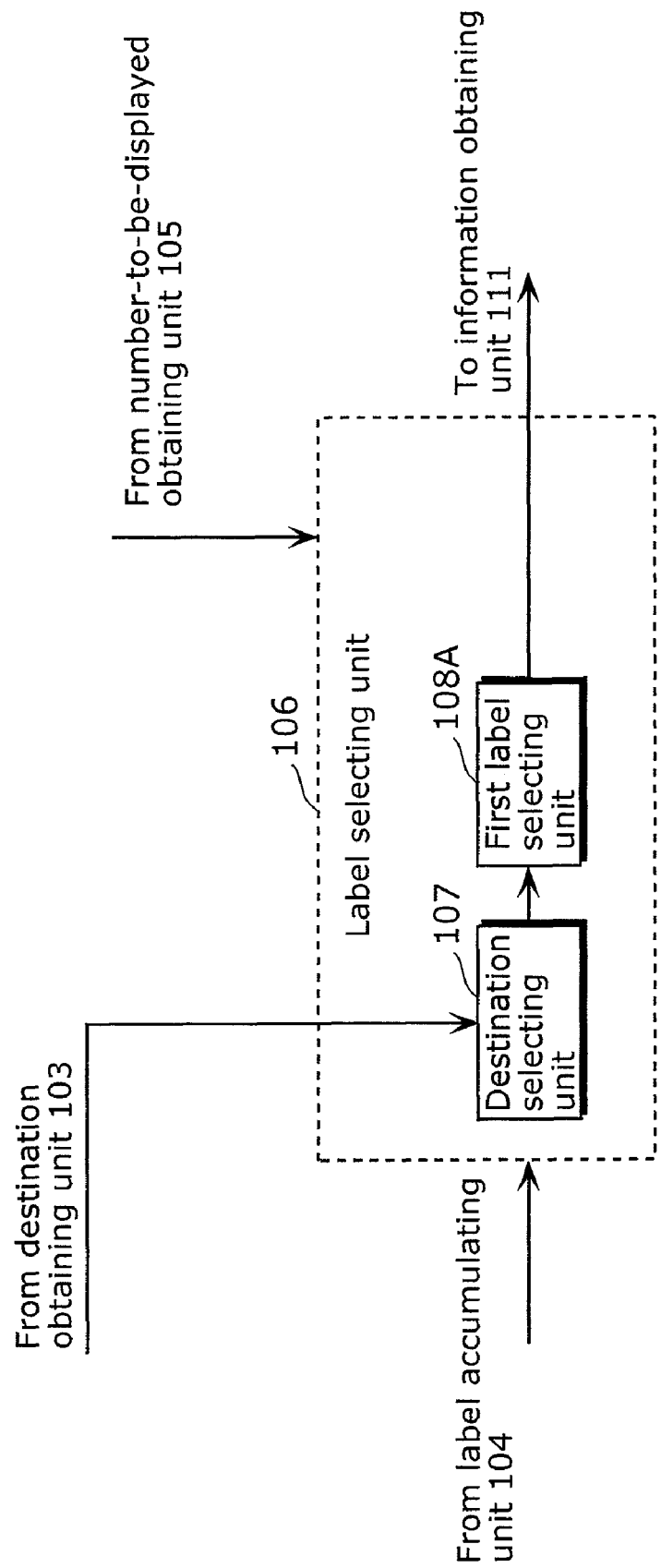
FIG. 19 is a block diagram showing a structure of the label selecting unit.

FIG. 19 is a block diagram showing a structure of a label selecting unit 106 according to the present modification.

The label selecting unit 106 includes: the destination selecting unit 107 which selects, in the label hierarchical structure accumulated in the label accumulating unit 104, the labels of the destinations obtained by the destination obtaining unit 103; and a first label selecting unit 108A which selects, instead of the selected labels, labels for which a degree of detail is lowered so that the number of the labels becomes equal to or below the number to be displayed. Hereinafter, each of the components will be first described with reference to the drawings, and operations of the present apparatus will be subsequently described. The same numerals are given to the same components as the above embodiment, and description of the components is not repeated.

Figure 20:
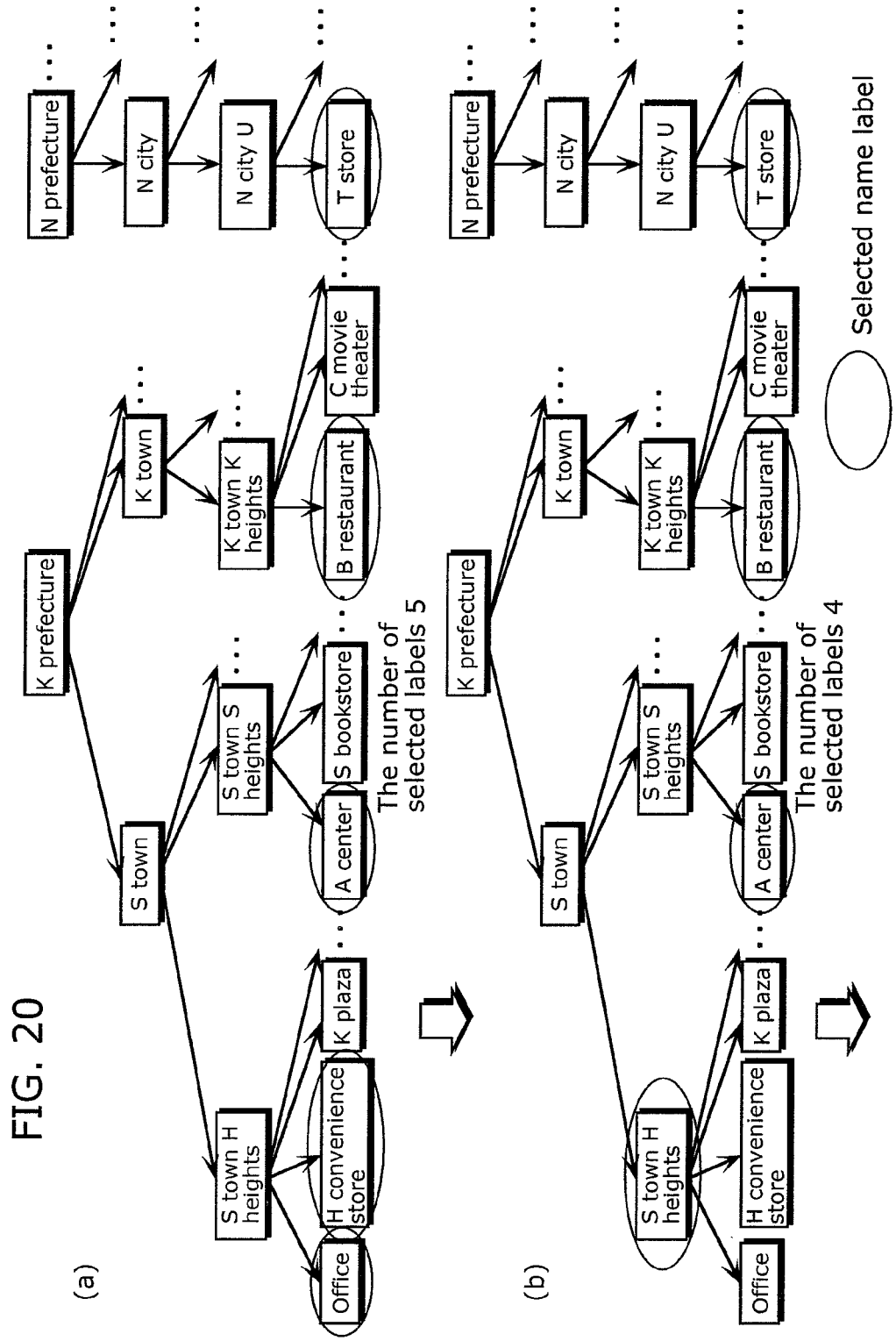
FIG. 20 is a diagram showing an example where the first label selecting unit selects labels having a low degree of detail.
Figure 21:
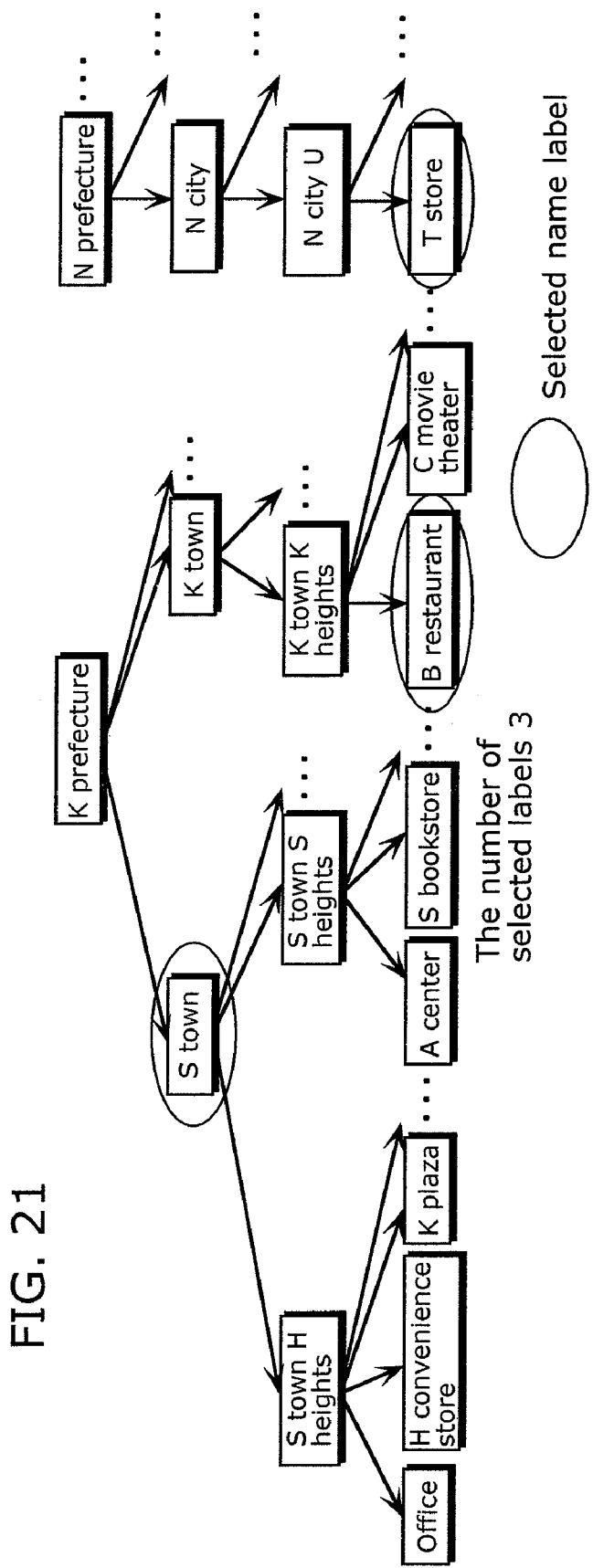
FIG. 21 is a diagram showing an example where the first label selecting unit selects the labels having the low degree of detail.

The first label selecting unit 108A selects, instead of currently selected labels, higher-rank labels, only when the number of labels of predicted destinations included in the selected labels increases when the first label selecting unit 108A selects, instead of the currently selected labels, a higher-rank label for each label. The higher-rank label is a label including one or more labels of predicted destinations as descendants such as a parent label of the one or more labels of the predicted destinations and a parent label of one or more parent labels. The rank of the higher-rank label is elevated until the number of the selected labels becomes equal to or below the number to be displayed. The rank is elevated from a parent label of predicted destinations, as an initial higher-rank label, to a parent label of parent labels of predicted destinations, and to a parent label of parent labels of the parent labels of predicted destinations. For example, as shown in FIG. 20(*a*), it is assumed that the label accumulating unit 104 has accumulated a hierarchical structure, that the destination selecting unit 107 has selected five labels, "Office", "H convenience store", "A center", "B restaurant", and "T store", and that a number to be displayed obtained by the number-to-be-displayed obtaining unit 105 is "3". In this case, since the number of the selected labels "5" exceeds the number to be displayed "3", the first label selecting unit 108A selects respective parent labels of each selected label. As shown in FIG. 20(*b*), selecting, instead of "Office" and "H convenience store", "S town H heights", a parent common to "Office" and "H convenience store", increases the number of predicted destinations indicated by each selected label from "1" (Office or H convenience store) to "2" (Office and H convenience store). Thus, the first label selecting unit 108A selects, instead of "Office" and "H convenience store", "S town H heights". Furthermore, because the number of predicted destinations indicated by "S town S heights" is "1" (A center) and is not changed even when "S town S heights", a parent of "A center", is selected, "S town S heights" is not selected. Likewise, because the number of predicted destinations is "1" and is not changed even when "K town K heights", a parent of "B restaurant", and "N city U", a parent of "T store", are selected, "K town K heights" and "N city U" are not selected. Thus, the first label selecting unit 108A selects the four labels, "S town H heights", "A center", "B restaurant", and "T store". Because the number of the selected labels exceeds the number to be displayed "3", the first label selecting unit 108A performs, in the same manner, selection for a parent of parent labels of predicted destinations. Selecting, instead of "S town H heights" (the number of the predicted destinations "2") and "A center" (the number of the predicted destinations "1"), "S town" (the number of the predicted destinations "3"), a parent of the parents of "Office", "H convenience store", and "A center" increases the number of the predicted destinations indicated by "S town". For this reason, the first label selecting unit 108A selects the label "S town". "K town", a parent of a parent of "B restaurant", and "N city", a parent of a parent of "T store", are not selected because selecting "K town" and "N city" does not affect the number of predicted destinations. Thus, as shown in FIG. 21, the first label selecting unit 108A selects the three labels, "S town", "B restaurant", and "T store". The first label selecting unit 108A terminates the label selection because the number of the selected labels does not exceed the number to be displayed 3.

Accordingly, the label selecting unit 106 can satisfy a condition that the labels indicating all of the predicted destinations are selected, and select, starting from lower-rank labels having a possible high degree of detail, labels in number equal to or below the number to be displayed.

Figure 22:
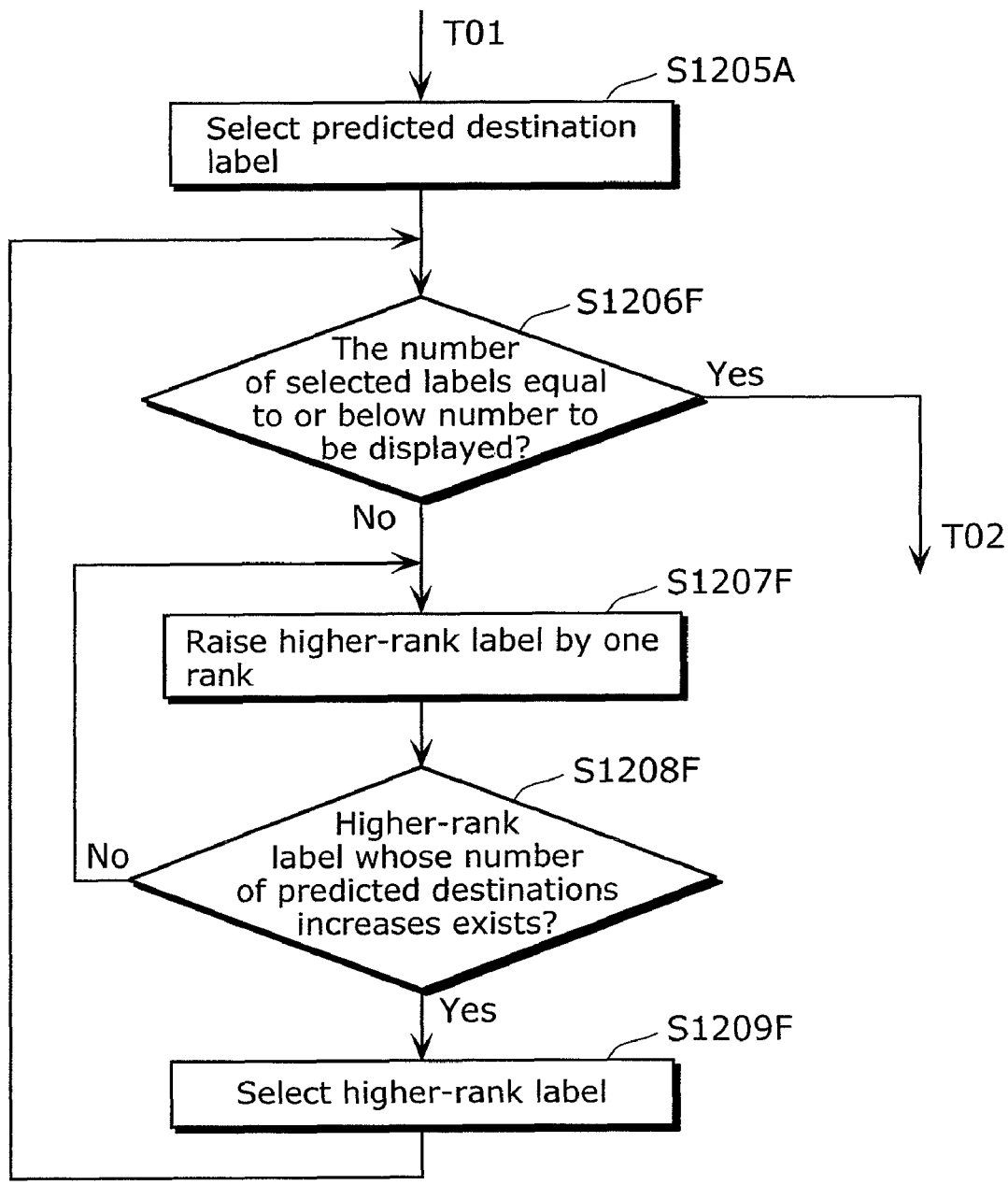
FIG. 22 is a flow chart showing an example of operations of the label selecting unit in a second modification.

Hereinafter, label selection operations (S1205) performed by the label selecting unit 106 according to the present modification will be described with reference to FIG. 22.

When the number-to-be-displayed obtaining unit 105 obtains the number of destination name labels to be displayed (Step S1204 in FIG. 12), the destination selecting unit 107 selects, in the label hierarchical structure accumulated in the label accumulating unit 104, all of the destinations obtained by the destination obtaining unit 103 (Step S1205A). The first label selecting unit 108A determines whether the number of the labels selected by the destination selecting unit 107 is equal to or below the number to be displayed obtained by the number-to-be-displayed obtaining unit 105 (Step S1206F). When the number of the selected labels is equal to or below the number to be displayed, the flow advances to Step S1211 in FIG. 12 (Yes in Step S1206F). When the number of the selected labels exceeds the number to be displayed, the flow advances to Step S1207F (No in Step S1206). When the number of the selected labels exceeds the number to be displayed, the first label selecting unit 108A raises the rank of a higher-rank label to be selected by one rank. Initially, higher-rank labels are parent labels of predicted destinations (Step S1207F). The first label selecting unit 108A determines whether a higher-rank label whose number of predicted destinations indicated by the higher-rank label increases exists among the higher-rank labels (Step S1208F). When the higher-rank label exists, the flow advances to Step S1209F (Yes in Step S1208). When the higher-rank label does not exist, the flow returns to Step S1207F (No in Step S1208). When the higher-rank label whose number of the destinations indicated by the higher-rank label increases exists, the first label selecting unit 108A selects, instead of a selected label, the higher-rank label whose number of the destinations indicated by the higher-rank label increases (Step S1209F). The flow returns to Step S1206F. Steps following the above are the same as the flow in the first embodiment.

(Label Selecting Unit in Third Modification)

In the above embodiment and the first and second modifications of the label selecting unit, the first label selecting unit uniformly selects the parent label for the label which the degree of detail can be lowered for. However, some of labels benefit from lowering the degree of detail more than other labels. Thus, instead of uniformly lowering the degree of detail, the degree of detail may be lowered preferentially for such labels.

For instance, the greater a distance from a present location to a destination is, the lower accuracy of the value of display information may be and the wider a range of the value of the display information may be. In other words, labels having a low degree of detail may suffice. For example, in the case of arrival times, when the label "S town" displays an arrival time "17:21 to 17:31", a time difference in display information "17:21 to 17:31" is 10 minutes (17:31–17:21). Here, when the distance from the present location to the destination is small, a required time to the destination is shortened. When it is assumed that the distance from the present location to the destination is small and the current time is "17:20", the arrival time information "17:21 to 17:31" is not useful because the time difference is too large. As stated above, the smaller the distance from the present location to the destination is, the less useful the information having the low accuracy of the value of the display information is. On the other hand, the greater the distance to the destination is, the longer the required time is, and even information having a wide range of arrival time becomes information useful to a user. For instance, when it is assumed that a distance from a present location to a destination is great and the current time is "16:20", although a time difference in arrival time information "17:21 to 17:31" for the label "S town" is 10 minutes, the arrival time information is relatively useful because a required time to the destination is large. As described above, the greater the distance from the present location to the destination is, the less a disadvantage of using the labels having the low degree of detail is.

Figure 23:
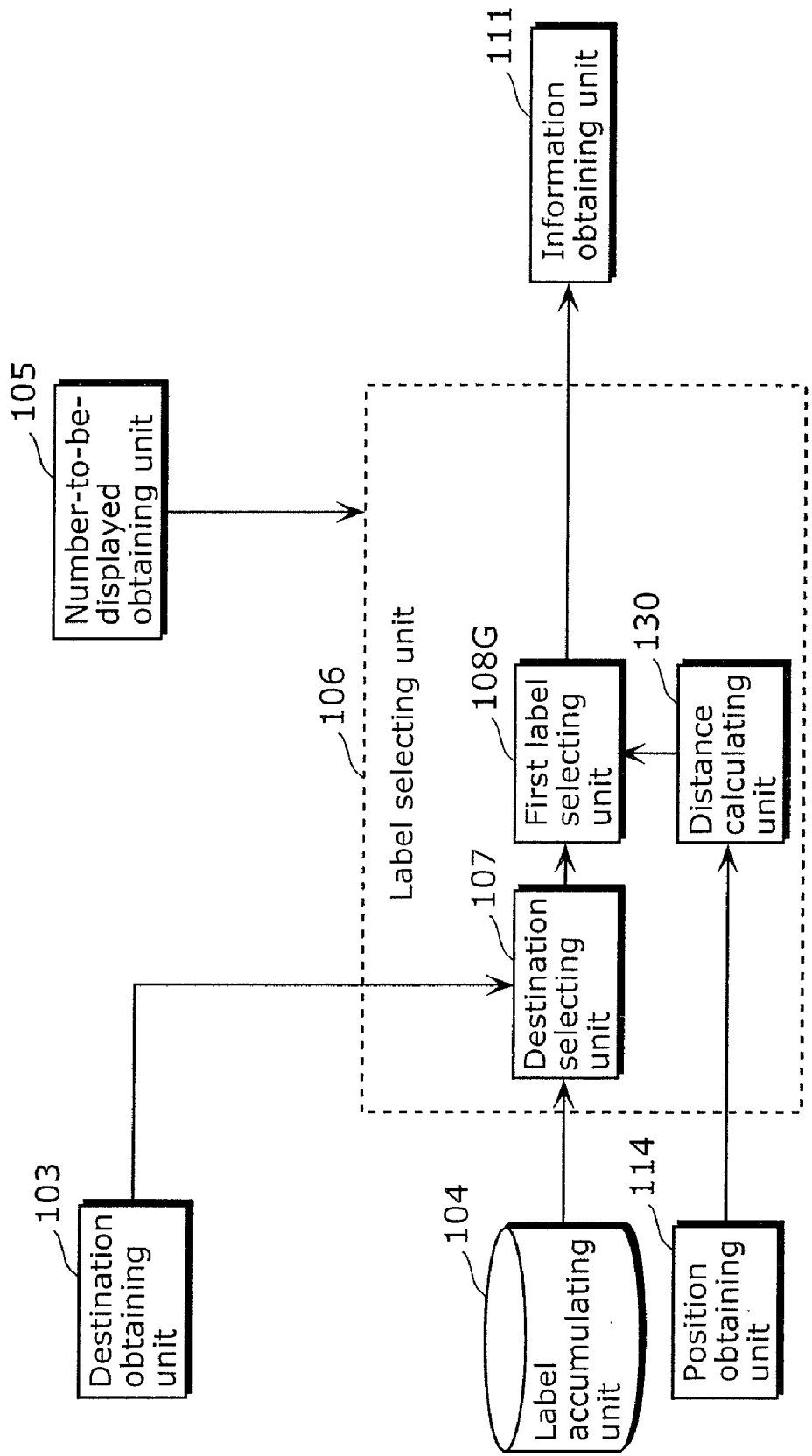
FIG. 23 is a block diagram showing a structure of the label selecting unit.

FIG. 23 is a block diagram showing a structure of a label selecting unit 106 according to the present modification.

The label selecting unit 106 includes: a distance calculating unit 130 which calculates distances from the current position of the mobile terminal obtained by the position obtaining unit 114 to the destinations obtained by the destination obtaining unit 103; the destination selecting unit 107 which selects, in the label hierarchical structure accumulated in the label accumulating unit 104, the labels of the destinations obtained by the destination obtaining unit 103; and a first label selecting unit 108G which selects, instead of selected labels, labels for which a degree of detail is lowered until the number of the labels becomes equal to or below a number to be displayed. Hereinafter, each of the components will be first described with reference to the drawings, and operations of the present apparatus will be subsequently described. The same numerals are given to the same components as the above embodiment, and description of the components is not repeated.

The distance calculating unit 130 calculates a distance from the current position of the mobile terminal obtained by the position obtaining unit 114 to each of the destinations obtained by the destination obtaining unit 103. For example, the distance calculating unit 130 calculates a linear distance from the current position to the destination.

Figure 24:
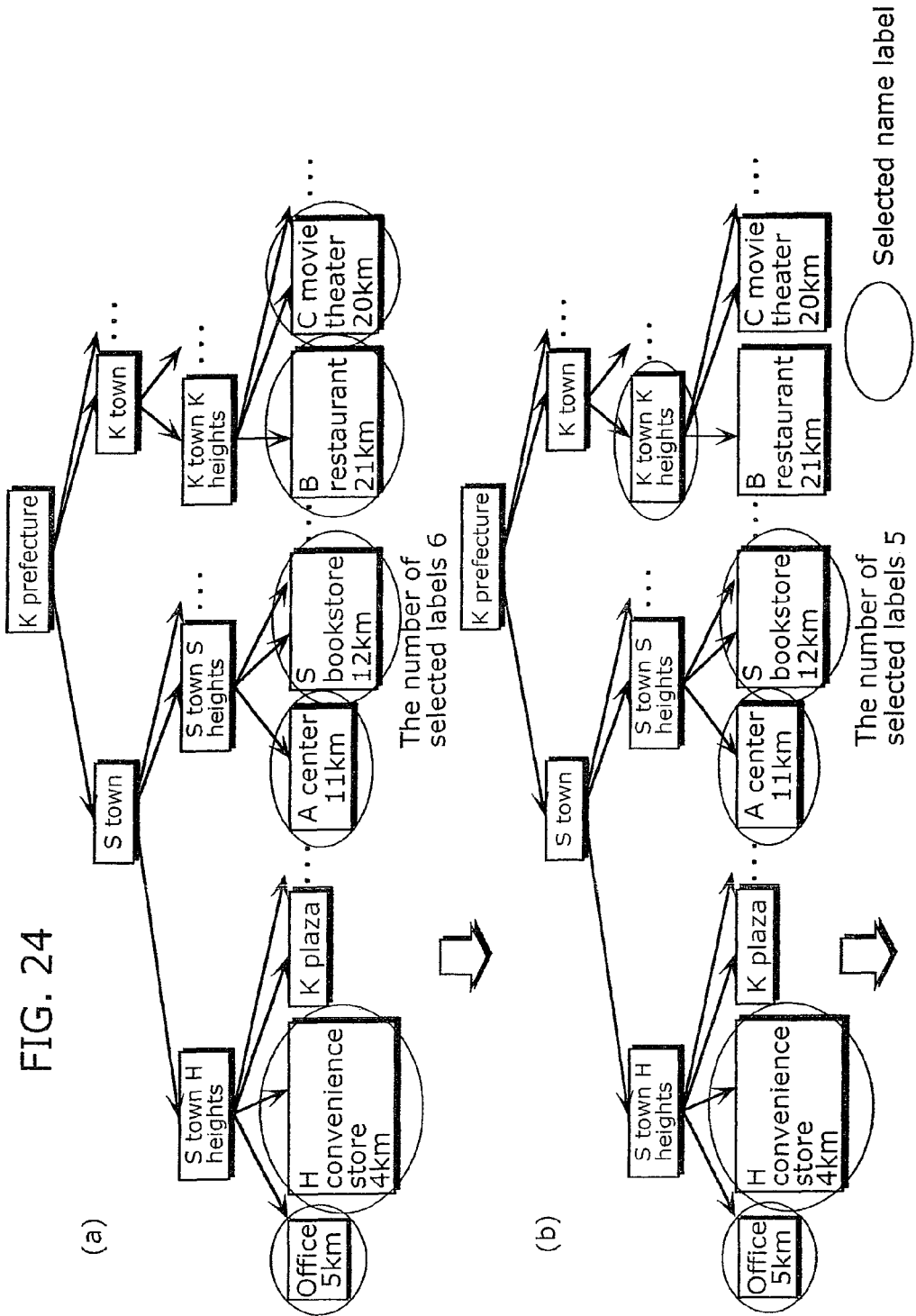
FIG. 24 is a diagram showing an example where the first label selecting unit selects labels having a low degree of detail.
Figure 25:
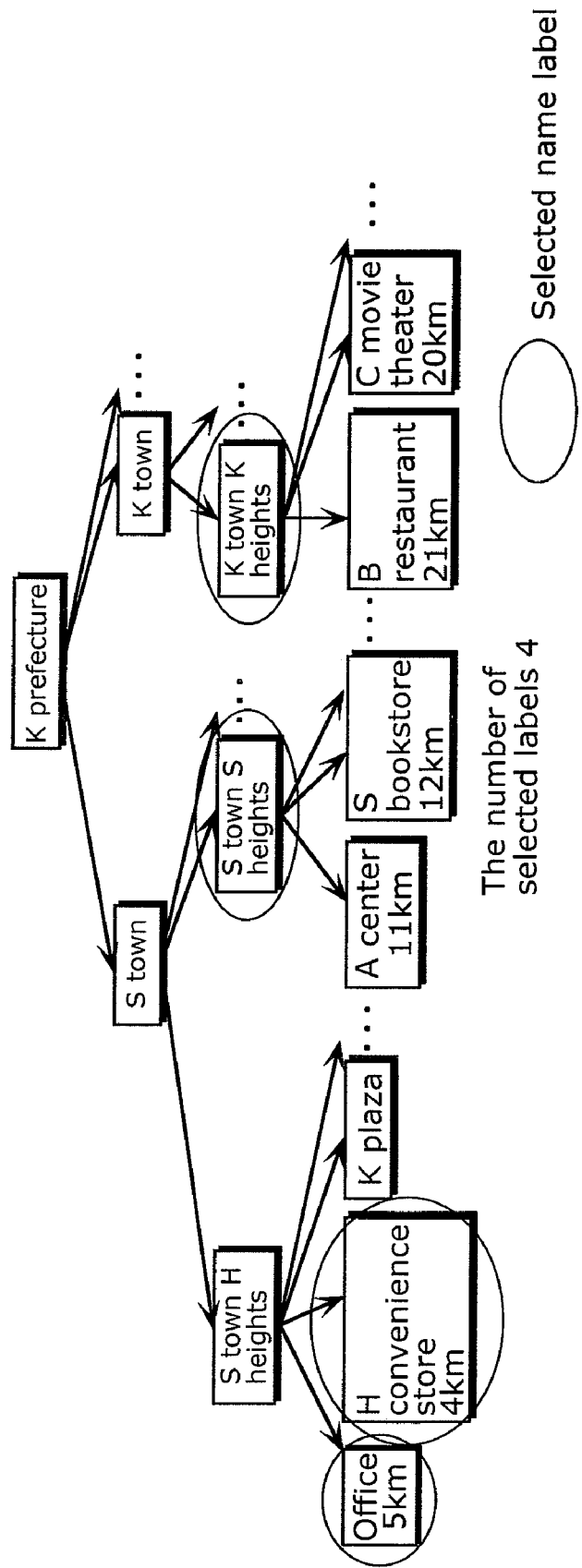
FIG. 25 is a diagram showing an example where the first label selecting unit selects the labels having the low degree of detail.

The first label selecting unit 108G selects, instead of currently selected labels, one or more higher-rank labels, only when the number of labels of predicted destinations, which are included in the selected labels, increases when the first label selecting unit 108G selects, instead of the currently selected labels, a higher-rank label for each label. Here, the first label selecting unit 108G selects the higher-rank labels in descending order of a distance to a destination indicated by a label, the distance to the destination being calculated by the distance calculating unit 130. When the number of the selected labels becomes equal to or below the number to be displayed while the first label selecting unit 108G is performing the selection in the order, the first label selecting unit 108G suspends the higher-rank label selection. For example, as shown in FIG. 24(a), it is assumed that the label accumulating unit 104 has accumulated a hierarchical structure and that the destination selecting unit 107 has selected six labels, "Office", "H convenience store", "A center", "S bookstore", "B restaurant", and "C movie theater". In addition, it is assumed that distances from a present location to the destinations are "5 km", "4 km", "11 km", "12 km", "21 km", and "20 km", respectively, and that a number to be displayed, which the number-to-be-displayed obtaining unit 105 obtained, is "4". In this case, since the number of the selected labels "6" exceeds the number to be displayed "4", the first label selecting unit 108G selects one or more parent labels of the selected labels in descending order of a distance to a destination indicated by a label. In an example shown in FIG. 24(a), among the labels, "Office" (5 km), "H convenience store" (4 km), "A center" (11 km), "S bookstore" (12 km), "B restaurant" (21 km), and "C movie theater" (20 km), a label indicating a destination to which a distance is the longest is "B restaurant" (21 km). Selecting "K town K heights", a parent of "B restaurant", increases the number of the destinations indicated by "K town K heights" because "K town K heights" is a parent common to the selected labels, "B restaurant" and "C movie theater". Thus, as shown in FIG. 24(b), the first label selecting unit 108G selects, instead of "B restaurant" and "C movie theater", "K town K heights". Here, the first label selecting unit 108G performs, in descending order of a distance, the parent label selection on the remaining labels, that is, the lowest-rank labels among the selected labels because the number of the selected labels 5 exceeds the number to be displayed "4". The remaining labels are "Office" (5 km), "H convenience store" (4 km), "A center" (11 km), and "S bookstore" (12 km). Among these, a label indicating the largest distance is "S bookstore" (12 km). Selecting "S town S heights", a parent of "S bookstore", increases the number of the destinations indicated by "S town S heights" because "S town S heights" is a parent common to the selected labels "S bookstore" and "A center". Thus, the first label selecting unit 108G selects, instead of "S bookstore" and "A center", "S town S heights". Here, as shown in FIG. 25, the selected labels are "Office", "H convenience store", "S town S heights", and "K town K heights", and the number of the selected labels is 4. The first label selecting unit 108G terminates the label selection because the number of the selected labels does not exceed the number to be displayed 4.

With this, a degree of detail can be lowered for destinations in sequence, starting from a distant predicted destination for which the accuracy of display information may be low.

Furthermore, when a distance to a destination changes, reperforming the label selection changes the display content of a label as a distance between a vehicle and the destination is increasingly getting smaller. To put it differently, a label having a high degree of detail will be displayed.

Figure 26:
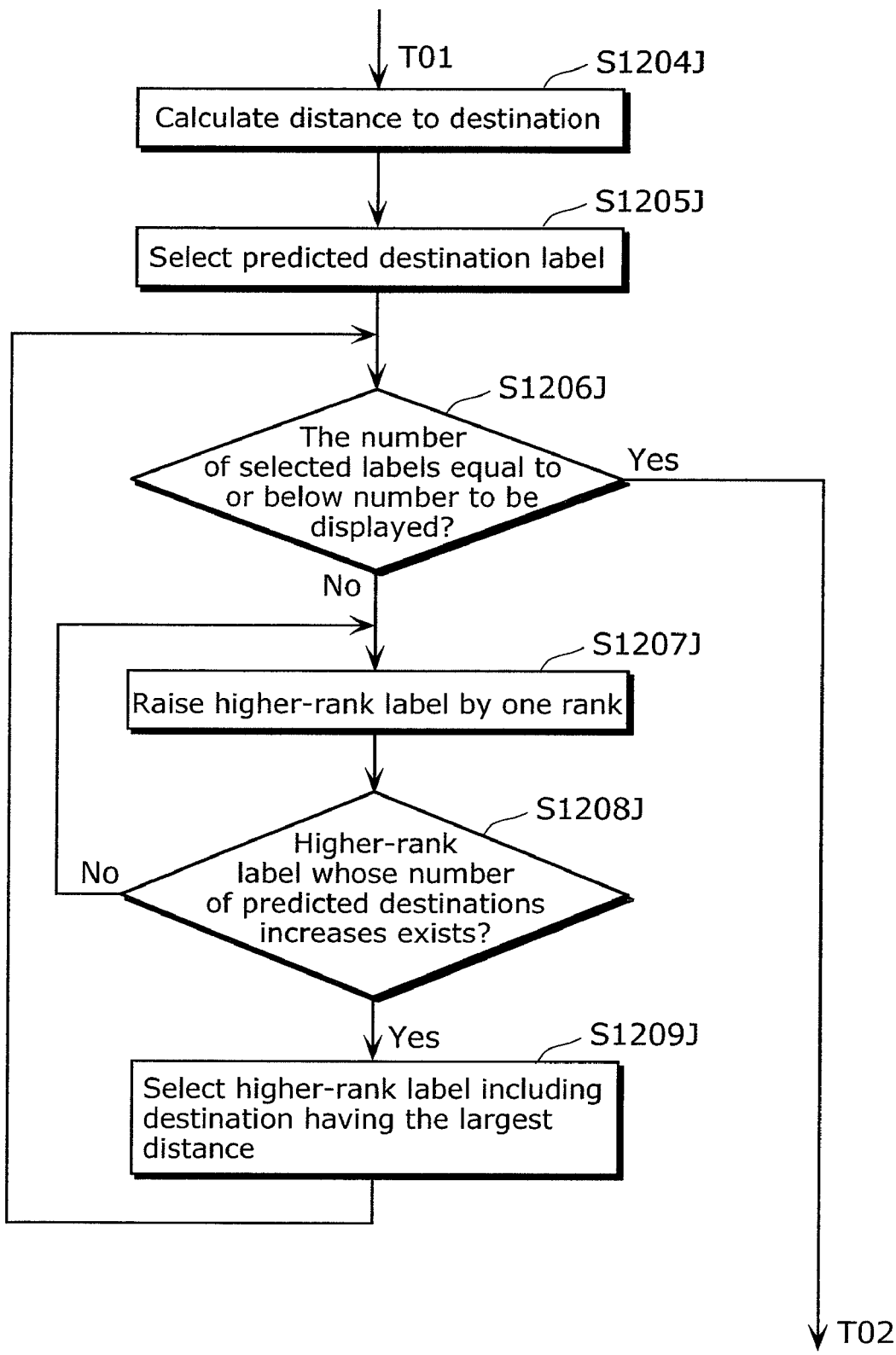
FIG. 26 is a flow chart showing an example of operations of the label selecting unit in a third modification.

Hereinafter, label selection operations (S1205) performed by the label selecting unit 106 according to the present modification will be described with reference to FIG. 26.

When the number-to-be-displayed obtaining unit 105 obtains the number of destination name labels to be displayed (Step S1204 in FIG. 12), the distance calculating unit 130 calculates a distance from the current position of the mobile terminal obtained by the position obtaining unit 114 to each destination obtained by the destination obtaining unit 103 (Step S1204J). The destination selecting unit 107 selects, in the label hierarchical structure accumulated in the label accumulating unit 104, all of the destinations obtained by the destination obtaining unit 103 (Step S12053). The first label selecting unit 108G determines whether the number of the labels selected by the destination selecting unit 107 is equal to or below the number to be displayed obtained by the number-to-be-displayed obtaining unit 105 (Step S1206J). When the number of the selected labels is equal to or below the number to be displayed, the flow advances to Step S1211 in FIG. 12 (Yes in Step S1206). When the number of the selected labels exceeds the number to be displayed, the flow advances to Step S12073 (No in Step S1206J). When the number of the selected labels exceeds the number to be displayed, the first label selecting unit 108G raises the rank of a higher-rank label to be selected by one rank. The first label selecting unit 108G initially makes the higher-rank label a parent label of one or more predicted destinations (Step S1207J). The first label selecting unit 108G determines whether a higher-rank label whose number of predicted destinations indicated by the higher-rank label increases exists among higher-rank labels (Step S1208J). When the higher-rank label exists, the flow advances to Step S1209J (Yes in Step S1208J). When the higher-rank label does not exist, the flow returns to Step S1207J (No in Step S1208J). When the higher-rank label whose number of the predicted destinations indicated by the higher-rank label increases exists, the first label selecting unit 108G selects, instead of a label indicating a destination to which a distance is the largest, the higher-rank label (Step S1209J), and the flow return to Step S1208J. Steps following the above are the same as the flow in the first embodiment.

(Label Selecting Unit in Fourth Modification)

It is to be noted that name labels of predicted destinations may be name labels registered by a user, such as "Home" registered by the user, and may be name labels of destinations to which a terminal automatically assigns names of facilities, highly likely destinations determined based on the position of a past destination, which the terminal retrieves from map information. In particular, when the terminal automatically assigns names to destinations, the terminal may fail in the assignment, and the user may find it difficult to understand the names. Stated differently, although the user went to "A convenience store" in the past, the terminal may mistake that the user went to "B hotel". In this case, although "A convenience store" should be actually predicted as a predicted destination, a destination name label "B hotel" is likely to be predicted. In such a case, instead of using a facility name label "B hotel", when a place name label for which a degree of detail is lowered is used, the user is highly likely to understand it. Accordingly, a first label selecting unit may place priority on one or more labels other than name labels registered by the user in selecting a parent of the labels. In other words, labels having low reliability of predicted destination names are preferentially selected instead of labels having a low degree of detail. This is particularly effective for a system where methods for naming labels of destinations are mixed such that label names of destinations are registered by the user and the system automatically assigns, as label names, names of facilities and places closest to a position of a destination.

Figure 27:
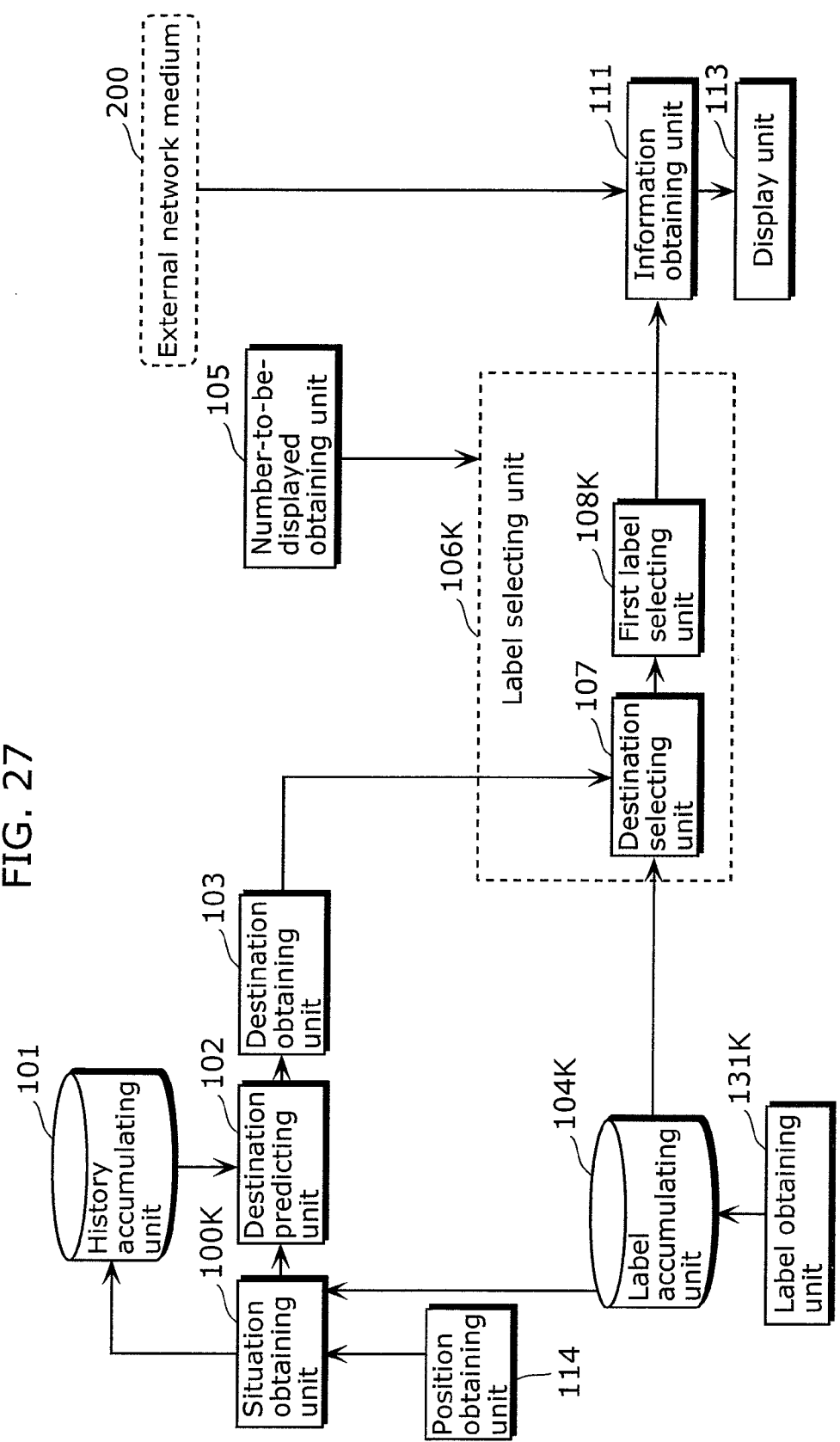
FIG. 27 is a block diagram showing a structure of the destination display apparatus in a fourth modification where the label selecting unit is modified.

FIG. 27 is a block diagram showing a structure of a destination display apparatus according to the present modification.

As shown in FIG. 27, the destination display apparatus according to the present modification includes: a label obtaining unit 131K which obtains a label name for a position inputted by a user and accumulates the label name in a label accumulating unit 104K; a position obtaining unit 114 which obtains a position of a present location of a mobile terminal; a situation obtaining unit 100K which obtains a current situation of the mobile terminal; a history accumulating unit 101 which accumulates the current situation and a destination history; a destination predicting unit 102 which predicts destinations; and a destination obtaining unit 103 which obtains the predicted destinations. The destination display apparatus further includes: a label accumulating unit 104K which accumulates a name label in a hierarchical structure including parent-child relationships between name labels, together with a position area on a map indicated by the name label; a number-to-be-displayed obtaining unit 105 which obtains the number of name labels to be displayed on a mobile terminal; a label selecting unit 106K which selects a label to be displayed; an information obtaining unit 111 which obtains information from an external network medium 200; and a display unit 113 which displays the selected label and the obtained information. Moreover, the label selecting unit 106K includes a destination selecting unit 107 and a first label selecting unit 108K.

Hereinafter, each of the components will be first described with reference to the drawings, and operations of the present apparatus will be subsequently described. The same numerals are given to the same components as the above embodiment, and description of the components is not repeated.

The situation obtaining unit 100K obtains the current situation of a mobile terminal using the current position of the mobile terminal which is obtained by the position obtaining unit 114. A situation indicates, for instance, a place (departure place) from which the mobile terminal has departed in a current movement. In the case of a vehicle, the departure place is, for example, a place where an engine of the vehicle is recently turned on. Furthermore, when the mobile terminal arrives at a destination, the situation obtaining unit 100K obtains a position and a name of the destination as the destination. A destination is, for instance, a place where the engine is turned off. A destination name is a label name of a label indicating a position closest to the position of a destination among the lowest-layer labels accumulated by the label accumulating unit 104K.

Figure 28:
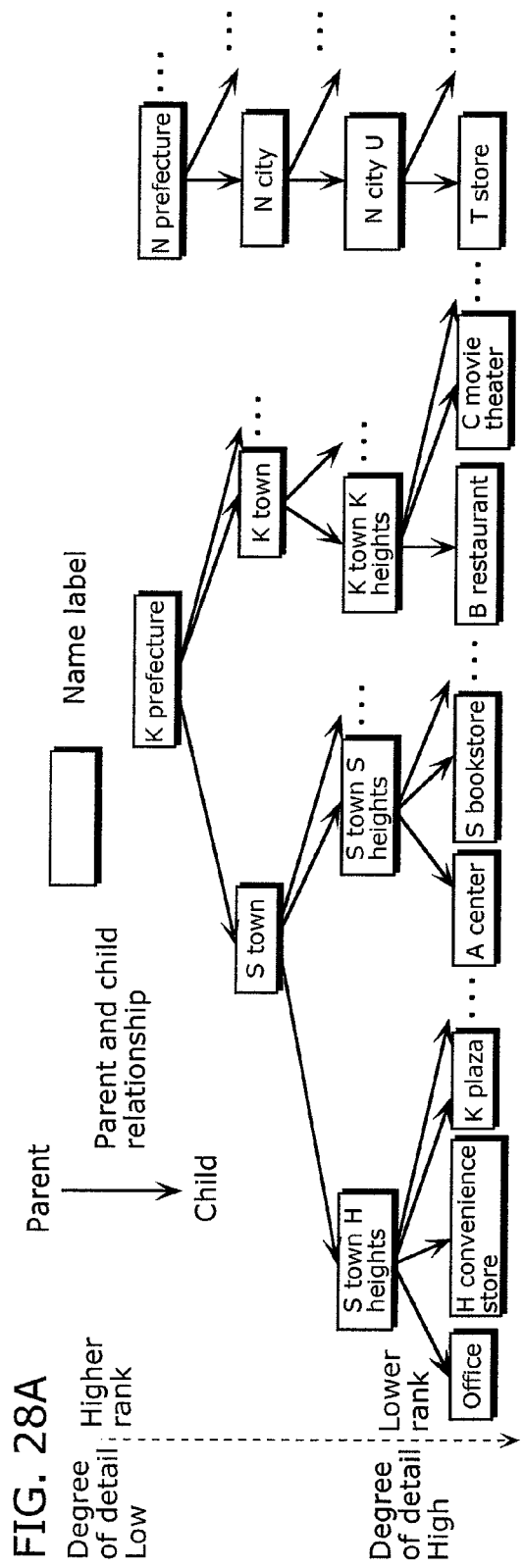
FIG. 28A is a diagram showing an example of a label hierarchical structure accumulated in the label accumulating unit.
FIG. 28B is a diagram showing an example of the label hierarchical structure accumulated in the label accumulating unit.
FIG. 28C is a diagram showing an example of the label hierarchical structure accumulated in the label accumulating unit.
FIG. 28D is a diagram showing an example of the label hierarchical structure accumulated in the label accumulating unit.

As shown in FIG. 28A, the label accumulating unit 104K accumulates name data in a hierarchical structure including parent-child relationships between name labels, together with position area information on a map indicated by each label. Moreover, the label accumulating unit 104K accumulates a flag indicating whether or not a label name decider is the user for each of the lowest-layer labels. For instance, as shown in FIG. 28B, the label accumulating unit 104K accumulates, for the lowest-layer label "Office", information such as a label name "Office", a position area on a map "Latitude: 34. 5. 3. 6, Longitude: 134. 4. 0. 9", and a label name decider "User". Furthermore, as shown in FIG. 28C, the label accumulating unit 104K accumulates, for the lowest-layer label "H convenience store", information such as a label name "H convenience store", a position area on a map "Latitude: 34. 5. 30. 6, Longitude: 134. 4. 20. 9", and a label name decider "Other than user". In addition, as shown in FIG. 28D, the label accumulating unit 104K accumulates, for a non-lowest-layer label "S town H heights", information such as a label name "S town H heights" and a position area on a map "Latitude: 34. 5. 2. 0 to 34. 5. 40. 0, Longitude: 134. 4. 0. 0 to 134. 4. 30. 0". A descendant of "S town H heights" is the label "Office" because the position area of "S town H heights" includes the position area of "Office". Here, "S town H heights" (parent) and "Office" (child) are in the parent-child relationship.

Figure 29:
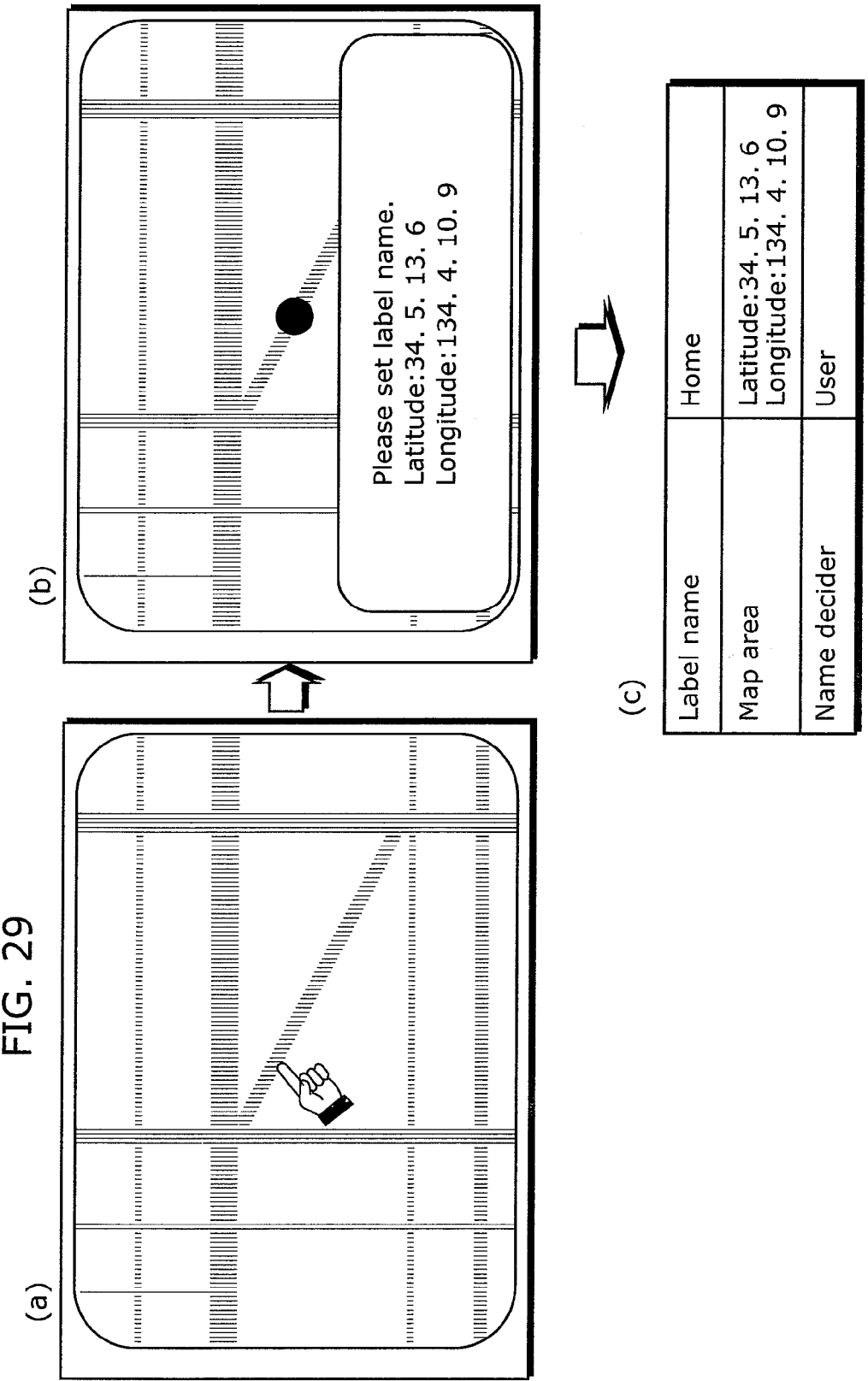
FIG. 29 is a diagram showing an example where a user inputs a label name.
Figure 30:
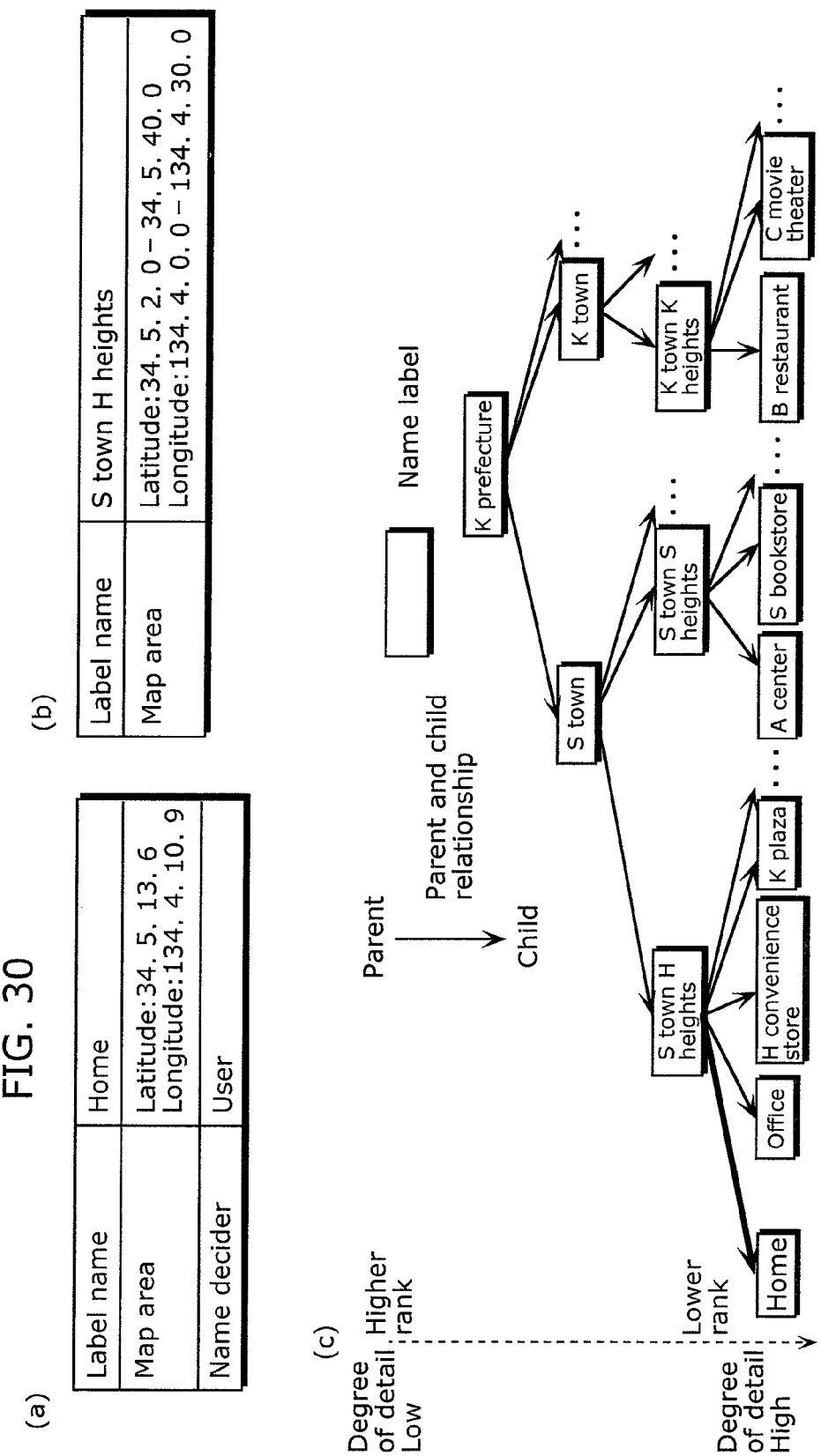
FIG. 30 is a diagram showing an example where the label accumulating unit accumulates the label whose name is inputted by the user.

The label obtaining unit 131K receives, from the user operating a touch panel or a remote controller for character button input, an input of a name of a label for a position, and accumulates the label in the label accumulating unit 104K. The label is accumulated such that the label (child) forms a parent-child relationship with a middle-layer label (parent) including the position area indicated by the label. For example, when the user touches a position on a map on a screen as shown in FIG. 29(a) and inputs a name of a label using a button as shown in FIG. 29(b), the label obtaining unit 131K obtains the position on the map and the label name. In this case, as shown in FIG. 29(c), the label obtaining unit 131K obtains, for the position "Latitude: 34. 5. 13. 6, Longitude: 134. 4. 10. 9", a label name "Home" and a name decider "User". When obtaining the label "Home", the label obtaining unit 131K searches with which label, among middle-layer labels, the label "Home" forms a parent-child relationship. The label "Home" shown in FIG. 30(a) and indicating the position area "Latitude: 34. 5. 13. 6, Longitude: 134. 4. 10. 9" includes a middle-layer label "S town H heights" shown in FIG. 30(b) and indicating a position area "Latitude: 34. 5. 2. 0 to 34. 5. 40. 0, Longitude: 134. 4. 0. 0 to 134. 4. 30. 0". Accordingly, as shown in FIG. 30(c), the parent-child relationship is formed between the label "Home" and the label "S town H heights". That is to say, "Home" is the child, and "S town H heights" is the parent.

The first label selecting unit 108K selects, instead of currently selected labels, one or more higher-rank labels, only when the number of labels of predicted destinations, which are included in the selected labels, increases when the first label selecting unit 108K selects, instead of the currently selected labels, a higher-rank label for each label. Here, the first label selecting unit 108K selects the higher-rank labels for the lowest-layer labels in sequence, starting from a label whose name decider is not "User". When the number of the selected labels becomes equal to or below the number to be displayed, the first label selecting unit 108K suspends higher-rank label selection. That is to say, the first label selecting unit 108K selects one or more parent labels for labels whose name decider is "Other than the user", and selects one or more parent labels for labels whose name decider is "User" only when the number to be displayed exceeds the number of the selected labels even after the above selection.

Figure 31:
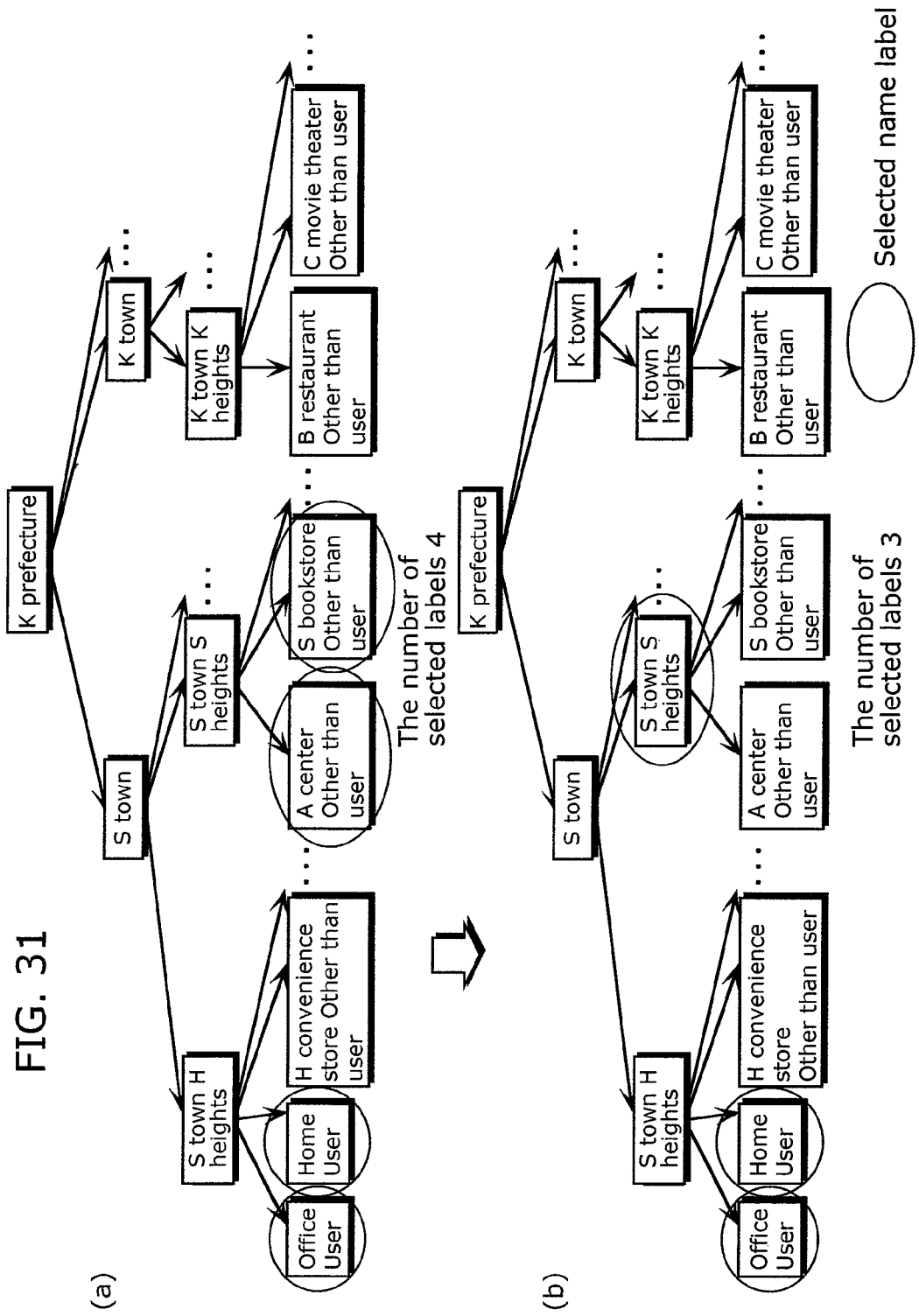
FIG. 31 is a diagram showing an example where the first label selecting unit preferentially selects labels other than labels whose names are decided by the user.

For instance, as shown in FIG. 31(a), it is assumed that the label accumulating unit 104K has accumulated a hierarchical structure and that the destination selecting unit 107 has selected four labels, "Office", "Home", "A center", and "S bookstore". In addition, it is assumed that label name deciders are "User", "User", "Other than user", and "Other than user", respectively, and that a number to be displayed obtained by the number-to-be-displayed obtaining unit 105 is "3". In this case, the first label selecting unit 108K selects a parent label of the selected labels in sequence, starting from a label whose label name decider is other than the user, because the number of the selected labels 4 exceeds the number to be displayed 3. In the case of FIG. 31(a), the selected labels whose name decider is "Other than user" are "A center" and "S bookstore". A parent label is preferentially selected for these labels because the names of the labels may be different from an actual name. Selecting a label "S town S heights" increases the number of the destinations indicated by the label because the label is a parent common to "A center" and "S bookstore". Thus, as shown in FIG. 31(b), the first label selecting unit 108K selects, instead of "A center" and "S bookstore", "S town S heights", the parent common to "A center" and "S bookstore". Here, the selected labels are "Office", "Home", and "S town S heights", and the number of the selected labels is 3. The first label selecting unit 108K terminates the label selection because the number of the selected labels does not exceed the number to be displayed 3.

Accordingly, it becomes possible to preferentially display the labels whose names are decided by the user and which the user can easily understand from the names of the labels.

Figure 32:
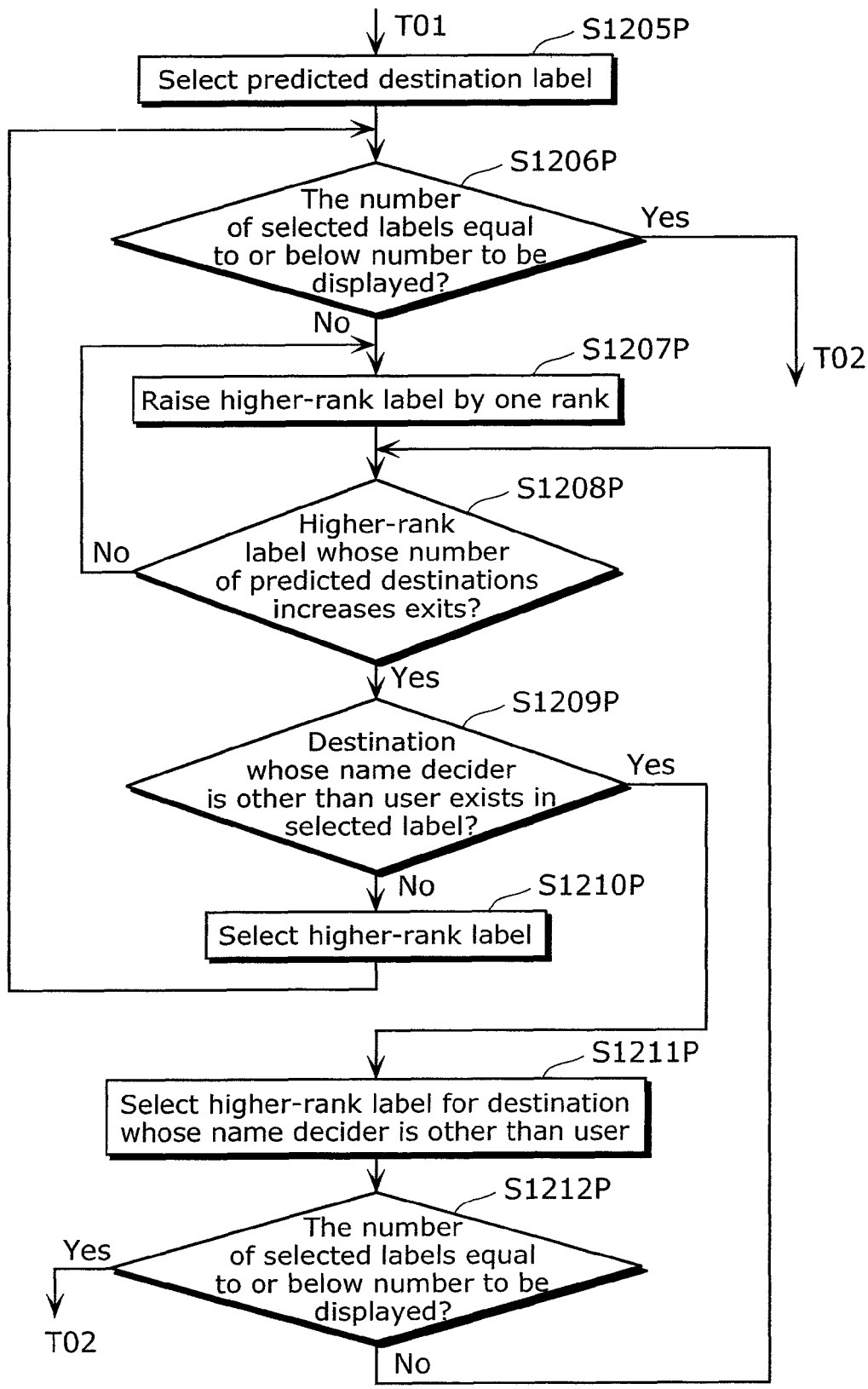
FIG. 32 is a flow chart showing an example of operations of the label selecting unit in the fourth modification.

Hereinafter, label selection operations (S1205) performed by the label selecting unit 106K according to the present modification will be described with reference to FIG. 32.

When the number-to-be-displayed obtaining unit 105 obtains the number of destination name labels to be displayed (Step S1204 in FIG. 12), the destination selecting unit 107 selects, in the label hierarchical structure accumulated in the label accumulating unit 104, all of the destinations obtained by the destination obtaining unit 103 (Step S1205P). The first label selecting unit 108K determines whether the number of the labels selected by the destination selecting unit 107 is equal to or below the number to be displayed obtained by the number-to-be-displayed obtaining unit 105 (Step S1206P). When the number of the selected labels is equal to or below the number to be displayed, the flow advances to Step S1211 in FIG. 12 (Yes in Step S1206P). When the number of the selected labels exceeds the number to be displayed, the flow advances to Step S1207P (No in Step S1206P). When the number of the selected labels exceeds the number to be displayed, the first label selecting unit 108K raises the rank of a higher-rank label to be selected by one rank. Initially, higher-rank labels are parent labels of predicted destinations (Step S1207F). The first label selecting unit 108K determines whether a higher-rank label whose number of predicted destinations indicated by the higher-rank label increases exists among the higher-rank labels (Step S1208P). When the higher-rank label exists, the flow advances to Step S1209P (Yes in Step S1208P). When the higher-rank label does not exist, the flow returns to Step S1207P (No in Step S1208P). When the higher-rank label whose number of the destinations indicated by the higher-rank label increases exists, the first label selecting unit 108K determines, for the higher-rank label whose number of the destinations indicated by the higher-rank label increases, whether the lowest-layer destination label whose name decider is "Other than the user" exists (Step S1209P). When the lowest-layer destination label exists, the flow advances to Step S1211P (Yes in Step S1209). When the lowest-layer destination label does not exist, the flow advances to S1210P (No in Step S1209). When the lowest-layer destination label whose name decider is "Other than the user" does not exist, the first label selecting unit 108K selects, instead of the selected labels, the higher-rank label (Step S1210P), and the flow returns to Step S1206P. When the lowest-layer destination label whose name decider is "Other than the user" exists, the first label selecting unit 108K selects, instead of the selected labels, the higher-rank label whose number of the predicted destinations indicated by the lowest-layer destination label increases, for the lowest-layer destination label whose name decider is "Other than the user" (Step S1211P). The first label selecting unit 108K determines whether the number of the selected labels is equal to or below the number to be displayed obtained by the number-to-be-displayed obtaining unit 105 (Step S1212P). When the number of the selected labels is equal to or below the number to be displayed, the flow advances to Step S1211 (Yes in Step S1212P). When the number of the selected labels exceeds the number to be displayed, the flow returns to Step S1208P (No in Step S1212P). Steps following the above are the same as the flow in the first embodiment.

(Label Selecting Unit in Fifth Modification)

It is to be noted that although a name label of a predicted destination is displayed as a destination that is wrongly predicted, that is, a predicted destination, there is a tendency to prefer a label having a low degree of detail for a destination which the user does not actually head for. This is because when a name label having a high degree of detail is displayed for the destination which the user does not actually head for, a system appears to perform prediction with confidence, thereby causing the user to feel discomfort. For example, it is assumed that although a terminal has predicted a facility "K city A hotel" as a predicted destination, the prediction is wrong, and that the user is heading for a place other than "K city A hotel". When the terminal displays "K city A hotel", a system appears to predict a precise position with confidence. As a result, when the prediction is wrong, the user feels discomfort. However, when the terminal displays, instead of "K city A hotel", "K city", a label having a lower degree of detail, the user often interprets that displaying the label is not strange as there is some possibility of going somewhere in "K city". For this reason, even when the prediction is wrong, the user does not feel discomfort relatively. In other words, the user does not feel discomfort when a label having a low degree of detail such as "K city" is displayed for a destination which the user rarely heads for but not when a specific name label having a high degree of detail such as "K city A hotel" is displayed for the destination. Thus, a first label selecting unit may prioritize a destination having a low ranking in prediction. More specifically, the first label selecting unit selects, instead of selected labels, a parent label in ascending order of a ranking in prediction of a predicted destination indicated by a label. When the number of the selected labels becomes equal to or below a number to be displayed, the first label selecting unit suspends the parent label selection. Accordingly, a label having a low degree of detail can be selected in order of increasing accuracy in prediction of a label, which is advantageous in selecting a label having a low degree of detail. This is particularly effective for the user who does not prefer that a name label of a predicted destination which the user does not actually head for is displayed.

Figure 33:
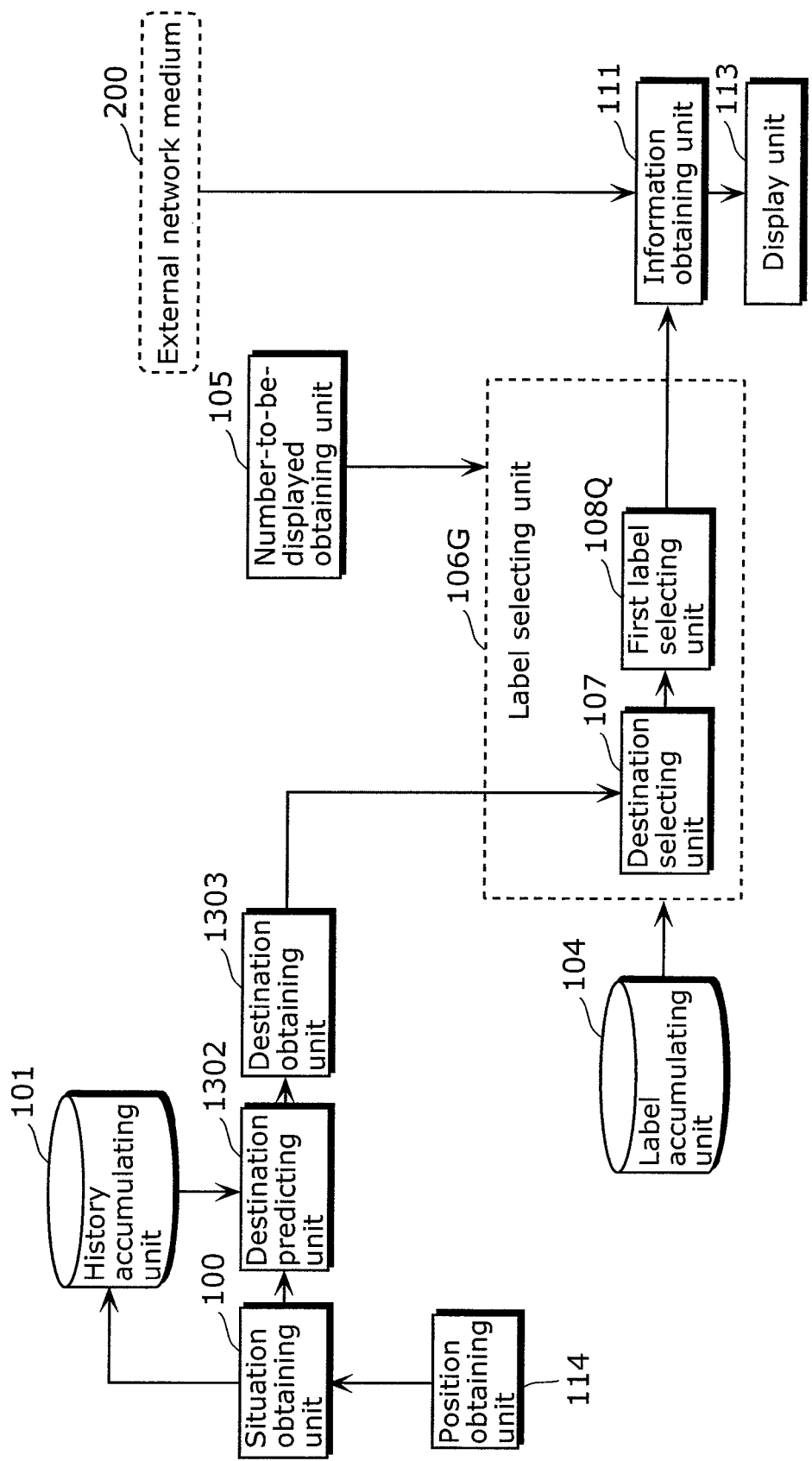
FIG. 33 is a block diagram showing a structure of the destination display apparatus in a fifth modification where the label selecting unit is modified.

FIG. 33 is a block diagram showing a structure of a destination display apparatus according to the present modification.

As shown in FIG. 33, the destination display apparatus according to the present modification includes: a position obtaining unit 114 which obtains a position of a present location of a mobile terminal; a situation obtaining unit 100 which obtains a current situation of the mobile terminal; a history accumulating unit 101 which accumulates the current situation and a destination history; a destination predicting unit 1302 which predicts destinations; and a destination obtaining unit 1303 which obtains the predicted destinations. The destination display apparatus further includes: a label accumulating unit 104 which accumulates a name label in a hierarchical structure including parent-child relationships between name labels; a number-to-be-displayed obtaining unit 105 which obtains the number of name labels to be displayed on a mobile terminal; a label selecting unit 106G which selects a label to be displayed; an information obtaining unit 111 which obtains information from an external network medium 200; and a display unit 113 which displays the selected label and the obtained information. In addition, the label selecting unit 106G includes a destination selecting unit 107 and a first label selecting unit 108Q.

Hereinafter, each of the components will be first described with reference to the drawings, and operations of the present apparatus will be subsequently described. The same numerals are given to the same components as the above embodiment, and description of the components is not repeated.

The destination predicting unit 1302 predicts one or more destinations from the current situation obtained by the situation obtaining unit 100 and the history accumulated by the history accumulating unit 101, and outputs a position, a name label, and ranking in prediction of each destination. For example, all of the destinations each included in more than ten histories among histories having a current departure place are predicted destinations. Here, a ranking in prediction is a ranking of the number of the histories. A destination including the largest number of histories has the first ranking in prediction. To put it differently, a higher ranking in prediction means that the user is highly likely to head for a predicted destination and that prediction accuracy is high.

The destination obtaining unit 1303 obtains the destinations predicted by the destination predicting unit 1302. More specifically, the destination obtaining unit 1303 obtains the position, the name label, and the ranking in prediction of each of the predicted destinations.

The first label selecting unit 108Q selects, instead of currently selected labels, one or more higher-rank labels, only when the number of labels of predicted destinations, which are included in the selected labels, increases when the first label selecting unit 108Q selects, instead of the currently selected labels, a higher-rank label for each label. Here, the higher-rank label is selected in ascending order of a ranking in prediction of a destination indicated by a label. When the number of the selected labels becomes equal to or below the number to be displayed while the first label selecting unit 108Q is performing the selection in the order, the first label selecting unit 108Q suspends the higher-rank label selection.

Figure 34:
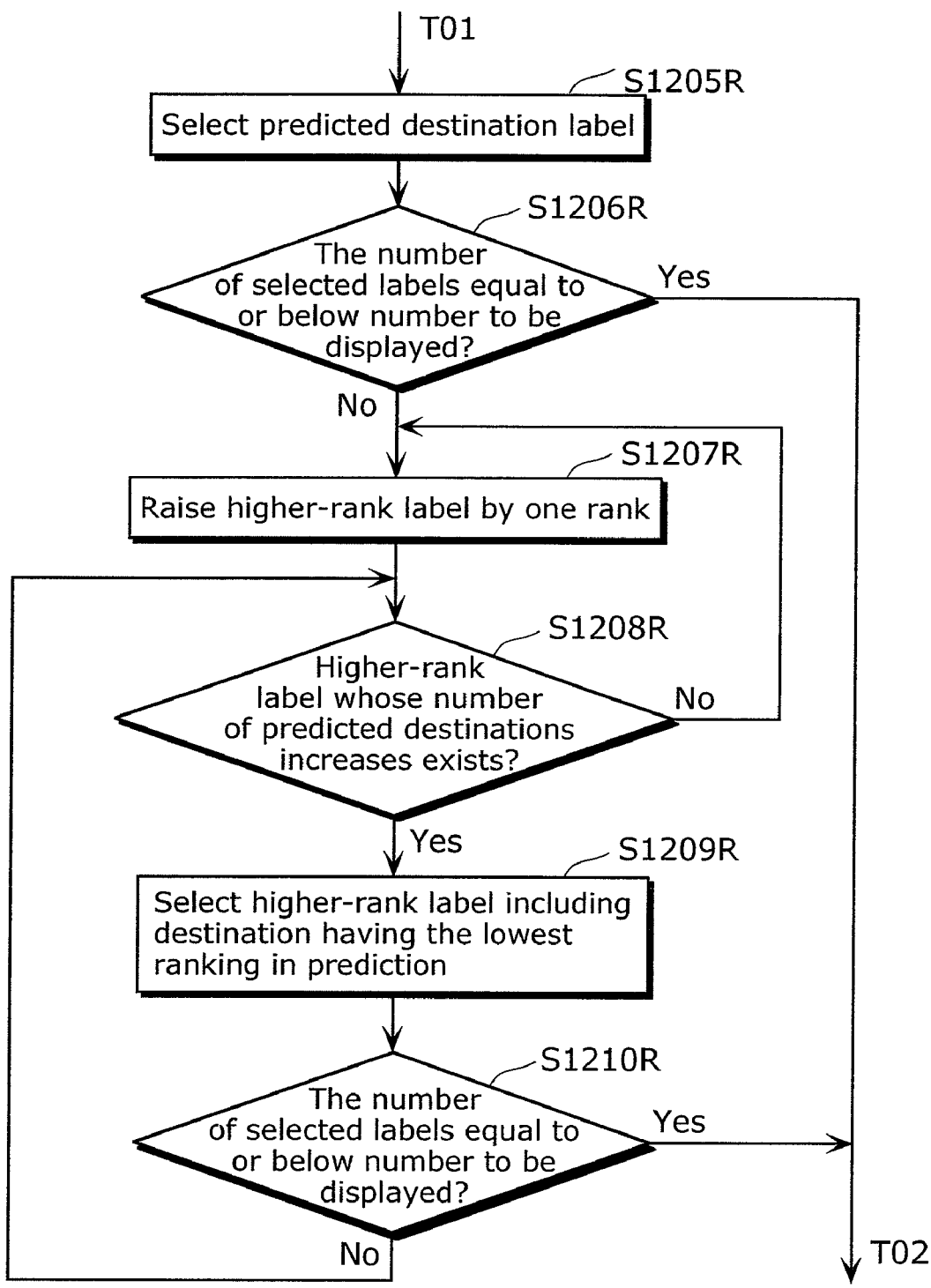
FIG. 34 is a flow chart showing an example of operations of the label selecting unit in the fifth modification.

Hereinafter, label selection operations (S1205) performed by the label selecting unit 106G according to the present modification will be described with reference to FIG. 34.

When the number-to-be-displayed obtaining unit 105 obtains the number of destination name labels (Step S1204 in FIG. 12), the destination selecting unit 107 selects, in the label hierarchical structure accumulated by the label accumulating unit 104, all of the destinations obtained by the destination obtaining unit 1303 (Step S1205R). The first label selecting unit 108Q determines whether the number of the labels selected by the destination selecting unit 107 is equal to or below the number to be displayed obtained by the number-to-be-displayed obtaining unit 105 (Step S1206R). When the number of the selected labels is equal to or below the number to be displayed, the flow advances to Step S1211 in FIG. 12 (Yes in step S1206R). When the number of the selected labels exceeds the number to be displayed, the flow advances to Step S1207R (No in Step S1206R). When the number of the selected labels exceeds the number to be displayed, the first label selecting unit 108Q raises the rank of a higher-rank label to be selected by one rank. Initially, higher-rank labels are parent labels of predicted destinations (Step S1207R). The first label selecting unit 108Q determines whether a higher-rank label whose number of predicted destinations indicated by the higher-rank label increases exists among the higher-rank labels (Step S1208R). When the higher-rank exists, the flow advances to Step S1209R (Yes in Step S1208R). When the higher-rank label does not exist, the flow returns to Step S1207R (No in Step S1208R). When the higher-rank label whose number of the predicted destinations indicated by the higher-rank label increases exists, the first label selecting unit 108Q selects, instead of a label indicating a destination having the lowest ranking in prediction, the higher-rank label whose number of the predicted destinations indicated by the higher-rank label increases, among the higher-rank labels (Step S1209R), and the flow returns to Step S1208R. Steps following the above are the same as the flow in the first embodiment.

It is to be noted that display operations performed by the display unit 113 are not limited to the above embodiment. For instance, there is a case where the number of characters indicating information to be displayed on a screen is limited. Here, the fewer number of characters indicating information to be displayed with a label is desirable. Although the display unit 113 displays the minimum value and the maximum value of the information regarding each of the predicted destinations indicated by the corresponding one of the labels in the above embodiment, the display unit 113 may display only an average value of the information regarding the predicted destination indicated by the label. This decreases the number of the characters to be displayed on the screen.

For example, it is assumed that the label selecting unit 106 has selected three labels, "S town", "B restaurant", and "T store", and that the second information calculating unit 112 has obtained: an arrival time "17:21" at a predicted destination "Office"; an arrival time "17:25" at a predicted destination "H convenience store"; an arrival time "17:31" at a predicted destination "A center"; an arrival time "17:52" at a predicted destination "B restaurant" indicated by the label "B restaurant"; and an arrival time "18:10" at a predicted destination "T store" indicated by the label "T store", the predicted destination labels "Office", "H convenience store", and "A center" being indicated by the label "S town". Here, an average value of the arrival times at the predicted destinations included by the label "S town" is an average value "17:26" (=(17:21+17:25+17:31)/3 and rounding toward the last digit) of "17:21" (Office), "17:25" (H convenience store), and "17:31" (A center). Thus, the arrival time of the label "S town" is "17:26". The arrival time of the label "B restaurant" is "17:52", and the arrival time of the label "T store" is "18:10". The calculation of an average value is particularly effective when differences between information of each destination indicated by the corresponding one of the labels.

Moreover, instead of calculating an average value as information regarding a label, only information regarding a destination having the highest ranking in prediction among destinations indicated by labels may be calculated as information regarding a label. This reduces the number of the characters to be displayed on the screen.

For instance, it is assumed that the label selecting unit 106 has selected three labels, "S town", "B restaurant", and "T store", and that the second information calculating unit 112 has obtained: an arrival time "17:21" at a predicted destination "Office" (First ranking in prediction); an arrival time "17:25" at a predicted destination "H convenience store" (Second ranking in prediction); an arrival time "17:31" at a predicted destination "A center" (Third ranking in prediction); an arrival time "17:52" at a predicted destination "B restaurant" (Fourth ranking in prediction) indicated by the label "B restaurant"; and an arrival time "18:10" at a predicted destination "T store" (Fifth ranking in prediction) indicated by the label "T store", the predicted destination labels "Office", "H convenience store", and "A center" being indicated by the label "S town". Here, among the predicted destinations indicated by the label "S town", a destination having the highest ranking in prediction is "Office" (First ranking in prediction), and the arrival time of the label "Office" is "17:21". Thus, the arrival time of the label "S town" is "17:21". The arrival time of the label "B restaurant" is "17:52", and the arrival time of the label "T store" is "18:10". The calculation of an average value is particularly effective when differences between information of each destination indicated by the corresponding one of the labels.

Furthermore, although the destination predicting unit 102 predicts the destinations from the current situation and the histories in the above embodiment, the destination obtaining unit 103 may receive destinations predicted with other common destination prediction methods. For example, destinations on the current traveling route of the mobile terminal may be predicted.

In addition, the destination predicting unit 102 may predict, as destinations, all of the landmarks within a predetermined range from a present location.

Moreover, the destination obtaining unit 103 may obtain destinations other than destinations predicted by a terminal. For instance, the user selects and inputs destination candidates on a menu screen of the terminal, and the destination obtaining unit 103 may obtain the destination candidates that the user selected and inputted. This allows information regarding all of the destinations to be displayed even when the user inputs, as destination candidates, destinations in number equal to or above the number to be displayed on the screen.

Figure 9:
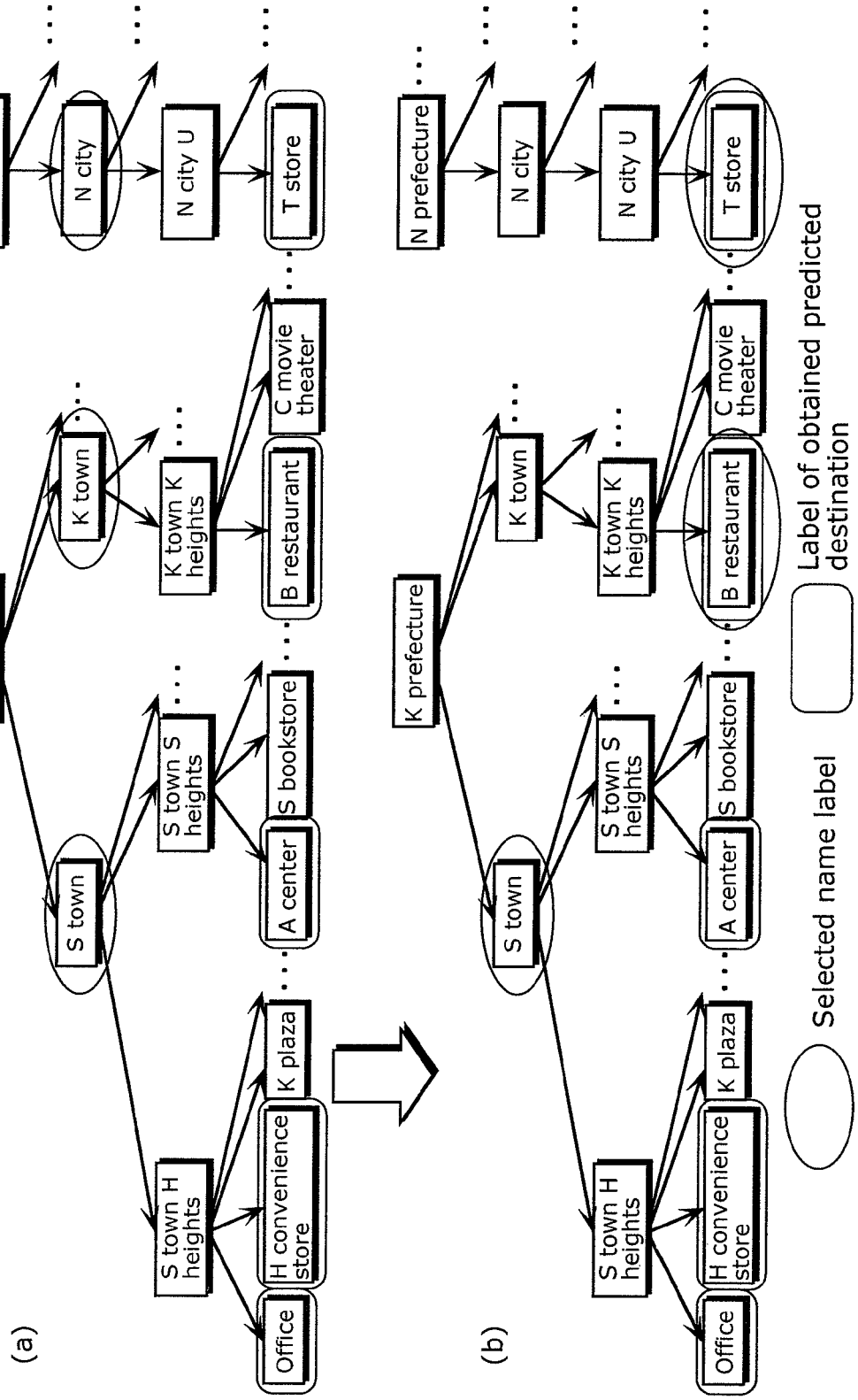
FIG. 9 is a diagram showing an example where a second label selecting unit raises a degree of detail for each selected label.
Figure 35:
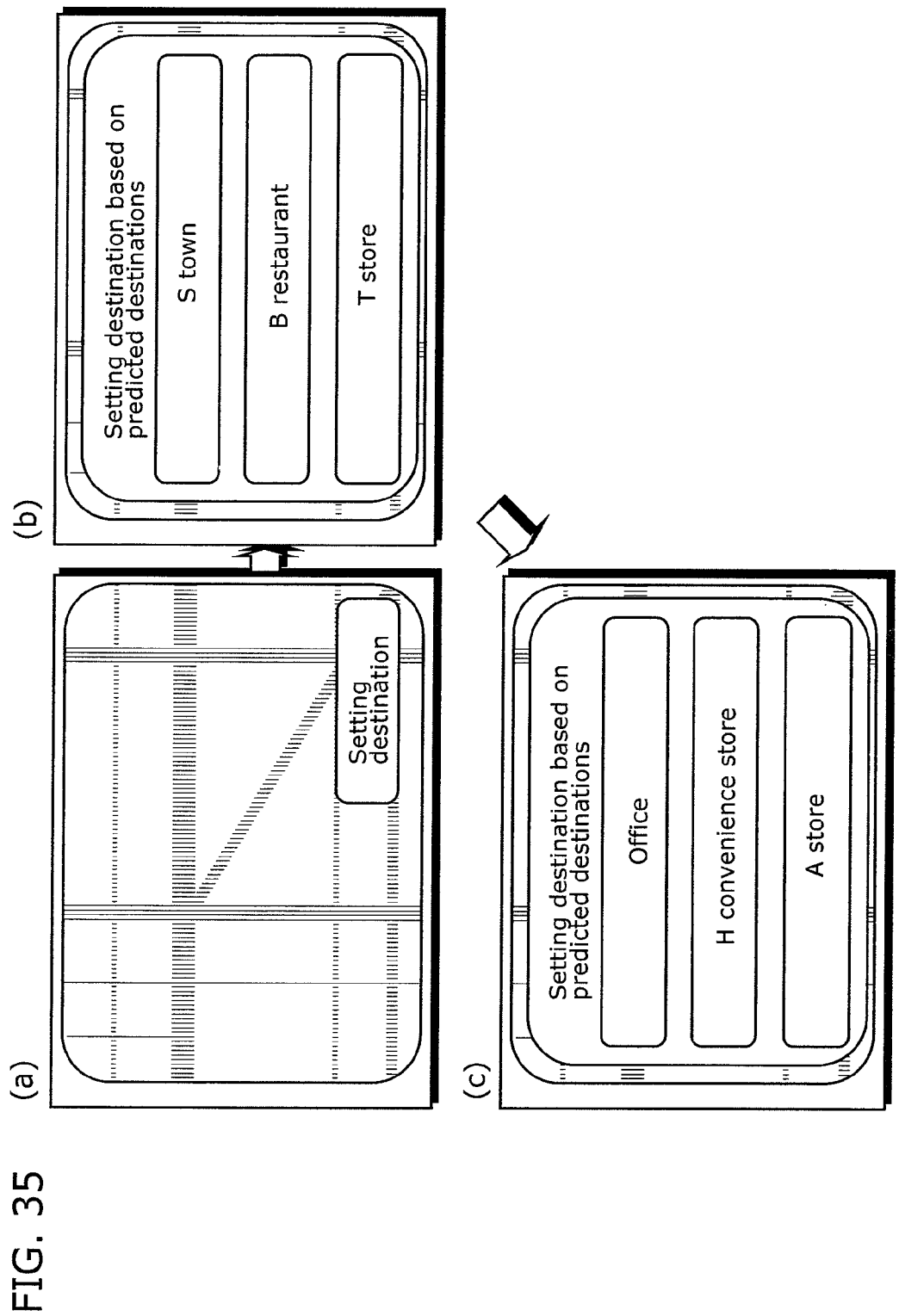
FIG. 35 is a diagram showing an example where a destination is set using a display label.
Figure 36:
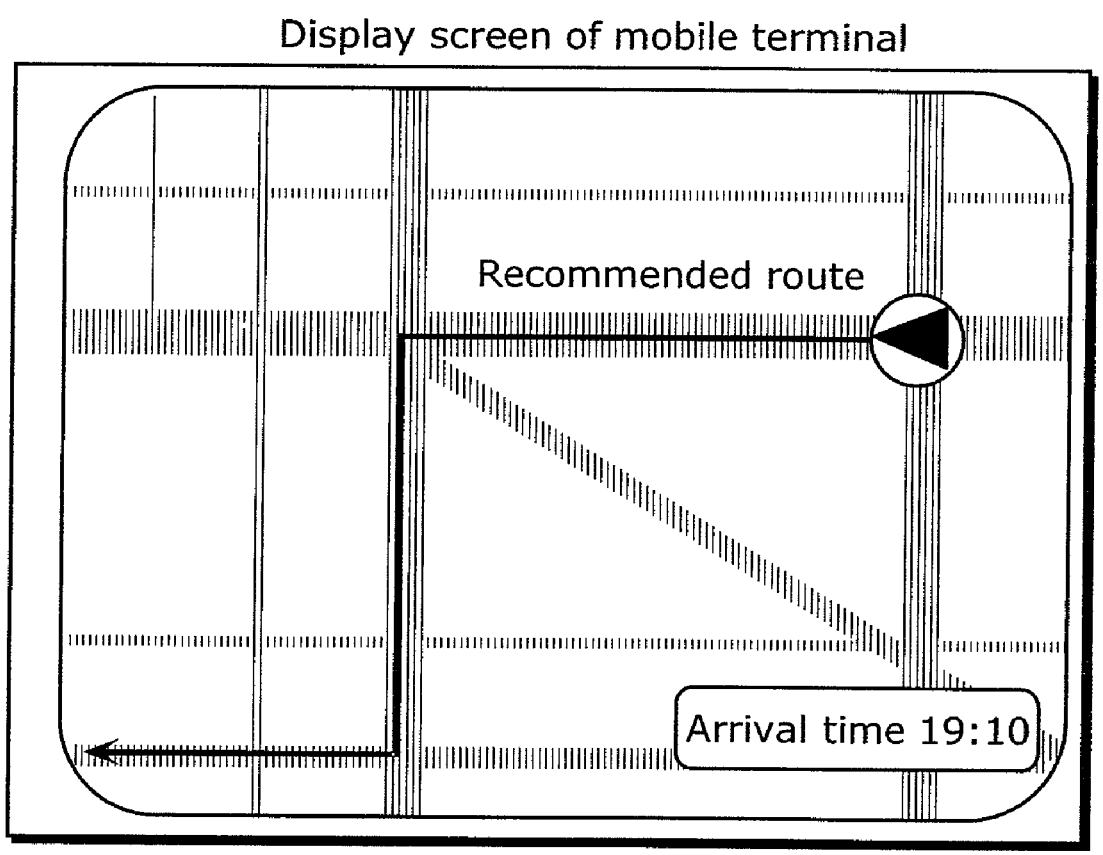
FIG. 36 is a diagram showing an example where route information is displayed after the destination is set using the display label.

Furthermore, the display unit 113 displays the labels and the information regarding the labels on the same screen in the above embodiment, the present invention is not limited to this. For example, when the user selects a label and determines a predicted destination indicated by the label, information regarding the predicted destination may be presented. To put it differently, the user may set a destination with a label which indicates displayed predicted destinations and for which a degree of detail is changed. For instance, as shown in FIG. 9, it is assumed that the label accumulating unit 104 has accumulated the hierarchical structure, that the destination obtaining unit 103 has obtained five predicted destinations, "Office", "H convenience store", "A center", "B restaurant", and "T store", and that the label selecting unit 106 has selected three labels, "S town", "B restaurant", and "T store". Here, the display unit 113 first displays a destination setting button as shown in FIG. 35(*a*), and displays the labels selected by the label selecting unit 106, "S town", "B restaurant", and "T store" as shown in FIG. 35(*b*), when the user selects the destination setting button by pressing or the like. The user sets a destination based on the displayed labels. When the user selects a predicted destination label in the lowest layer of the hierarchical structure such as "B restaurant", the terminal performs destination setting to "B restaurant" and presents route information regarding the destination. When the user selects a label other than the predicted destination labels such as "S town", the terminal selects, in the same manner, descendant predicted destination labels of "S town" according to a number to be displayed. In the above example, the descendant predicted destination labels of "S town" are the three labels, "Office", "H convenience store", and "A center", and instead of using labels having a low degree of detail as shown in FIG. 35(*c*), "Office", "H convenience store", "A center" are directly displayed because the number of the labels is equal to or below the number to be displayed 3. When the user selects, for example, "Office", "Office" is set as the destination because "Office" is the predicted destination label, and a recommended route to and arrival time information of "Office" are displayed as shown in FIG. 36. This facilitates the destination setting and allows the presentation of information regarding the destination even when the number of destinations to be displayed is limited due to the specifications of the screen.

Figure 37:
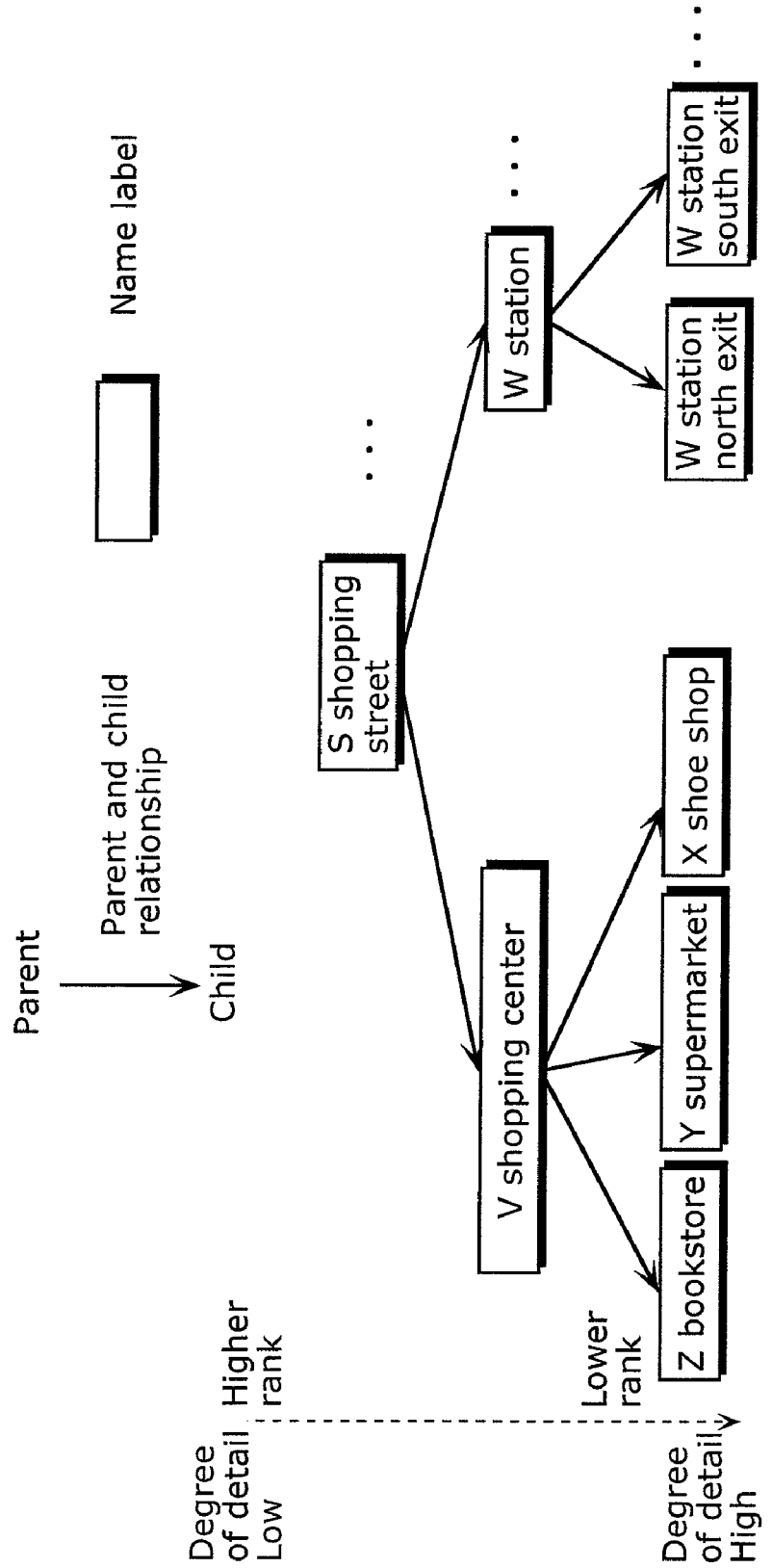
FIG. 37 is a diagram showing an example where facility names are accumulated in a hierarchical structure.

In addition, although the label accumulating unit 104 accumulates, as the labels other than the lowest-layer labels, the place name labels based on the addresses in the above embodiment, the label accumulating unit 104 may accumulate labels other than the place name labels. For instance, as shown in FIG. 37, the label accumulating unit 104 accumulates a hierarchical structure including parent-child relationships between name labels including not only place names but also facility names and shopping street names. For example, as shown in FIG. 37, when "V shopping center" includes "Z bookstore", "Y supermarket", and "X shoe shop", "V shopping center" (parent) has a parent-child relationship with "Z bookstore" (child), "Y supermarket" (child), and "X shoe shop" (child). In addition, when "W station" includes entrances and exits such as "W station north exit" and "W station south exit", "W station" (parent) has a parent-child relationship with "W station north exit" (child) and "W station south exit" (child). This allows displaying labels which are more suitable to a situation and the user can easily understand.

Moreover, although the label accumulating unit accumulates the label hierarchical structure in the above embodiment, the label obtaining unit which obtains the label hierarchical structure can substitute for the label accumulating unit. For instance, the label obtaining unit obtains a label hierarchical structure from the name labels (addresses) of destinations obtained by the destination obtaining unit.

Figure 38:
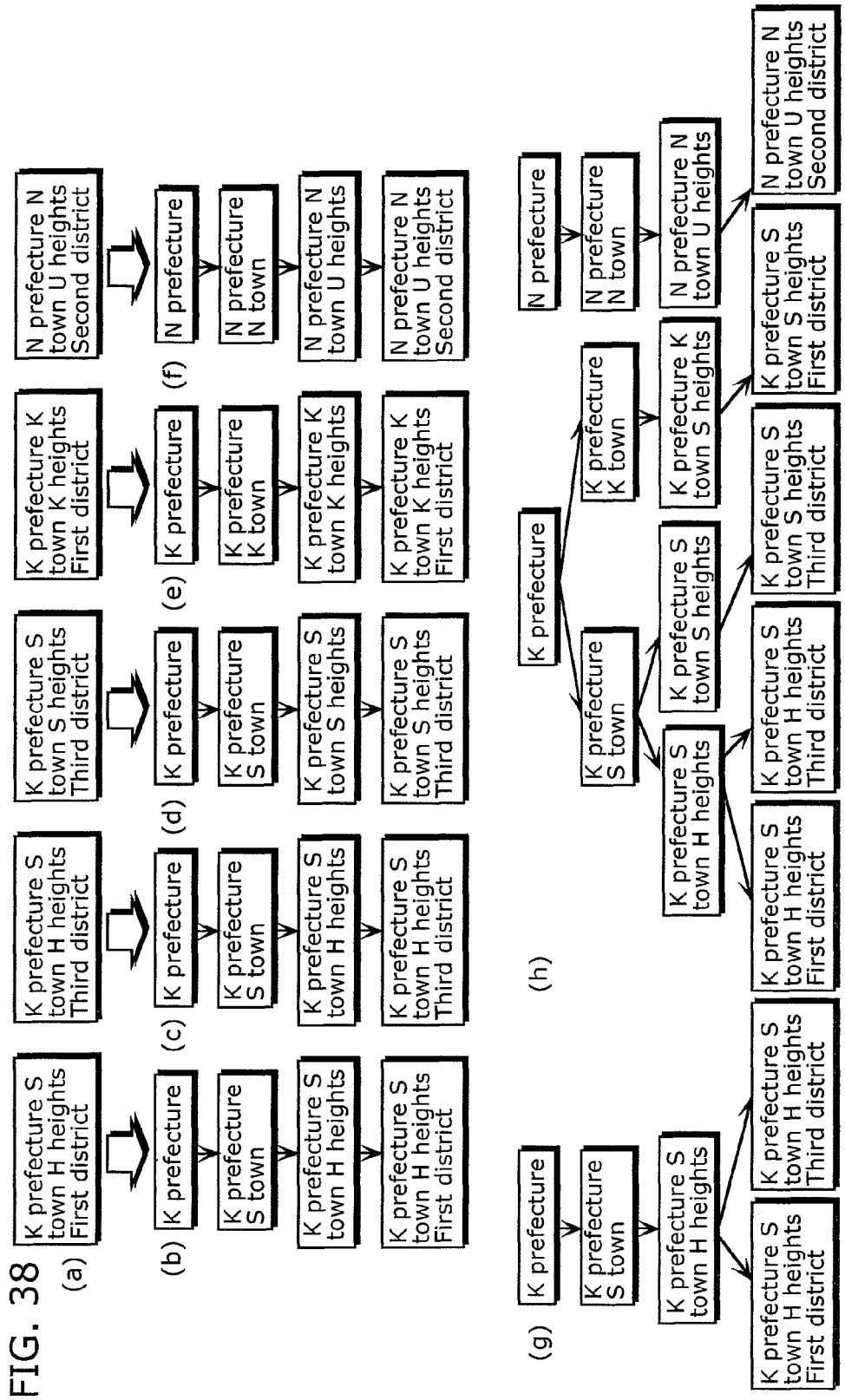
FIG. 38 is a diagram showing an example where the label accumulating unit is substituted by a label obtaining unit.

More specifically, the label obtaining unit divides the names of the name labels (addresses) at immediately after letters included in the names, "prefecture", "ward", "city", "town", "village", "district", "block", and "house number", and obtains a hierarchical structure in which parent labels are the left portions of the names of the name labels (portions common to the name labels) and child labels are the right portions (portions not common to the name labels). In addition, the label obtaining unit divides the names of the name labels at before numerals so that place names are extracted. For example, as shown in FIG. 38(*a*), it is assumed that the label obtaining unit has obtained, as destinations, name labels, "K prefecture S town H heights First district", "K prefecture S town H heights Third district", "K prefecture S town S heights Third district", "K prefecture K town K heights First district", and "N prefecture N city U Second district". When the label obtaining unit divides the obtained name labels with "prefecture", "ward", "city", "town", "village", "district", "block", "house number", and so on, the label obtaining unit divides "K prefecture S town H heights First district" into "K prefecture", "K prefecture S town", "K prefecture S town H heights", and "K prefecture S town H heights First district", and obtains a hierarchical structure including parent-child relationships in that order as shown in FIG. 38(*b*). In the same manner, as shown in FIG. 38(*c*)(*d*)(*e*)(*f*), the label obtaining unit extracts parent-child relationships. Next, the label obtaining unit combines hierarchical structures based on the left portions common to and the right portions not common to the name labels. For instance, the label obtaining unit combines hierarchical structures because "K prefecture S town H heights" is the common left portion and "First district" and "Third district" are the right portions that are not common in FIG. 38(*b*)(*c*). In other words, as shown in FIG. 38(*a*), the label obtaining unit forms a parent-child relationship in which "K prefecture", "K prefecture S town", and "K prefecture S town H heights" are common parents and "K prefecture S town H heights First district" and "K prefecture S town H heights Third district" each are a child. Likewise, the label obtaining unit obtains a hierarchical structure shown in FIG. 38(*h*) by combining hierarchical structures of other labels based on the left portions common to and the right portions not common to the other labels.

Second Embodiment

The label selecting unit 106 selects labels to be displayed from all of the labels accumulated by the label accumulating unit 104 in the first embodiment. However, using a label having a too low degree of detail widens a map area indicated by the label depending on information to be displayed by the display unit. For this reason, there is a case where the accuracy of display information is too low and the information is not useful for the user. The low accuracy of the display information means that the range of a value of the display information is wide. In addition, the low accuracy of the display information means that a difference between the minimum value and the maximum value of information regarding a label widens. For example, when an arrival time at a destination is displayed, there is a case where using a label having an excessively low degree of detail such as "Hokkaido" causes the accuracy of the arrival time to be too low. For instance, displaying an arrival time "12:00 to 24:00" at a destination "Hokkaido" is not useful for the user. Consequently, information regarding each of predicted destinations may be calculated, and a label indicating destinations having dissimilar information may be deleted from the selected labels. For example, when display information is an arrival time and when a difference between arrival times at destinations indicated by a label is large, the label is not selected. This prevents a decrease in the number of pieces of useful information to be displayed, the decrease being caused by presenting to the user information that has a too low degree of detail and is not useful.

The following will describe a technique according to the second embodiment.

Figure 39:
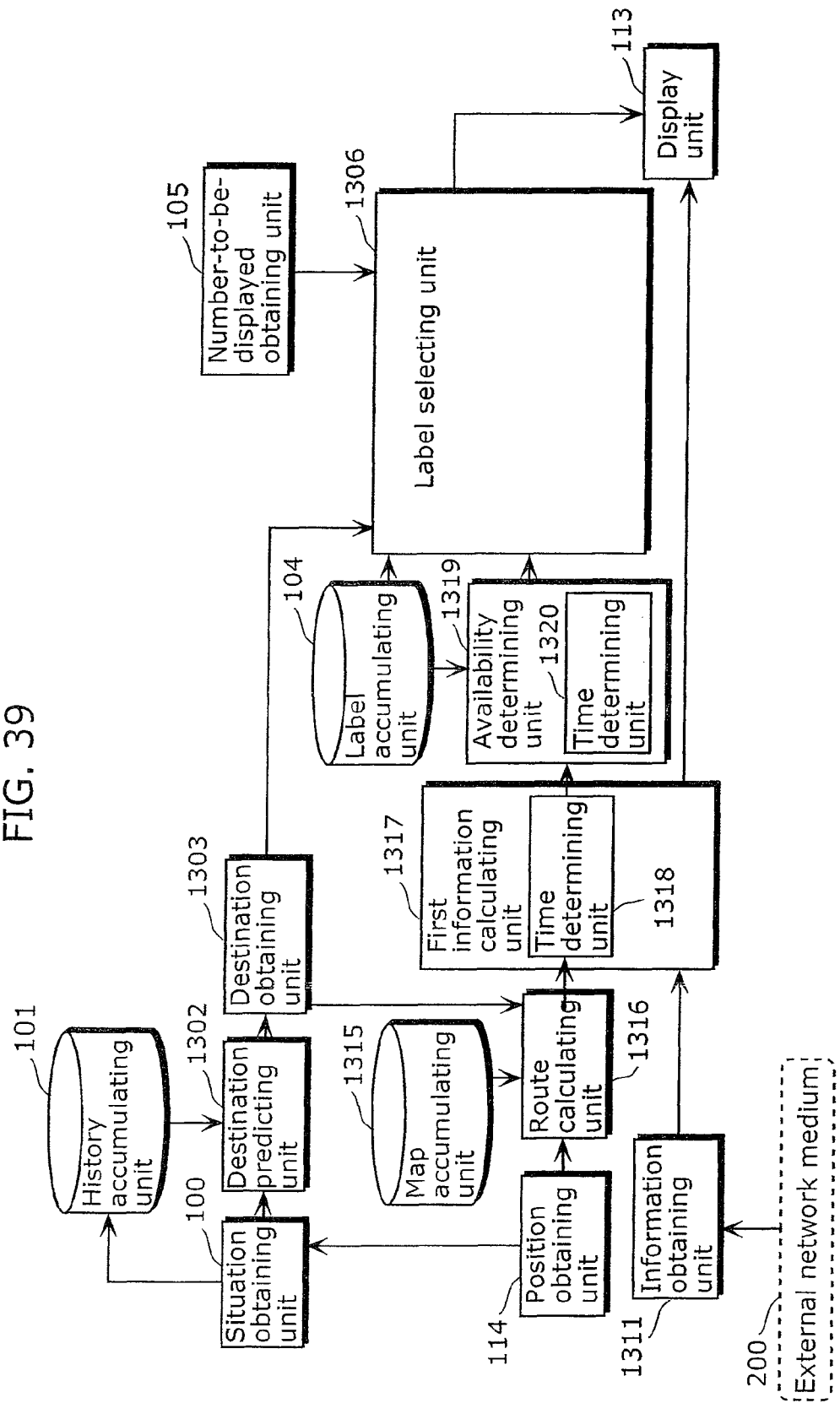
FIG. 39 is a block diagram showing a structure of a destination display apparatus according to a second embodiment of the present invention.

FIG. 39 is a block diagram showing a structure of a destination display apparatus according to the present embodiment. The same numerals are given to the same components as the first embodiment, and description of the components is not repeated. Hereinafter, each of the components will be first described with reference to the drawings, and operations of the present apparatus will be subsequently described.

The destination display apparatus is an apparatus for predicting destinations of a mobile terminal and displaying the predicted destinations, and, as shown in FIG. 39, includes: a position obtaining unit 114; a situation obtaining unit 100; a history accumulating unit 101; a destination predicting unit 1302; a destination obtaining unit 1303; a map accumulating unit 1315; a route calculating unit 1316; a first information calculating unit 1317; a time calculating unit 1318; a availability determining unit 1319; a time determining unit 1320; a label accumulating unit 104; a number-to-be-displayed obtaining unit 105; a label selecting unit 1306; a information obtaining unit 1311; and a display unit 113.

The map accumulating unit 1315 accumulates road information such as road links, node positions, and connection nodes as shown in FIGS. 40A and 40B. For instance, in the case of FIG. 40A, a node ID "001" indicates that a node position of the node ID "001" is at longitude "134. 3. 0. 9" and latitude "34. 6. 3. 6", and is connected to node IDs "002", "003", "004", and "005". In addition, in the case of FIG. 40B, a link ID "001" indicates a link connecting an initial node ID "001" and an end node ID "002".

The route calculating unit 1316 calculates, with the Dijkstra method and the like, each of routes from a current position of a mobile terminal obtained by the position obtaining unit 114 to a corresponding one of destinations obtained by the destination obtaining unit 1303, using the road information accumulated by the map accumulating unit 1315. For example, the route calculating unit 1316 calculates a series of link IDs such as "001 to 005".

The information obtaining unit 1311 obtains information from an external network medium 200 such as the VICS. The information is traffic information such as a required time, an arrival time, traffic jam information, and construction information, or commercial information such as information introducing a destination facility.

The first information calculating unit 1317 calculates information regarding each destination obtained by the destination obtaining unit 1303, using the information obtained by the information obtaining unit 1311. In particular, the first information calculating unit 1317 calculates the information from the route to the destination calculated by the route calculating unit 1316. The first information calculating unit 1317 includes the time calculating unit 1318.

The time calculating unit 1318 calculates arrival time information from the information obtained by the information obtaining unit 1311 and the route to the predicted destination obtained by the route calculating unit 1316. For example, the time calculating unit 1318 calculates an arrival time "16:48" for a predicted destination "D store", an arrival time "16:45" for "T convenience store", an arrival time "16:50" for a predicted destination "M supermarket", an arrival time "17:20" for a predicted destination "S electric appliance store", and an arrival time "17:45" for a predicted destination "B electric appliance store".

The availability determining unit 1319 determines whether or not labels accumulated by the label accumulating unit 104 are available for label selection, using the information regarding each predicted destination calculated by the first information calculating unit 1317. More specifically, the availability determining unit 1319 determines that a label is unavailable when descendants of the label include predicted destinations and a difference between pieces of information each regarding the predicted destination is large. In a case other than the above, the availability determining unit 1319 determines that the label is available. The availability determining unit 1319 includes the time determining unit 1320.

Figure 41A:
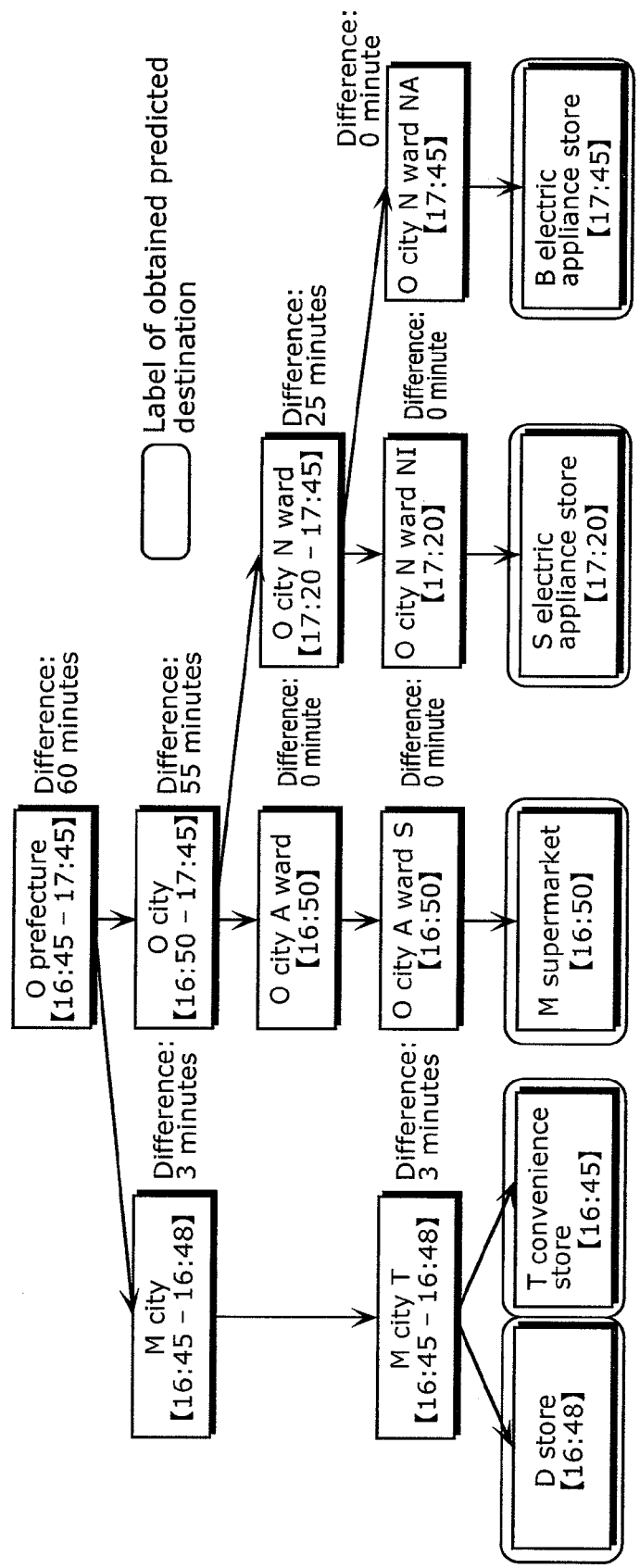
FIG. 41A is a diagram showing an example where a time determining unit determines whether or not a label is available based on an arrival time.

The following will describe the time determining unit 1320 that is one example of the availability determining unit 1319. The time determining unit 1320 determines whether or not the labels accumulated by the label accumulating unit 104 are available for the label selection, using the arrival time at each predicted destination calculated by the time calculating unit 1318. More specifically, the time determining unit 1320 determines that a label is unavailable when descendants of the label include predicted destinations and a difference between the arrival times at the predicted destinations is greater than a predetermined value. In a case other than the above, the time determining unit 1320 determines that the label is available. For instance, as shown in FIG. 41A, it is assumed that the label accumulating unit 104 has accumulated a label hierarchical structure, that the destination obtaining unit 1303 has obtained the following predicted destinations, "D store", "T convenience store", "M supermarket", "S electric appliance store", and "B electric appliance store", and that respective arrival times at a corresponding one of the predicted destinations are "16:48", "16:45", "16:50", "17:20", and "17:45". The time determining unit 1320 determines availability for each predicted label accumulated in the hierarchical structure. Labels whose descendants do not indicate predicted destinations are omitted from the figure because the labels are obviously available. In addition, the lowest-layer labels are obviously available. A predetermined value is, for example, predetermined as 15 minutes, and it is assumed that presenting information is not useful due to excessively low accuracy when a difference between arrival times exceeds 15 minutes. For example, as shown in FIG. 41B, in the case of a label "M city", predicted destinations indicated by the descendants of the label are "D store" (the arrival time "16:48") and "T convenience store" (the arrival time "16:45"). Thus, the maximum difference between the arrival times for the label "M city" is 3 minutes ("16:48" (D store)–"16:45" (T convenience store)). The label "M city" is available because the difference is below 15 minutes. Furthermore, as for a label "O city N ward", predicted destinations indicated by the descendants of the label are "S electric appliance store" (the arrival time "17:20") and "B electric appliance store" (the arrival time "17:45"). Thus, the maximum difference between the arrival times for the label "O city N ward" is 25 minutes ("17:45" (B electric appliance store)–"17:20" (S electric appliance store)). The label "O city N ward" is unavailable because the difference is above 15 minutes. In addition, the parent label of a label determined as unavailable is inevitably unavailable.

The label selecting unit 1306 selects, in the label hierarchical structure accumulated by the label accumulating unit 104, labels in number equal to or below the number to be displayed obtained by the number-to-be-displayed obtaining unit 105, from among labels determined as available by the availability determining unit 1319, using the predicted destinations obtained by the destination obtaining unit 1303 and ranking in prediction for each predicted destination. The label selecting unit 1306 selects, in the hierarchical structure, labels in descending order of the ranking in prediction so that the selected labels or the descendants of the selected labels include the largest number of the predicted destinations. In addition, the label selecting unit 1306 performs the selection, starting from lower-rank labels having a high degree of detail, as much as possible.

Further, the label selecting unit 1306 will be described in detail. Although the label selecting unit 1306 is basically the same as the label selecting unit of the first embodiment, the label selecting unit 1306 differs in not selecting labels determined as unavailable by the availability determining unit 1319.

Figure 42:
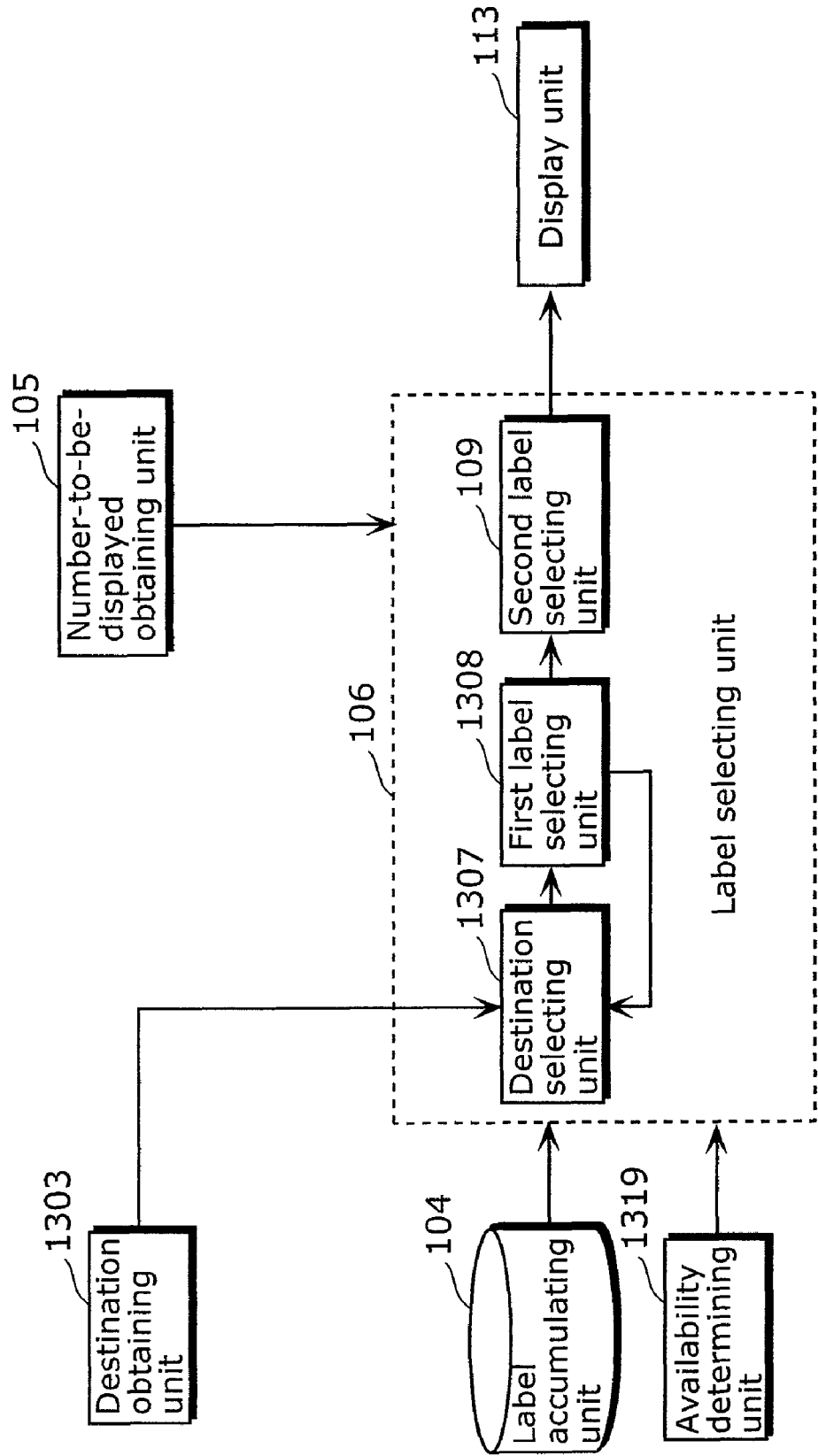
FIG. 42 is a block diagram showing a structure of the label selecting unit.

FIG. 42 is a block diagram showing the structure of the label selecting unit 1306 according to the present embodiment.

The label selecting unit 1306 includes: a destination selecting unit 1307 which selects, in the label hierarchical structure accumulated by the label accumulating unit 104, the labels of the destinations obtained by the destination obtaining unit 1303; a first label selecting unit 1308 which selects, instead of the selected labels, labels for which a degree of detail is lowered until the number of the selected labels becomes equal to or below the number to be displayed, from among the labels determined as available by the availability determining unit 1319; and a second label selecting unit 109 which selects, instead of the selected labels, labels for which a degree of detail is raised. The components of the label selecting unit of the first embodiment are not described in detail again.

The destination selecting unit 1307 selects, in the hierarchical structure accumulated by the label accumulating unit 104, one or more destinations obtained by the destination obtaining unit 1303. In particular, in the case of determining label availability, labels to be displayed are limited. For this reason, there is often a case where labels indicating all of the predicted destinations cannot be selected. Accordingly, the destination selecting unit 1307 initially selects all of the predicted destinations, and when the number of the labels does not become equal to or below the number to be displayed even though the first label selecting unit 1308 has lowered a degree of detail for the labels, the destination selecting unit 1307 deselects the selected predicted destinations one by one, starting from a destination having the lowest ranking in prediction.

Figure 43A:
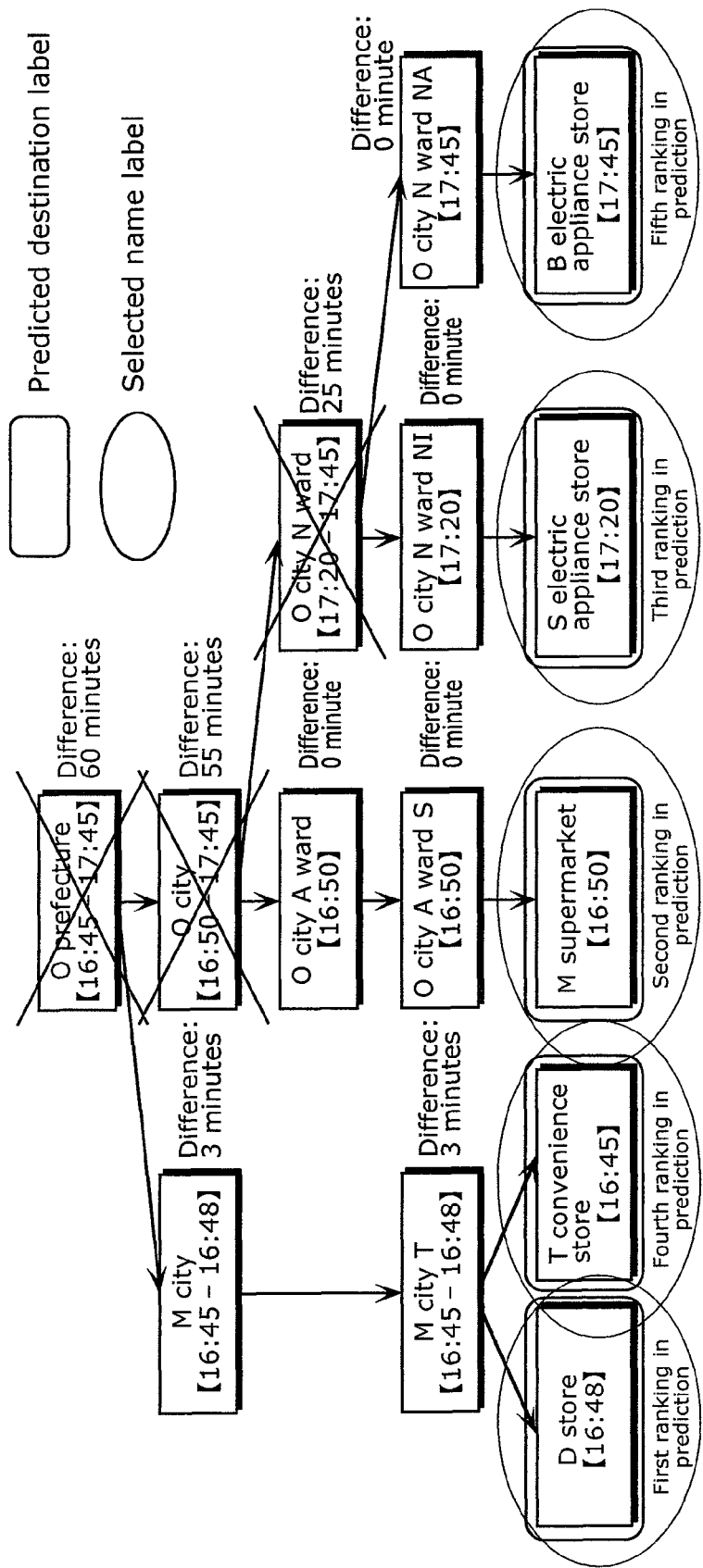
FIG. 43A is a diagram showing an example where the destination selecting unit selects destinations.
Figure 43B:
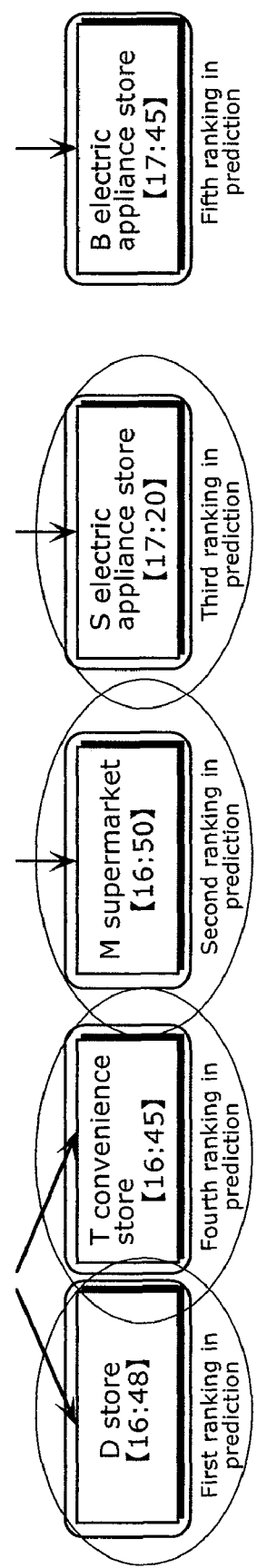
FIG. 43B is a diagram showing an example where the destination selecting unit selects destinations.
Figure 43C:
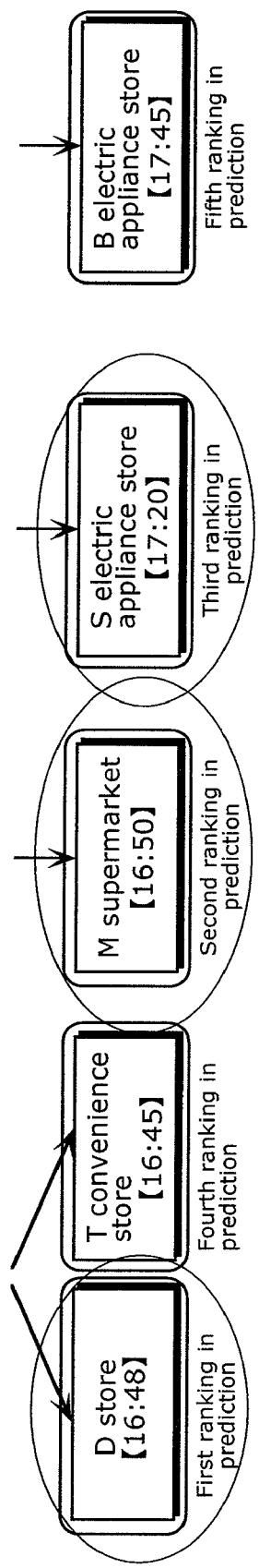
FIG. 43C is a diagram showing an example where the destination selecting unit selects destinations.

For instance, as shown in FIG. 43A, when five predicted destinations, "D store" (first ranking in prediction), "M supermarket" (second ranking in prediction), "S electric appliance store" (third ranking in prediction), "T convenience store" (fourth ranking in prediction), and "B electric appliance store" (fifth ranking in prediction), are obtained, name labels, "D store" (first ranking in prediction), "M supermarket" (second ranking in prediction), "S electric appliance store" (third ranking in prediction), "T convenience store" (fourth ranking in prediction), and "B electric appliance store" (fifth ranking in prediction), which are in the lowest-layer of the hierarchical structure, are selected. When the number of the selected labels does not become equal to or below a number to be displayed even though the first label selecting unit 1308 has lowered a degree of detail for the selected labels, as shown in FIG. 43B, "B electric appliance store" (fifth ranking in prediction) having the lowest ranking in prediction is deselected, and "D store" (first ranking in prediction), "M supermarket" (second ranking in prediction), "S electric appliance store" (third ranking in prediction), and "T convenience store" (fourth ranking in prediction) are selected. Even so, when the number of the selected labels does not become equal to or below the number to be displayed, as shown in FIG. 43C, "D store" (first ranking in prediction), "M supermarket" (second ranking in prediction), and "S electric appliance store" (third ranking in prediction) are selected. This is repeated until the number of the selected labels after the degree of detail is lowered becomes equal to or below the number to be displayed.

Figure 44:
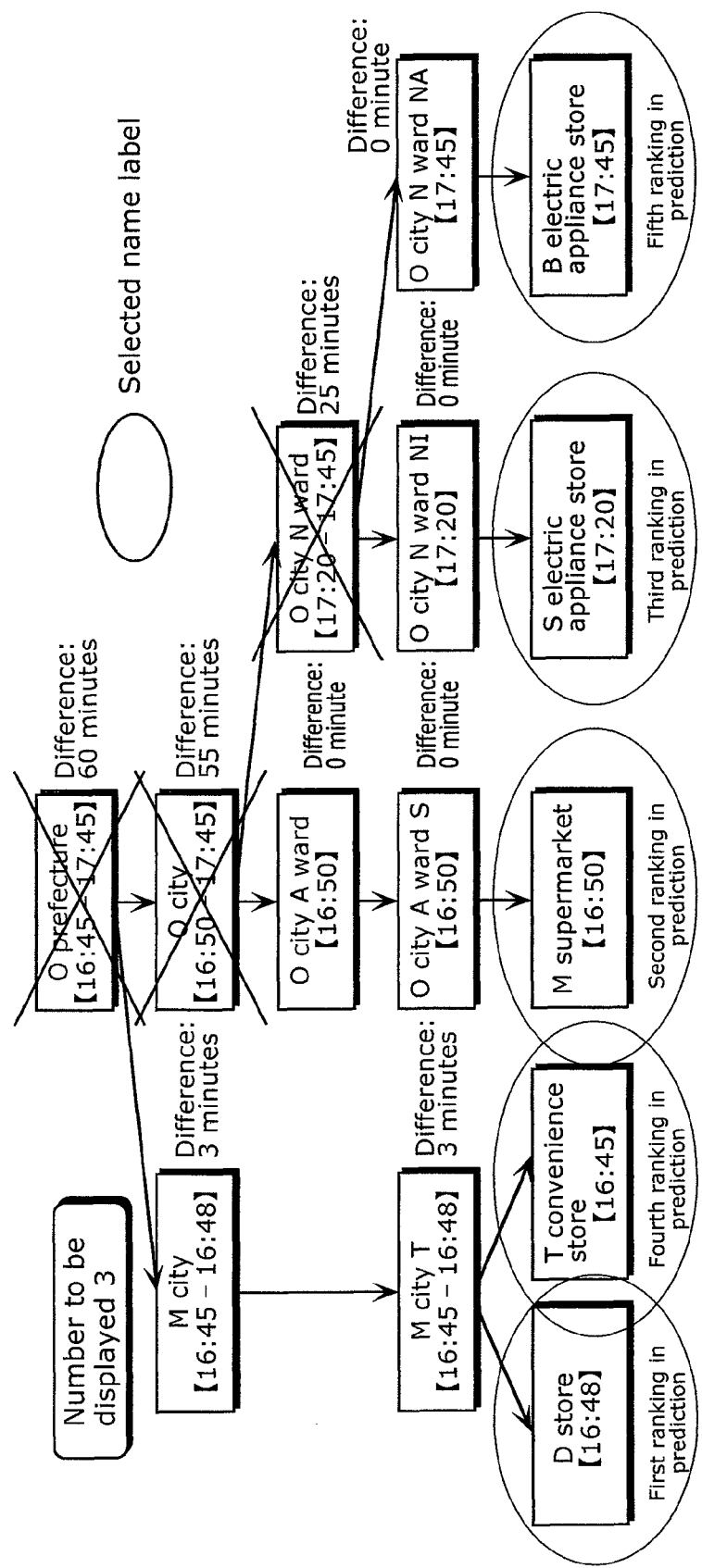
FIG. 44 is a diagram showing an example where the first label selecting unit lowers a degree of detail for each selected label.
Figure 45:
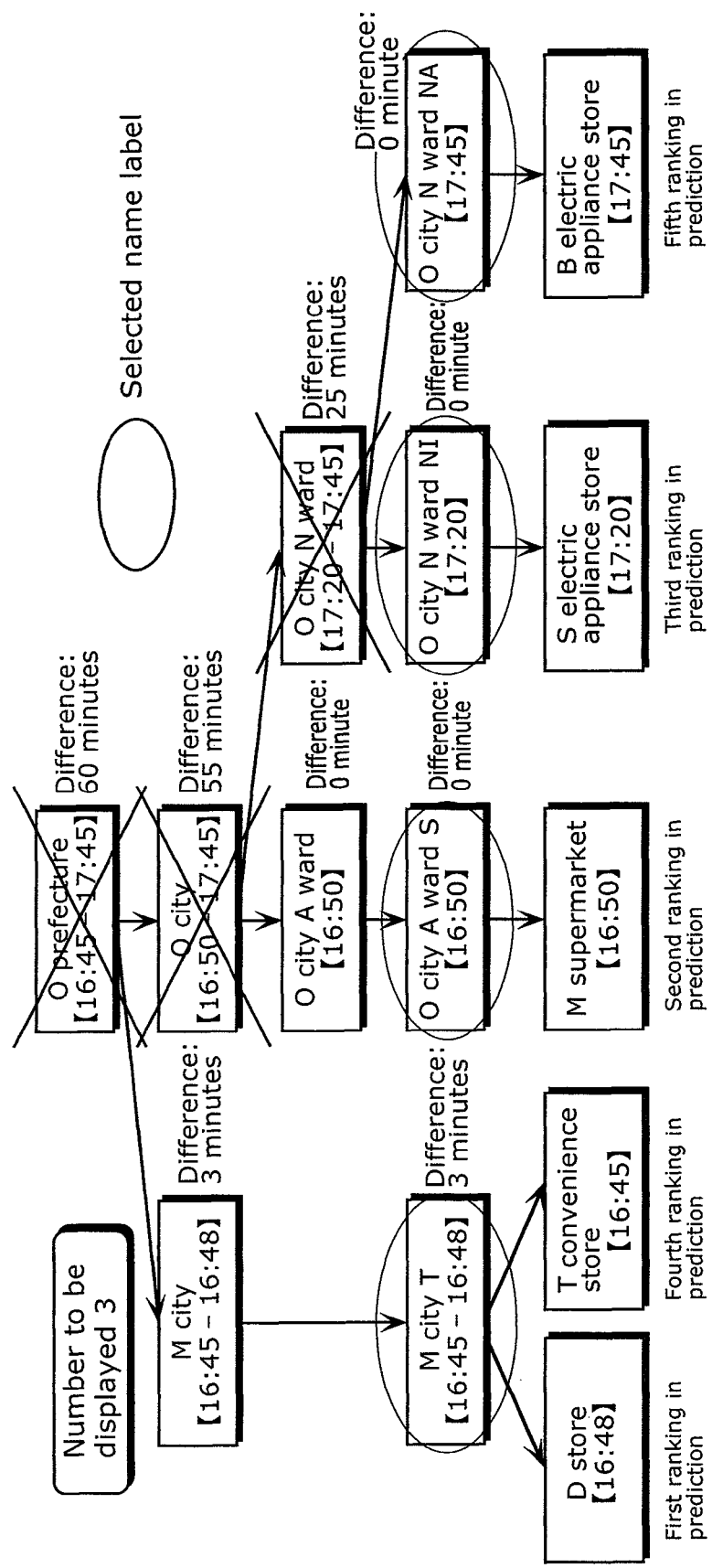
FIG. 45 is a diagram showing an example where the first label selecting unit lowers a degree of detail for each selected label.
Figure 46:
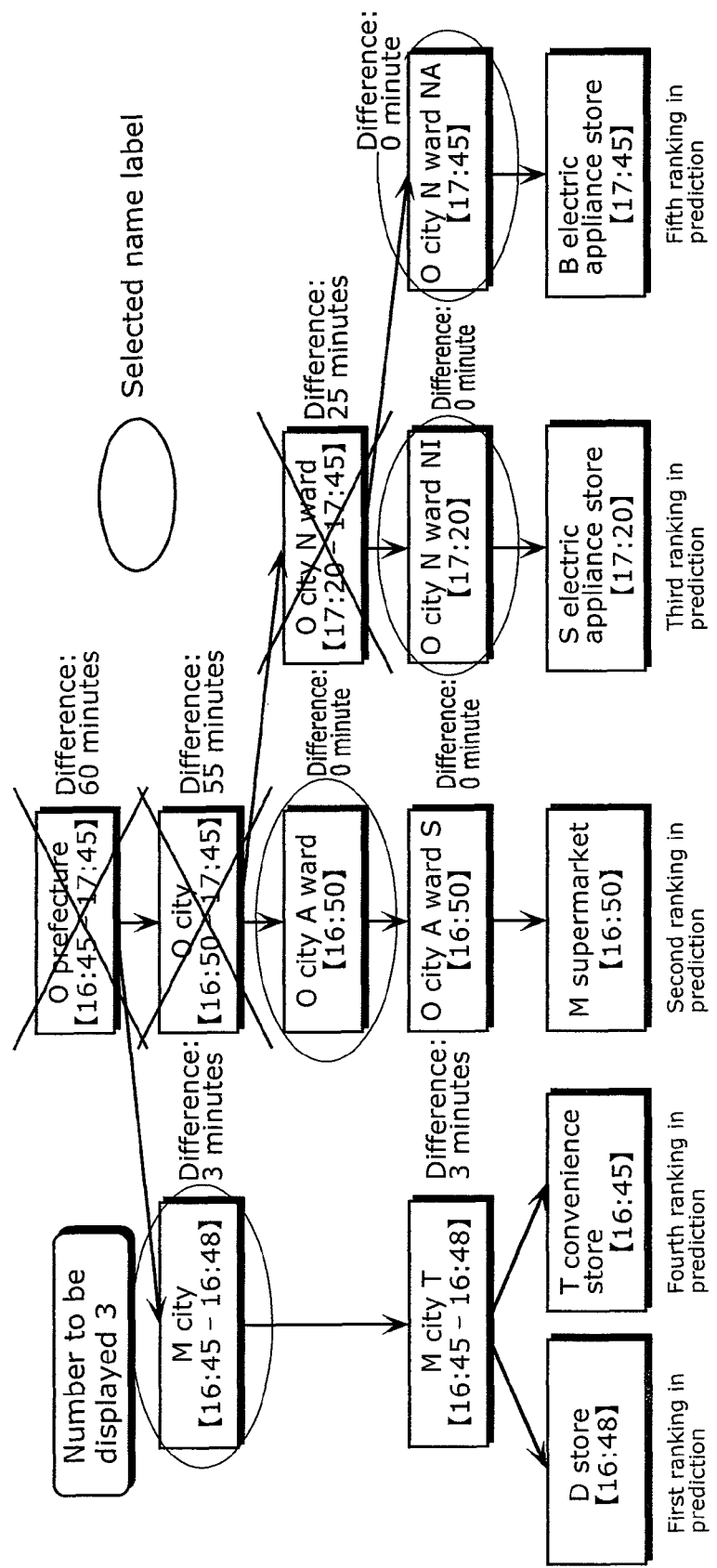
FIG. 46 is a diagram showing an example where the first label selecting unit lowers a degree of detail for each selected label.
Figure 47:
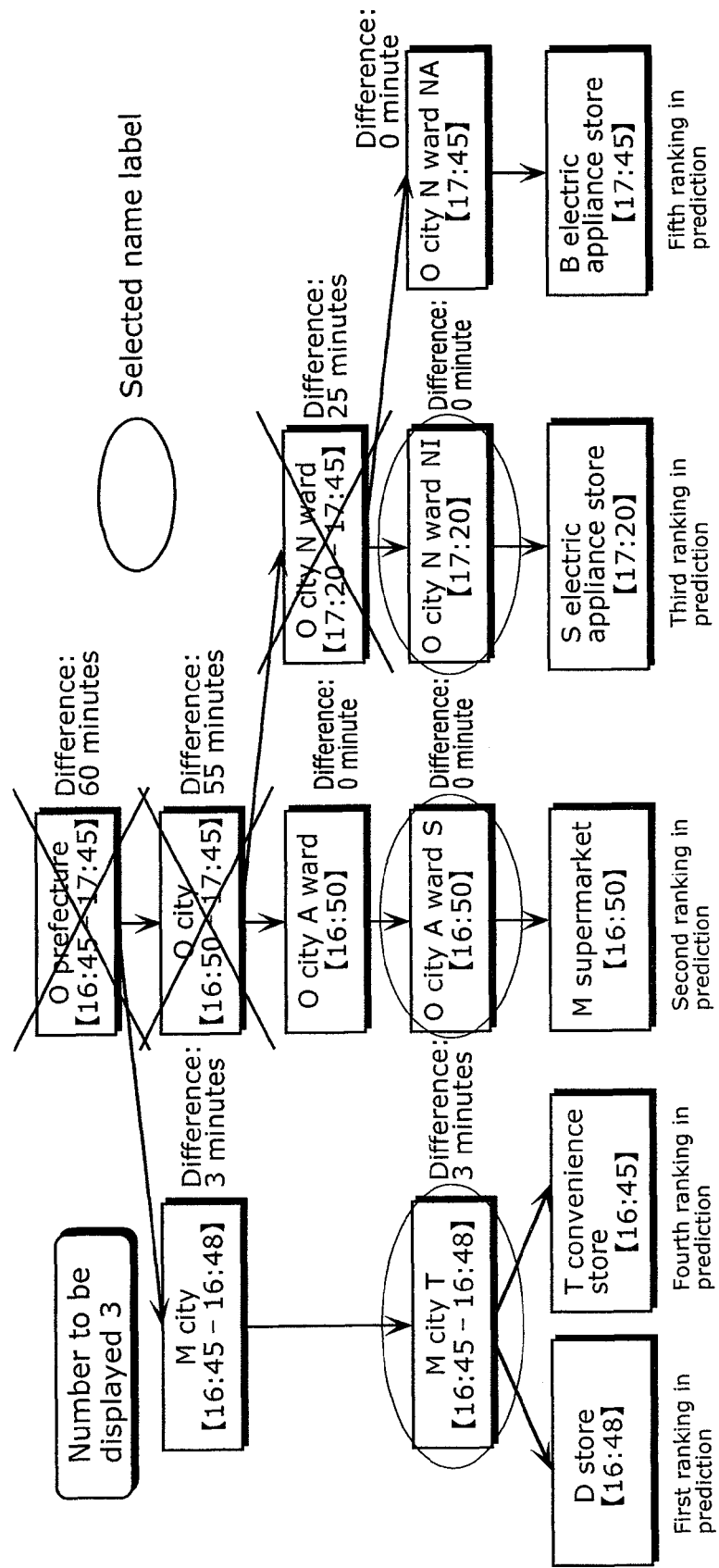
FIG. 47 is a diagram showing an example where the first label selecting unit lowers a degree of detail for each selected label.

The first label selecting unit 1308 lowers, in the hierarchical structure accumulated by the label accumulating unit 104, the degree of detail for the labels selected by the destination selecting unit 1307 until the number of the selected labels becomes equal to or below the number to be displayed. In the case of lowering the degree of detail, only labels determined as available by the availability determining unit 1319 are used. When the number of the selected labels does not become equal to or below the number to be displayed even though the degree of detail has been lowered for the labels, the degree of detail is lowered again after the destination selecting unit 1307 changes the selected labels. More specifically, a parent label of each of labels, which are selected from among the labels determined as available by the availability determining unit 1319 and which are in the hierarchical structure accumulated by the label accumulating unit 104, is repeatedly selected until the number of the selected labels becomes equal to or below the number to be displayed. The degree of detail is not lowered for labels for which a parent label cannot be selected. When the number of the selected labels exceeds the number to be displayed and the parent label cannot be selected for any label, the destination selecting unit 1307 changes the selected labels. For example, as shown in FIG. 44, it is assumed that the label availability has been determined and that the destination selecting unit 1307 has selected five labels, "D store", "T convenience store", "M supermarket", "S electric appliance store", and "B electric appliance store". Assuming that a number to be displayed obtained by the number-to-be-displayed obtaining unit 105 is 3, the first label selecting unit 1308 selects a parent label of each of the selected labels because the number of the selected labels 5 exceeds the number to be displayed 3. In the case of FIG. 44, as shown in FIG. 45, the first label selecting unit 1308 selects four labels, "M city T" which is a parent common to "D store" and "T convenience store", "O city A ward S" which is a parent of "M supermarket", "O city N ward NI" which is a parent of "S electric appliance store", and "O city N ward NA" which is a parent of "B electric appliance store". Further, as shown in FIG. 46, the first label selecting unit 1308 selects four labels, "M city" which is a parent of "M city T", "O city A ward" which is a parent of "O city A ward S", "O city N ward NI", and "O city N ward NA". "O city N ward", a parent "O city N ward NI" and "O city N ward NA", is not selected because "O city N ward" has been determined as unavailable. Although the number of the selected labels exceeds the number to be displayed, the number of the destinations selected by the destination selecting unit 1307 is reduced because a parent cannot be further selected for any label. In the example shown in FIGS. 44, 45, and 46, as shown in FIG. 47, three labels, "M city T" which is the parent common to "D store" and "T convenience store", "O city A ward S" which is the parent of "M supermarket", and "O city N ward NI" which is the parent of "S electric appliance store", are finally selected.

Figure 48:
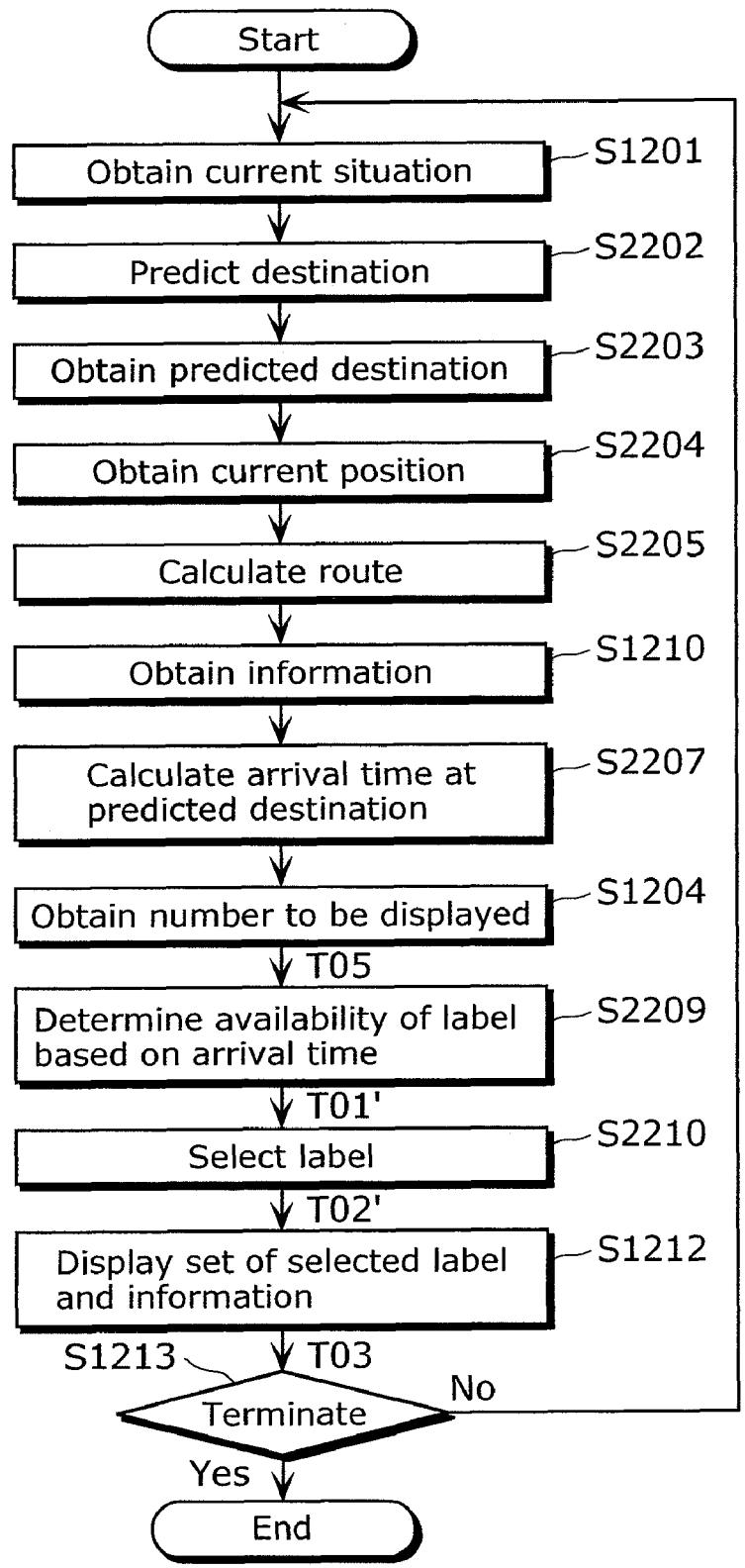
FIG. 48 is a flow chart showing an example of operations of the destination display apparatus according to the second embodiment of the present invention.

Hereinafter, operations of the destination display apparatus according to the second embodiment will be described with reference to the flow chart of FIG. 48.

The situation obtaining unit 100 obtains a current situation of a mobile terminal (Step S1201). The destination predicting unit 1302 predicts destinations based on the current situation obtained by the situation obtaining unit 100 and histories accumulated by the history accumulating unit 101, and outputs positions, name labels, and rankings in prediction of the destinations (Step S2202). The destination obtaining unit 1303 obtains the destinations predicted by the destination predicting unit 1302. More specifically, the destination obtaining unit 1303 obtains the position, the name label, and the ranking in prediction of each predicted destination. The position obtaining unit 114 obtains the position of a present location of the mobile terminal mainly through a GPS antenna, an IC tag, communication with a base station, or image recognition (Step S2204). The route calculating unit 1316 calculates each of routes from the current position of the mobile terminal obtained by the position obtaining unit 114 to a corresponding one of destinations obtained by the destination obtaining unit 1303, using the road information accumulated by the map accumulating unit 1315 (Step S2205). The information obtaining unit 1311 obtains, from the external network medium 200 such as the VICS, traffic information such a required time, traffic jam information, and construction information on a road, and commercial information (Step S1210). The time calculating unit 1318 calculates arrival time information from the information obtained by the information obtaining unit 1311 and the route to the predicted destination obtained by the route calculating unit 1316 (Step S2207). The number-to-be-displayed obtaining unit 105 obtains the number of destination name labels that the display unit 113 displays on a screen of a mobile terminal (Step S1204). The time determining unit 1320 determines whether or not the labels accumulated by the label accumulating unit 104 are available for the label selection, using the arrival time at each predicted destination calculated by the time calculating unit 1318 (Step S2209). The label selecting unit 1306 selects, in the label hierarchical structure accumulated by the label accumulating unit 104, labels in number equal to or below the number to be displayed obtained by the number-to-be-displayed obtaining unit 105, from among labels determined as available by the availability determining unit 1319, using the predicted destinations obtained by the destination obtaining unit 1303 and the ranking in prediction for each predicted destination (Step S1210). The display unit 113 displays the information obtained by the information obtaining unit 1311 together with the names of the labels selected by the label selecting unit 1306 (Step S1212). The destination display apparatus determines whether the processing is terminated (Step S1213), and ends the flow when it is determined that the processing is terminated (Yes in Step S1213). The flow returns to Step S1201 when it is determined that the processing is not terminated (No in Step S1213).

Figure 49:
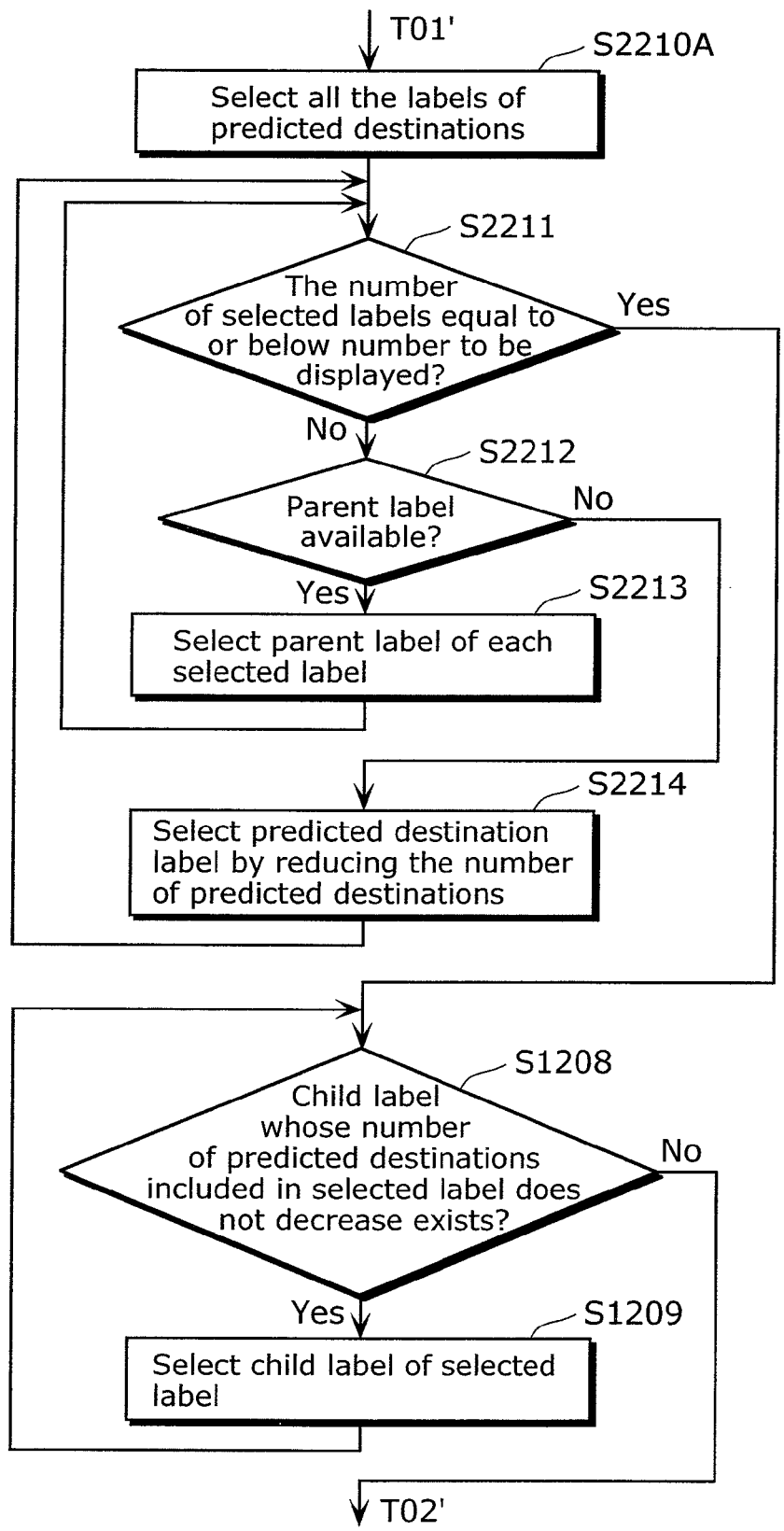
FIG. 49 is a flow chart showing an example of operations of a label selecting unit according to the second embodiment of the present invention.

The following will describe label selection operations (S2210) performed by the label selecting unit 106 in detail with reference to FIG. 49.

When the number-to-be-displayed obtaining unit 105 obtains the number of destination name labels (Step S1204 in FIG. 48), the destination selecting unit 1307 selects, in a hierarchical structure accumulated by the label accumulating unit 104, all of the destinations obtained by the destination obtaining unit 1303 (Step S2210A). The first label selecting unit 1308 determines whether the number of the labels selected by the destination selecting unit 1307 is equal to or below the number to be displayed obtained by the number-to-be-displayed obtaining unit 105 (Step S2211). When the number of the selected labels is equal to or below the number to be displayed, the flow advances to Step S1208 (Yes in Step S2211). When the number of the selected labels exceeds the number to be displayed, the flow advances to Step S2212 (No in Step S2211). The first label selecting unit 1308 determines whether a label whose parent label is determined as available exists among the selected labels (Step S2212). When the label exists, the flow advances to Step S2213 (Yes in Step S2212).

When the label does not exist, the flow advances to Step S2214 (No in Step S2212). When the label whose parent label is determined as available exists among the selected labels, the first label selecting unit 1308 selects parent labels for all of the labels whose parent labels are determined as available among the selected labels (Step S2213), and the flow returns to Step S2211. When the label whose parent label is determined as available does not exists among the selected labels, the destination selecting unit 1307 selects, from the selected predicted destination labels, a predicted destination label except a predicted destination having the lowest ranking in prediction (Step S2214), and the flow returns to Step S2211. When the number of the selected labels is equal to or below the number to be displayed, the second label selecting unit 109 determines whether a selected label including a child label whose number of predicted destinations does not decrease exists (Step S1208). When the selected label exists, the flow advances to Step S1209 (Yes in Step S1208). When the selected label does not exist, the flow advances to Step S1212 in FIG. 48 (No in Step S1208). When the selected label including the child label whose number of the predicted destinations does not decrease exists, the second label selecting unit 109 selects, instead of the selected label, the child label whose number of the predicted destinations does not decrease and which is included in the selected label (Step S1209), and the flow returns to Step S1208.

Consequently, the information regarding all of the predicted destinations can be presented even when the number of the destination name labels to be displayed is limited. In addition, this prevents a decrease in the number of pieces of useful information to be displayed, the decrease being caused by presenting to the user information that has a too low degree of detail and is not useful.

It is to be noted that instead of calculating information regarding labels directly from the information obtained by the information obtaining unit 1311 and displaying the calculated information, the display unit 113 may calculate information regarding the labels selected by the label selecting unit 1306, using information regarding each of the predicted destinations, which is calculated by the first information calculating unit 1317, and display the calculated information. The structural example of the display unit 113 will be described. The display unit 113 includes: a second information calculating unit 112 which combines pieces of information each regarding a destination indicated by a corresponding one of the labels, which is calculated by the first information calculating unit 1317, and calculates information regarding each of labels selected by the label selecting unit 106; and an information display unit 132 which displays the information regarding the label together with a label name of the label.

Figure 50:
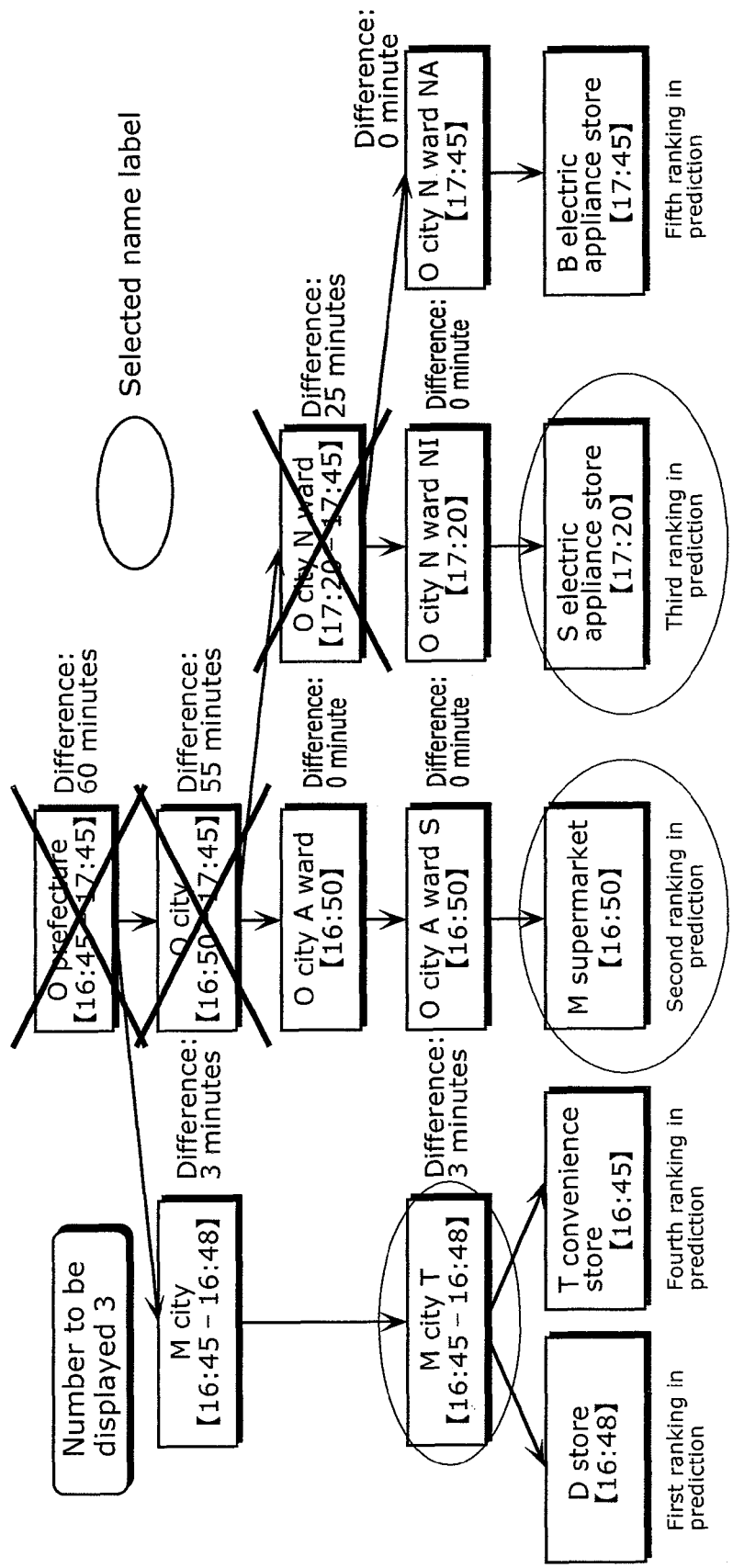
FIG. 50 is a diagram showing an example where the label selecting unit selects labels.

The second information calculating unit 112 calculates the information regarding each label selected by the label selecting unit 106, using the information regarding each predicted destination which is calculated by the first information calculating unit 1317. For instance, as shown in FIG. 50, when the label selecting unit 1306 selects three labels, "M city T", "M supermarket", and "S electric appliance store", the second information calculating unit 112 calculates the arrival time at "M city T", the parent of "D store" and "T convenience store", as "16:45 to 16:48", based on information calculated by the first information calculating unit 1317, that is, the arrival time at "D store" "16:48" and the arrival time at "T convenience store" "16:45". In addition, the arrival time at "M supermarket" is "16:50", and the arrival time at "S electric appliance store" is "17:20.

The information display unit 132 displays, together with each name of a corresponding one of the labels selected by the label selecting unit 106, the information regarding each label, the information being obtained by the second information calculating unit 112.

Moreover, the time determining unit 1320 uses a fixed value as a threshold value for determining the label availability in the second embodiment. The smaller a difference between an arrival time and a current time is, that is, the shorter a required time is, information in which the range of the arrival time is wide is not useful for the user. Conversely, the longer the required time is, even information in which the range of the arrival time is wide is useful for the user. Accordingly, the longer a required time to a predicted destination is, the larger a threshold value may be.

Figure 51:
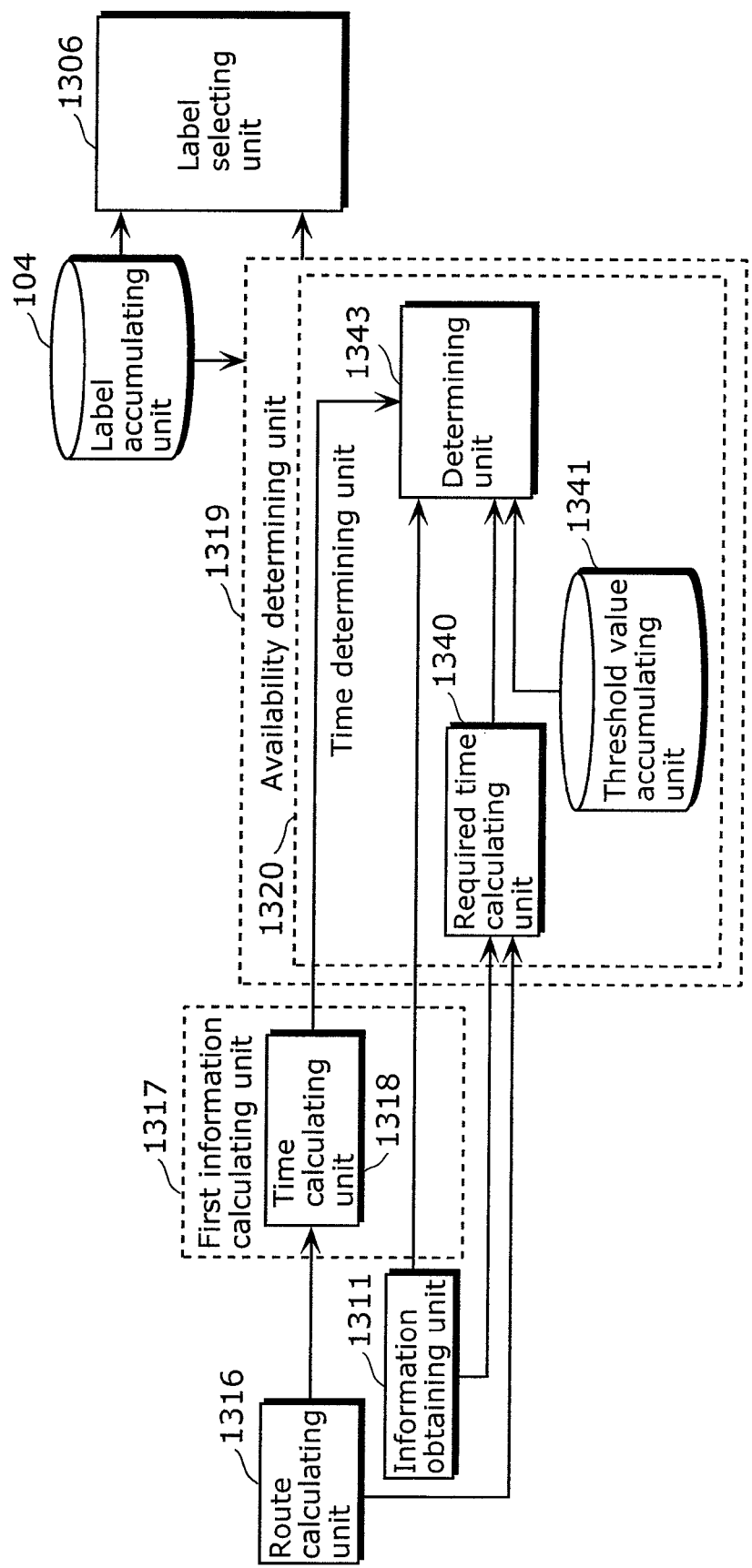
FIG. 51 is a block diagram showing a structure of a time determining unit.

FIG. 51 is a block diagram showing the structure of the time determining unit 1320 according to the second embodiment.

The time determining unit 1320 includes: a required time calculating unit 1340 which calculates a required time from a present location to a predicted destination; a threshold value accumulating unit 1341 which accumulates a threshold value rule; a determining unit 1343 which determines label availability based on the required time, the threshold value rule, and a difference between arrival times at predicted destinations. Hereinafter, each of the components will be first described with reference to the drawings, and operations of the present apparatus will be subsequently described. It is to be noted that the same numerals are given to the same components as the second embodiment, and description of the components is not repeated.

The required time calculating unit 1340 calculates, from information obtained by the information obtaining unit 1311 and each route to the corresponding one of the predicted destinations obtained by the route calculating unit 1316, a required time from a present location to each predicted destination. It is to be noted that a difference between the arrival times at the predicted destinations and a current time may be a required time, the arrival times being calculated by the time calculating unit 1318.

The threshold value accumulating unit 1341 accumulates a threshold value rule defined by associations between required times and threshold values. In an example shown in FIG. 52, a threshold value is 1 minute for a required time ranging from 0 to less than 10 minutes. In addition, a threshold value is 5 minutes for a required time ranging from 10 to less than 30 minutes. A rule is specified such that the larger a required time is, the larger a threshold value is.

The determining unit 1343 determines, for a label accumulated by the label accumulating unit 104, a threshold value using required times for predicted destinations included by descendants of the label and the threshold value rule accumulated by the threshold value accumulating unit 1341, and determines label availability based on the threshold value and a difference between the required times for the predicted destinations. For example, in the case of FIG. 53A, a label "B city" includes, as descendants, a predicted destination "H store" (required time 70 minutes and arrival time 18:10) and a predicted destination "I convenience store" (required time 82 minutes and arrival time 18:22). Here, the determining unit 1343 determines availability of the label "B city". The required time to one of the predicted destinations included by "B city" is either 70 minutes (H store) or 82 minutes (I convenience store). Among the required times, the shorter required time 70 minutes is used. Assuming that a threshold value rule as shown in FIG. 52 is accumulated, a threshold value is 15 minutes because the required time 70 minutes is above 60 minutes. The determining unit 1343 determines that the label "B city" is available because a time difference between the predicted destinations included by the label "B city" is 12 minutes (18:22−18:10) and is below the threshold value 15 minutes. On the other hand, in the case of FIG. 53B, a label "C city" includes, as descendants, a predicted destination "J bookstore" (required time 20 minutes and arrival time 17:20) and a predicted destination "K supermarket" (required time 32 minutes and arrival time 17:32). Here, the determining unit 1343 determines availability of the label "C city". The required time to one of the predicted destinations included by "C city" is either 20 minutes (17:20−17:00) or 32 minutes (17:32−17:00). Among the required times, the shorter required time 20 minutes is used. A threshold value is 5 minutes because the required time 20 minutes is in the range from 10 to less than 30 minutes as shown in FIG. 52. The determining unit 1343 determines that the label "C city" is unavailable because a time difference between the predicted destinations included by the label "C city" is 12 minutes (17:32−17:20) and is above the threshold value 5 minutes.

This allows only useful information to be presented efficiently.

Figure 54:
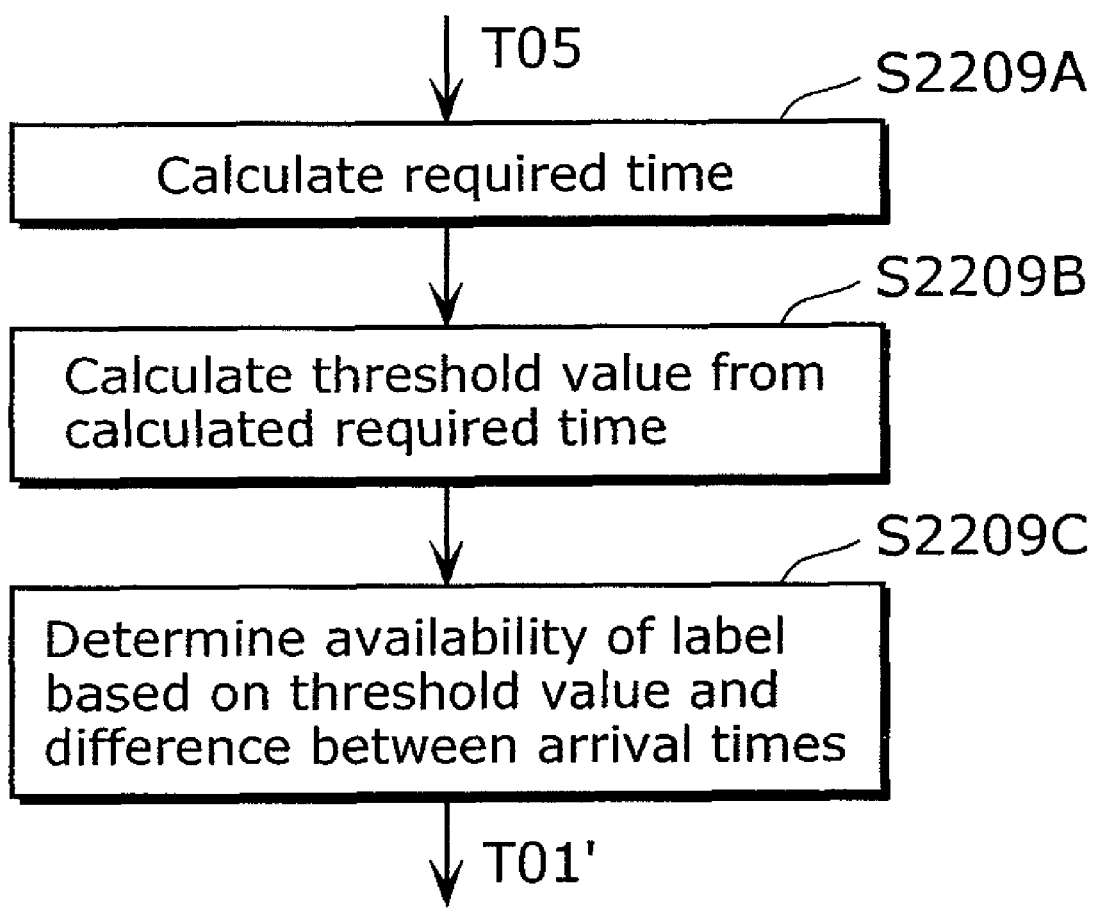
FIG. 54 is a diagram showing an example of operations of an availability determining unit when a threshold value for determining label availability based on a required time to a predicted destination is changed.

Hereinafter, the determination operations (S2209) of the time determining unit 1320 will be described in detail with reference to FIG. 54.

The required time calculating unit 1340 calculates a required time from a present location to each of predicted destinations (step S2209A) after the number-to-be-displayed obtaining unit 105 obtains the number of predicted destination labels to be displayed (Step S1204). The determining unit 1343 determines, for a label accumulated by the label accumulating unit 104, a threshold value using required times for predicted destinations included by descendants of the label and the threshold value rule accumulated by the threshold value accumulating unit 1341 (Step S2209B). The determining unit 1343 determines label availability based on the threshold value and a difference between the required times for the labels (Step S2209C). Steps following the above are the same as the second embodiment.

Figures 55A, 55B:
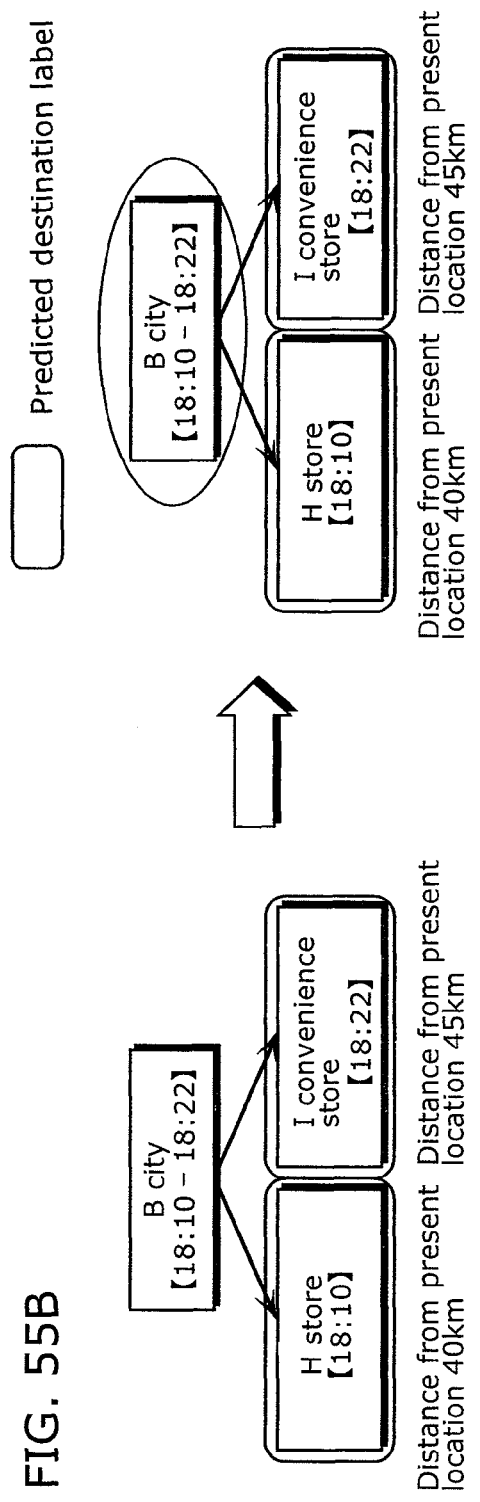
FIG. 55A is a diagram showing an example of a rule defining threshold values which is accumulated in the threshold value accumulating unit.
FIG. 55B is a diagram showing an example where a threshold value for determining label availability based on each of distances to a corresponding one of predicted destinations.

It is to be noted that especially when there is no traffic jam, a threshold value may be increased as a distance from a present location becomes greater because a required time is proportional to the distance from the present location. For instance, the distance calculating unit calculates a distance from a present location to each of predicted destinations, using the routes calculated by the route calculating unit, and the threshold value accumulating unit 1341 accumulates a threshold value rule for the distance from the present location to each predicted destination as shown in FIG. 55A. In the case of FIG. 55A, a threshold value is 1 minute when a distance from a present location to a predicted destination is in the range from 0 to less than 10 km. As shown in FIG. 55B, it is assumed that a label "B city" includes, as descendants, a predicted destination "H store" (distance 40 km) and a predicted destination "I convenience store" (distance 45 km). Here, the time determining unit 1320 determines availability of the label "B city". The distance to one of the predicted destinations included by the label "B city" is either 40 km or 45 km. Among the distances, the shorter distance 40 km is used. According to the threshold value rule, a threshold value is 15 minutes because the distance 40 km is above 30 km. The determining unit 1343 determines that the label "B city" is available because a time difference between the predicted destinations included by the label "B city" is 12 minutes (18:22–18:10) and is below the threshold value 15 minutes.

Figure 56:
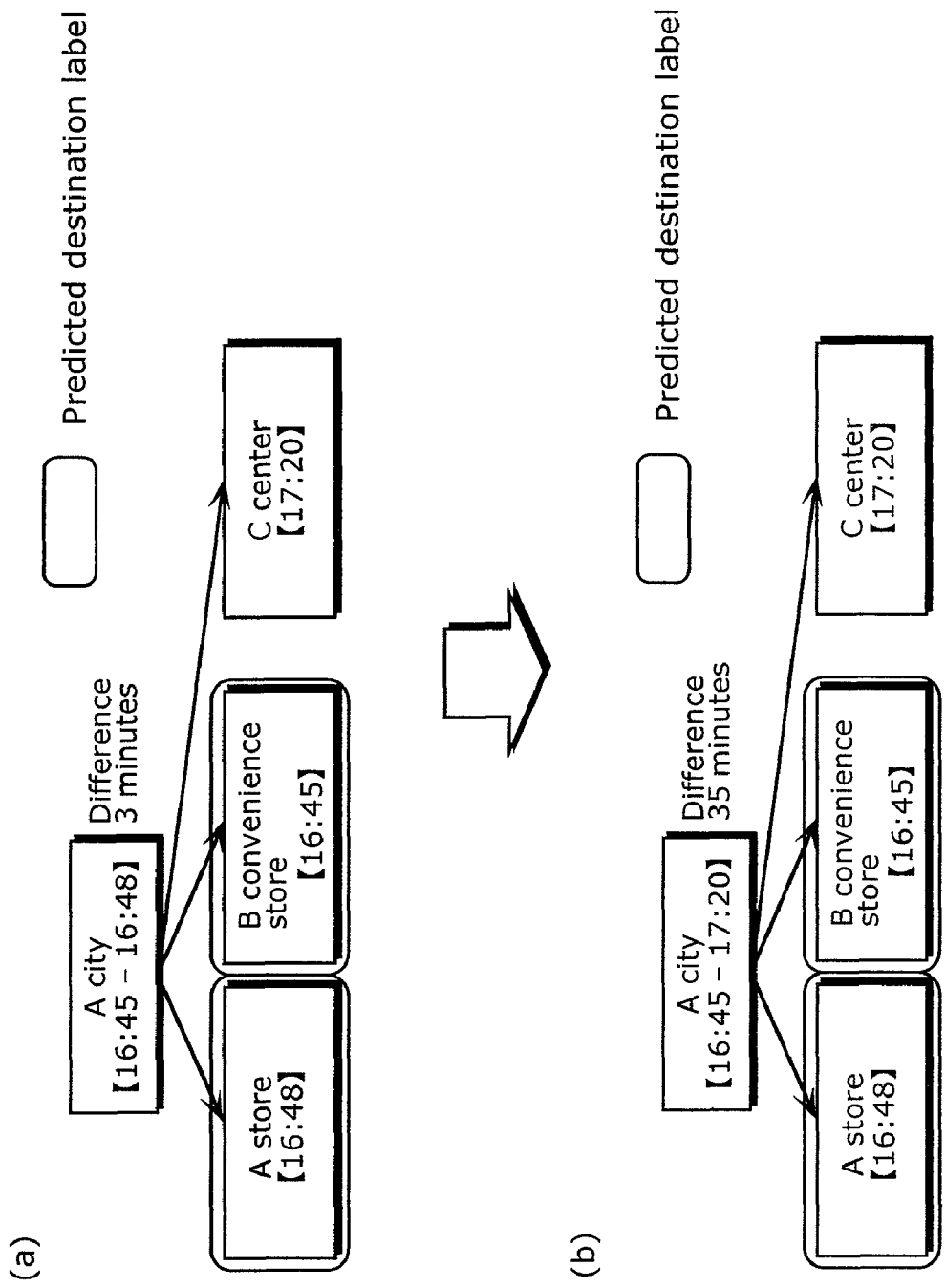
FIG. 56 is a diagram showing an example where the availability determining unit reviews the lowest-layer labels other than predicted destinations.

Furthermore, although the label is determined as unavailable when the difference between the arrival times at the predicted destinations indicated by the descendants of the label is large in the second embodiment, there is a chance that facilities other than a predicted destination are considered for a label displayed and having a low degree of detail especially when the destination is an area familiar to the user such as the residential area of the user. For example, as shown in FIG. 56(a), it is assumed that "A store" and "B convenience store" have been obtained as predicted destinations. The maximum difference between the arrival times at "A store" and "B convenience store" is 3 minutes ("16:48"–"16:45") because the predicted destinations, which are descendants of a label "A city", are "A store" (arrival time 16:48) and "B convenience store" (arrival time 16:45). However, it is assumed that one of descendants of A city in a hierarchical structure is "C center" (arrival time 17:20). There is a chance that when an arrival time at "A city" is displayed, even though predicted destinations do not include "C center", the arrival time is thought to include an arrival time at "C center" if the user went to "C center" in the past. Thus, a technique is devised that the display unit 113 calculates the maximum value and the minimum value of the arrival times at "A store", "B convenience store", and "C center" in consideration of "C center", and displays "A city arrival time 16:45 to 17:20".

However, there is a chance that useless information is displayed because the range defined by the values of the arrival times is wide here. Accordingly, the time determining unit 1320 may calculate a time difference between all of the lowest-layer destination labels that are descendants of a label and the user has visited. That is to say, as shown in FIG. 56(b), the time determining unit 1320 calculates, for the label "A city", a time difference between all of the lowest-layer destination labels as 35 minutes ("17:20"–"16:45"). When the time difference 35 minutes exceeds a threshold hold value, the label "A city" is determined as unavailable. For instance, when the threshold value is 15 minutes, the label "A city" is determined as unavailable. This prevents the user from badly misunderstanding display information.

Figure 57:
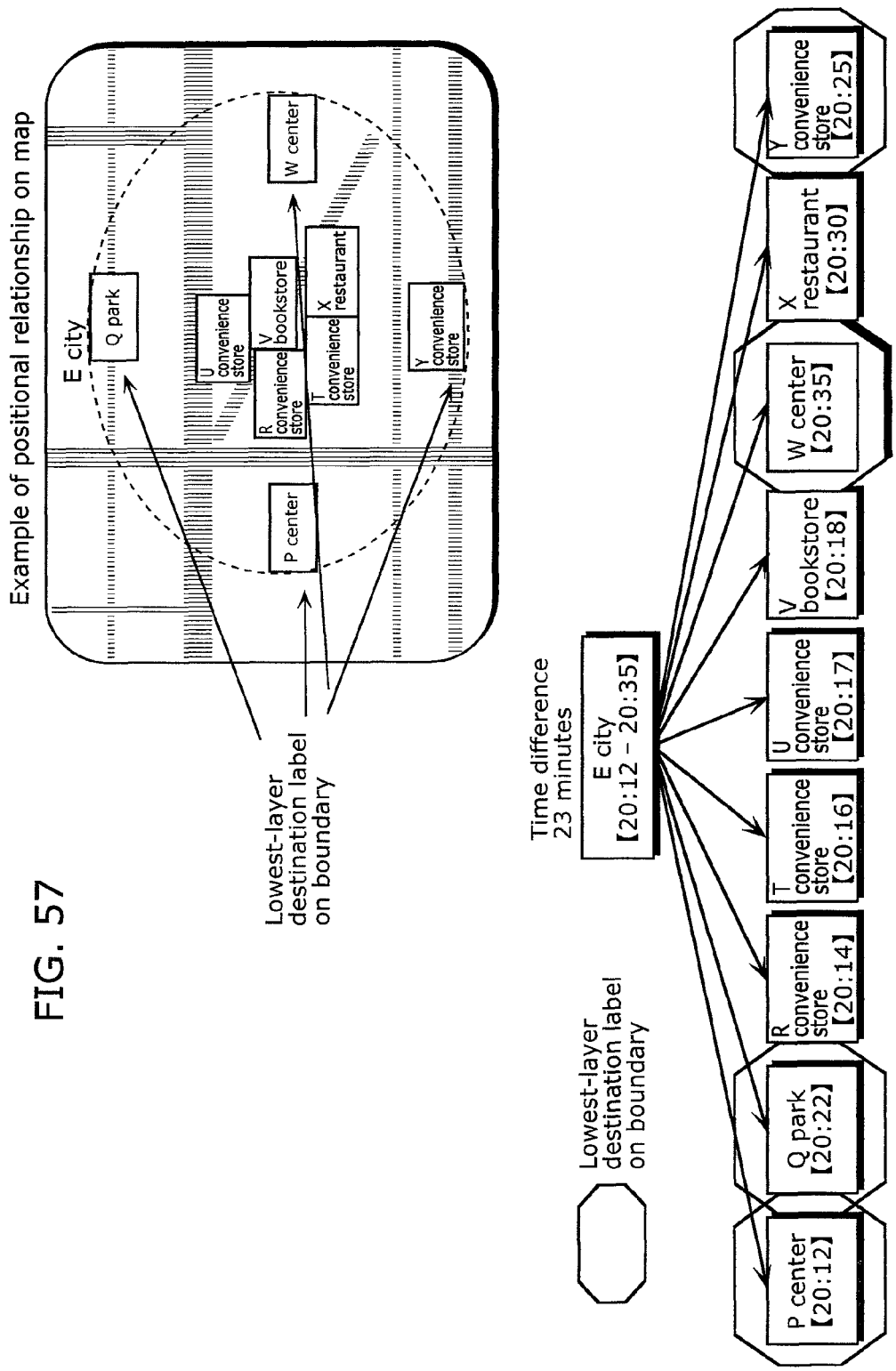
FIG. 57 is a diagram showing an example where only destination labels on a boundary are reviewed.

Moreover, time difference calculation may be performed only on destination labels near the boundary of a map area indicated by a label because the largest time difference is usually a time difference between facilities on the boundary of the map area indicated by the label. The label accumulating unit 104 stores, for each of labels, a map area indicated by the label. For example, in the case of FIG. 57, the label accumulating unit 104 stores, for "E city", latitude and longitude information of the boundary of "E city". The lowest-layer destination labels on the boundary of a map area of the label "E city" are "P center" (arrival time "20:12"), "Q park" (arrival time "20:22"), "W center" (arrival time "20:35"), and "Y convenience store" (arrival time "20:25"). Accordingly, the time difference of the label "E city" is the time difference 23 minutes ("20:35"–"20:12") of the destination labels. For instance, when a threshold value is 15 minutes, the label "E city" is determined as available because the time difference of the label "E city" exceeds 15 minutes. This allows the time difference to be calculated without considering the arrival times of destination labels not on a boundary.

Further, the label in which the difference between pieces of information each regarding a corresponding one of the predicted destinations included by the descendants of the label is large is determined as unavailable in the second embodiment. It is to be noted that a label including a current position of a mobile terminal in a map area indicated by the label may be determined as unavailable. There is a chance that the user misunderstands a predicted destination indicated by a display label for a present location when the label including the current position of the mobile terminal is used. In addition, even presenting display information is not often useful for the user because the display information includes the information of the current position. Accordingly, the availability determining unit 1319 may determine the label including the current position of the mobile terminal as unavailable.

First Modification of Second Embodiment

The information regarding the arrival time is calculated for each label in the second embodiment. However, as with even information other than the arrival time, the availability determining unit 1319 determines that a label is unavailable, when descendants of the label include predicted destinations and a difference between pieces of information each regarding a corresponding one of the predicted destinations is large, and determines that the label is available, in a case other than the above. As a result, it is possible to prevent the presentation of lowly accurate and useless information. The first modification will be described using traffic jam information as an example.

The following will describe the technique of the present modification.

Figure 58:
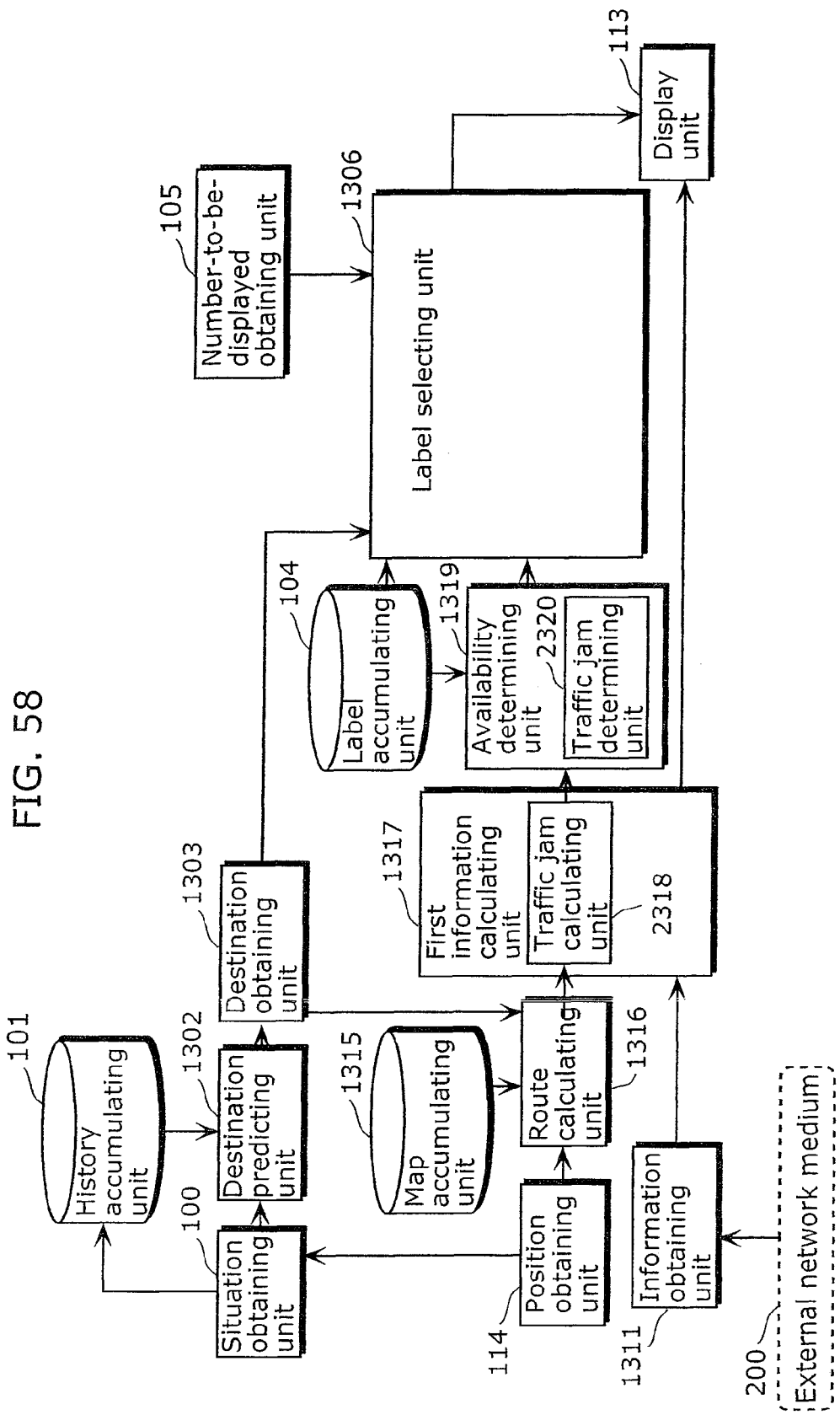
FIG. 58 is a block diagram showing a structure of a destination display apparatus in a first modification according to the second embodiment of the present invention.

FIG. 58 is a block diagram showing a structure of a destination display apparatus according to the present modification. The same numerals are given to the same components indicated by the first and second embodiments, and description of the components is not repeated. Hereinafter, each of the components will be first described with reference to the drawings, and operations of the present apparatus will be subsequently described.

A traffic jam calculating unit 2318 calculates traffic jam information from the information obtained by the information obtaining unit 111 and the route to the predicted destination obtained by the route calculating unit 1316. For example, it is assumed that a route calculated for a predicted destination "Home" by the route calculating unit 1316 is a road link ID series "012 to 020 to 012 to 022", and the traffic jam calculating unit 2318 calculates traffic jam information on the route. For instance, when it is assumed that the information obtaining unit 111 has obtained information that 1-km traffic jam on a route "020 to 021", the traffic jam calculating unit 2318 calculates, for the predicted destination "Home", traffic information that there is the 1-km traffic jam on the route "020 to 021".

A traffic jam determining unit 2320 determines whether or not labels accumulated by the label accumulating unit 104 are available for label selection, using traffic information regarding each predicted destination calculated by the traffic jam calculating unit 2318. More specifically, the traffic jam determining unit 2320 determines that the label is unavailable when descendants of the label include predicted destinations and pieces of traffic information each regarding the corresponding one of the predicted destinations do not match. In a case other than the above, the traffic jam determining unit 2320 determines that the label is available.

Figure 59:
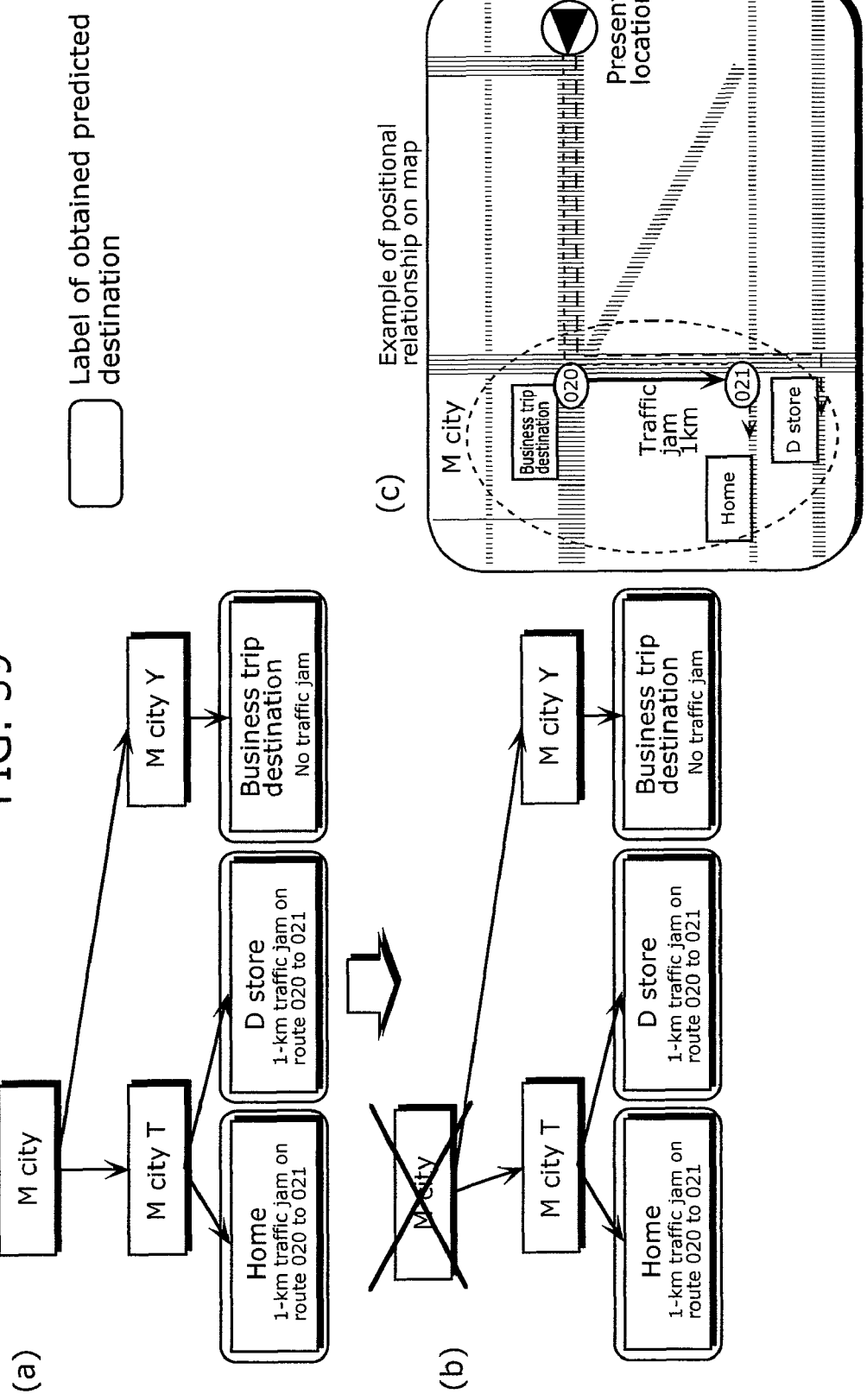
FIG. 59 is a diagram showing an example where the availability determining unit determines label availability based on traffic jam information.
Figure 60:
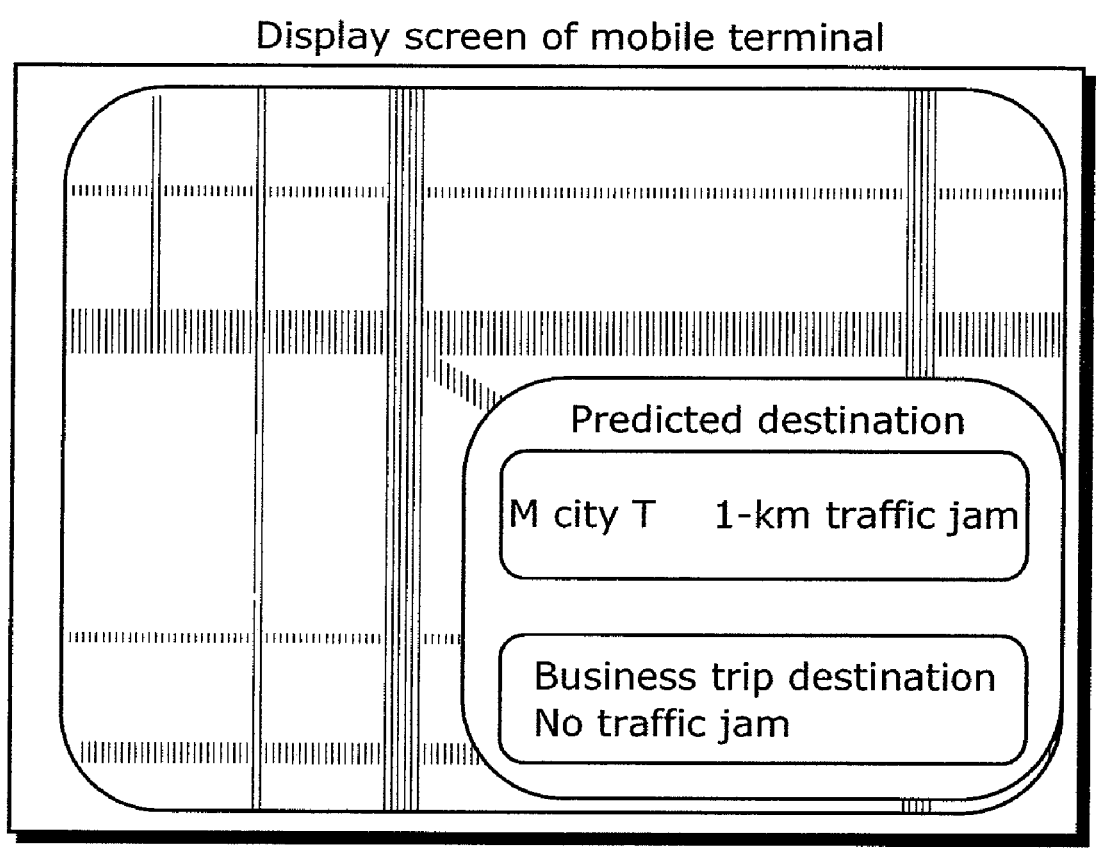
FIG. 60 is a diagram showing an example where the display unit displays labels and traffic jam information.

For example, as shown in FIG. 59(*a*), it is assumed that the label accumulating unit 104 has accumulated a label hierarchical structure, and that the destination obtaining unit 1303 has obtained predicted destinations, "Home", "D store", and "Business trip destination". Labels whose descendants do not indicate predicted destinations are omitted from the figure because the labels are obviously available. In addition, it is assumed that the traffic jam calculating unit 2318 has calculated traffic jam information that "1-km traffic jam on route 020 to 021" for the destinations "Home" and "D store" and "No traffic jam" for the destination "Business trip destination". For instance, as shown in FIG. 59(*b*), in the case of a label "M city T", predicted destinations included by descendants of the label are "Home" and "D store". The traffic jam information for each of "Home" and "D store" is "1-km traffic jam on route 020 to 021", and the pieces of the traffic jam information match. For this reason, the traffic jam determining unit 2320 determines that the label "M city T" is available. Furthermore, as for a label "M city", predicted destinations included by the descendants of the label are "Home", "D store", and "Business trip destination". Although the traffic information for each of "Home" and "D store" is "1-km traffic jam on route 020 to 021", the traffic information for "Business trip destination" is "No traffic jam". The traffic jam determining unit 2320 determines that the label "M city" is unavailable because the traffic information "1-km traffic jam on route 020 to 021" and the traffic information "No traffic jam" differ from each other and do not match. It is to be noted that FIG. 59(*c*) shows a position relationship between the predicted destinations on a map.

The display unit 113 displays the information calculated by the first information calculating unit 1317, together with label names selected by the label selecting unit 1306. For example, it is assumed that the label selecting unit 1306 has selected two labels, "M city T" and "Business trip destination", and that traffic jam information for both of predicted destinations "Home" and "D store", which are included by the label "M city T", is "1-km traffic jam on route 020 to 021" and traffic jam information for a predicted destination "Business trip destination", which is included by the label "Business trip destination", is "No traffic jam". Here, the display unit 113 calculates the traffic jam information for the label "M city T" as "1-km traffic jam on route 020 to 021" and the traffic information for the label "Business trip destination" as "No traffic jam", and displays sets of a label and information on a mobile terminal.

This prevents inconsistency in understanding displayed information from occurring because a combined label having a low degree of detail is used only for destinations having identical traffic jam information.

Figure 61:
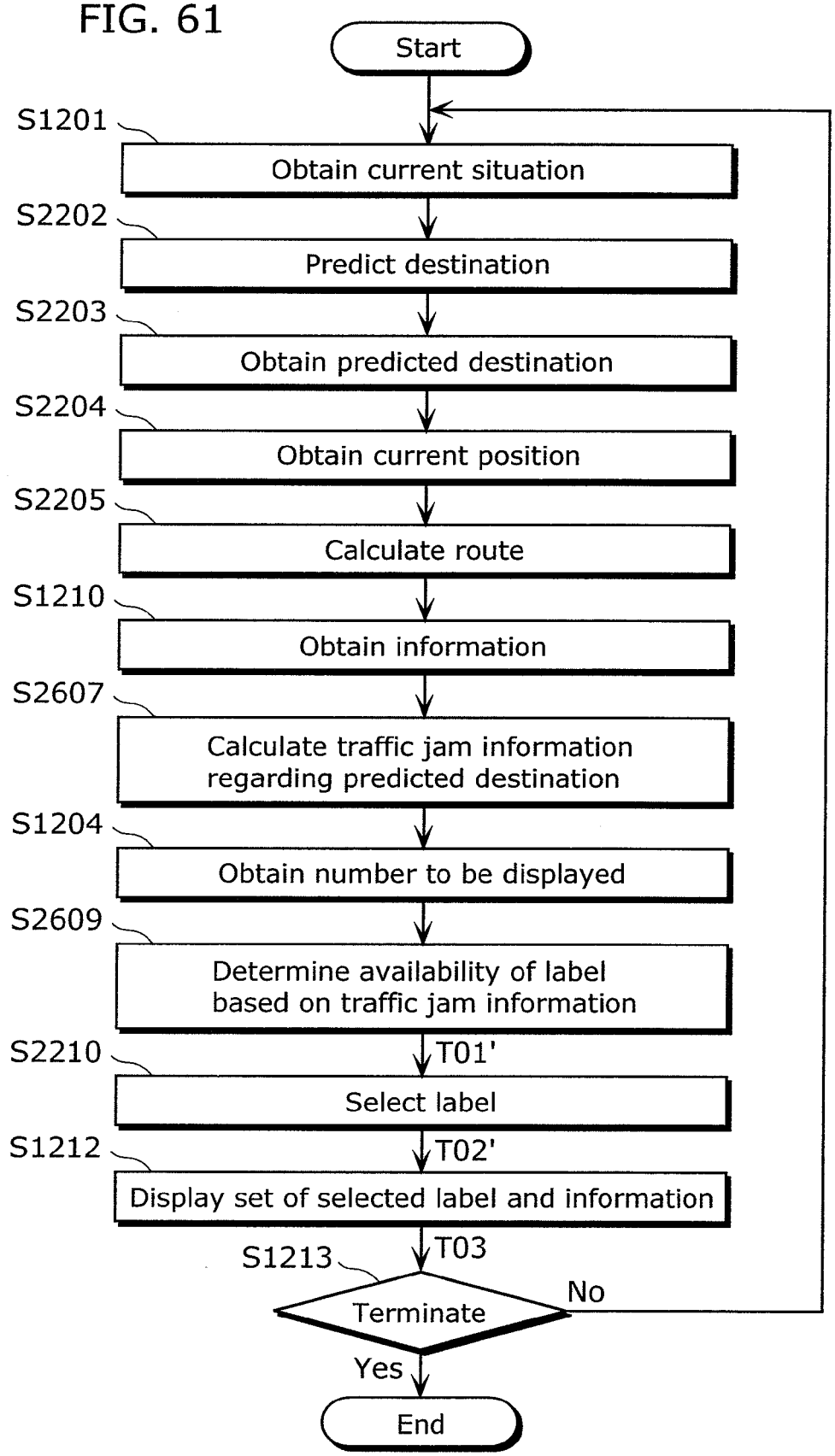
FIG. 61 is a flow chart showing an example of operations of the destination display apparatus in the first modification according to the second embodiment of the present invention.

Hereinafter, operations of a destination display apparatus according to the first modification of the second embodiment will be described with reference to the flow chart of FIG. 61. The flow described in the first and second embodiments is not described in detail again.

As with the second embodiment, after obtaining the information, the traffic jam calculating unit 2318 calculates traffic jam information from the information obtained by the information obtaining unit 111 and the route to the predicted destination obtained by the route calculating unit 1316 (Step S2607). The number-to-be-displayed obtaining unit 105 obtains the number of destination name labels that the display unit 113 displays on a screen of a mobile terminal (Step S1204). The traffic jam determining unit 2320 determines whether or not labels accumulated by the label accumulating unit 104 are available for label selection, using traffic information regarding each predicted destination calculated by the traffic jam calculating unit 2318 (Step S2609). Steps following the above are the same as the second embodiment.

It is to be noted that information to be displayed is arrival time information in the second embodiment, and information to be displayed is traffic jam information in the first modification of the second embodiment. There is a case where the destination display apparatus switches between plural pieces of information and display the switched information when the user switches between modes. For instance, there are cases where labels are displayed together with arrival times and where labels are displayed together with traffic jam information. Here, labels to be displayed may be changed depending on types of display information, even though the labels belong to the same group of destinations.

The following will describe the technique of the present modification.

Figure 62:
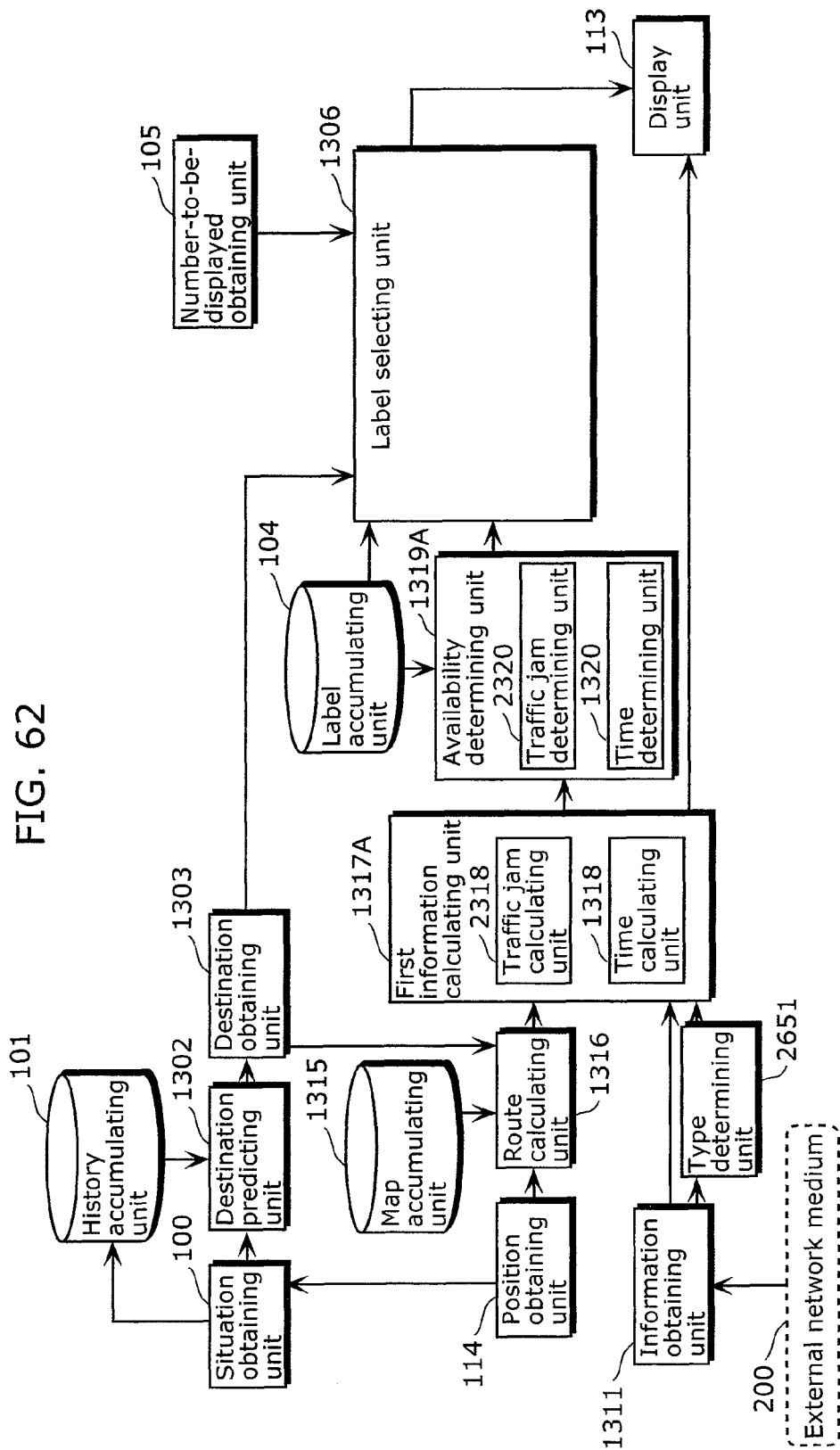
FIG. 62 is a block diagram showing a structure of the destination display apparatus when labels in use are changed depending on types of display information.

FIG. 62 is a block diagram showing a structure of a destination display apparatus according to the present modification. The same numerals are given to the same components indicated by the first and second embodiments, and description of the components is not repeated. Hereinafter, each of the components will be first described with reference to the drawings, and operations of the present apparatus will be subsequently described.

A type determining unit 2651 determines a type of information that the display unit 113 is currently about to display. For example, when information obtained by the information obtaining unit 1311 is information regarding a required time for a route and an arrival time at a destination, the type determining unit 2651 determines that the type of the information is arrival time. In addition, when information obtained by the information obtaining unit 1311 is traffic jam information of a route, the type determining unit 2651 determines that the type of the information is traffic jam information. It is to be noted that the display unit 113 may be designed to, by an input from the user or a terminal, switch between an arrival time display mode for displaying an arrival time and a traffic jam information display mode for displaying traffic jam information, and the type determining unit 2651 may determine a type of display information based on a mode stored by the terminal.

A first information calculating unit 1317A calculates information of the type determined by the type determining unit 2651, using the route information regarding each of the predicted destinations calculated by the route calculating unit 1316 and the information obtained by the information obtaining unit 1311. The first information calculating unit 1317A includes, for example, a time calculating unit 1318 which calculates arrival time information for each predicted destination, and a traffic jam calculating unit 2318 which calculates traffic jam information. When the type determining unit 2651 determines that a type of display information is arrival time, the time calculating unit 1318 calculates an arrival time. When the type determining unit 2651 determines that a type of display information is traffic jam information, the traffic jam calculating unit 2318 calculates an arrival time. An availability determining unit 1319A determines label availability using the information calculated by the first information calculating unit 1317A. The availability determining unit 1319A includes, for example, a time determining unit 1320 which determines label availability based on an arrival time, and a traffic jam determining unit 2320 which determines label availability based on traffic jam information. When the type determining unit 2651 determines that a type of information is arrival time, as described in the second embodiment, the time determining unit 1320 determines the label availability. When the type determining unit 2651 determines that a type of information is traffic jam information, as described in the first modification of the second embodiment, the traffic jam determining unit 2320 determines the label availability.

Accordingly, an appropriate label in which a difference between pieces of information each regarding a corresponding one of the predicted destinations included by the label is small is selected regardless of types of information to be displayed.

Figure 63:
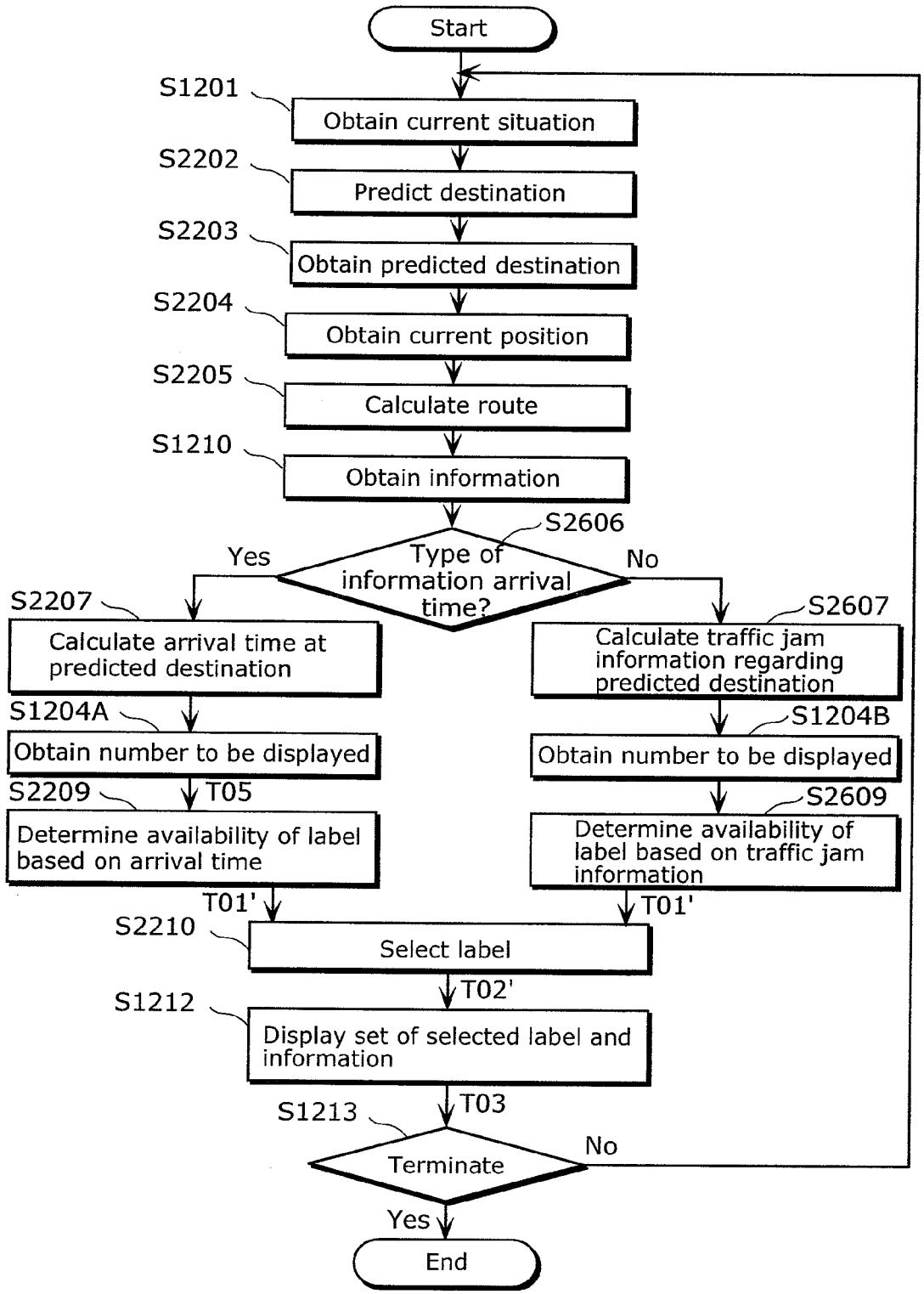
FIG. 63 is a flow chart showing an example of operations of the destination display apparatus when labels in use are changed depending on types of display information.

Hereinafter, operations of the destination display apparatus according to the present modification will be described with reference to the flow chart of FIG. 63. The flow described in the second embodiment and the first modification of the second embodiment will not be described in detail again.

As with the second embodiment, after obtaining the information, the type determining unit 2651 determines a type of information that the display unit 113 is about to display (Step S2606). When the type of the information is arrival time, the flow advances to Step S2207 (Yes in Step S2606). When the type of the information is traffic jam information, the flow advances to Step S2607 (No in Step S2606). Steps following the above are the same as the second embodiment.

Second Modification of Second Embodiment

Figure 64:
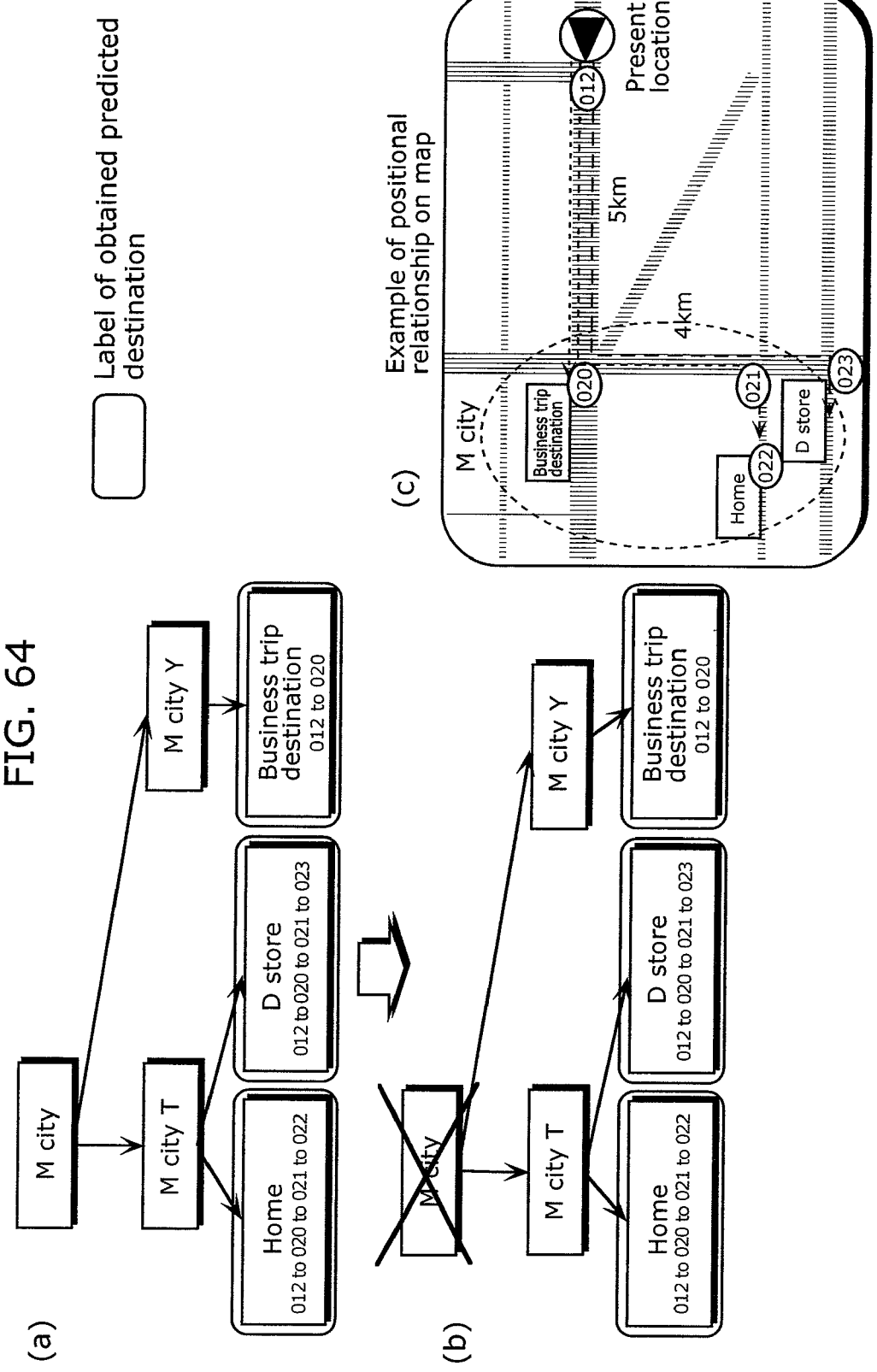
FIG. 64 is a diagram showing an example where the availability determining unit determines label availability based on route information.

In the second embodiment and the first modification of the second embodiment, when the difference between pieces of the display information each regarding a corresponding one of the predicted destinations included by the label is large, the label is determined as unavailable, and in a case other than the above, the label is determined as available. Information regarding each of predicted destinations is generally information regarding each of routes, and a difference between the pieces of information each regarding the corresponding one of the predicted destinations is large when a degree of matching between routes to the predicted destinations is low. Hence, when especially pieces of various information regarding a corresponding one of the routes such as arrival times, traffic jam information, and construction information are not switched depending on a mode but are simultaneously presented, the label availability may be determined only based on a difference between pieces of route information. This allows each piece of various information to be presented with a corresponding one of common label names. More specifically, when descendants of a label include predicted destinations and a proportion of a portion matching in routes to the predicted destinations is below a predetermined proportion of all the routes, the availability determining unit determines that the label is unavailable. In a case other than the above, the availability determining unit determines that the label is available. For example, as shown in FIG. 64($a$), it is assumed that the label accumulating unit 104 has accumulated a label hierarchical structure, and that the destination obtaining unit 1303 has obtained predicted destinations, "Home", "D store", and "Business trip destination". A predetermined proportion is assumed to be 0.8. Labels whose descendants do not indicate predicted destinations are omitted from the figure because the labels are obviously available. In addition, it is assumed that the route calculating unit 1316 has calculated route information that a node ID series "012 to 020 to 021 to 022" (10 km) indicating a route to the destination "Home", a node ID series "012 to 020 to 021 to 023" (10 km) indicating a route to the destination "D store", and a node ID series "012 to 020" (5 km) indicating a route to the destination "Business trip destination". For instance, as shown in FIG. 64($b$), in the case of a label "M city T", predicted destinations included by descendants of the label are "Home" and "D store". A route common to "Home" and "D store" is "012 to 020 to 021" (9 km). A matching proportion of the route to "Home" is 0.9 (=9/10) because the distance of the route is 10 km. Furthermore, a matching proportion of the route to "D store" is 0.9 (=9/10) because the distance of the route is 10 km. Thus, the matching proportions of the routes are above 0.8. Therefore, the availability determining unit determines that the label "M city T" is available. Moreover, as for a label "M city", predicted destinations included by descendants of the label are "Home", "D store", and "Business trip destination". For example, a route common to "Home" and "Business trip destination" is "012 to 020" (5 km). Furthermore, a matching proportion of the route to "Home" is 0.5 (=5/10) because the distance of the route is 10 km. The availability determining unit determines that the label "M city" is unavailable because the matching proportion of the route is below 0.8. It is to be noted that FIG. 64($c$) shows a position relationship between the predicted destinations on a map.

(Determining Threshold Value Based on Distance to Destination)

It is to be noted that the availability determining unit uses the fixed value as the threshold value for determining the label availability in the second modification of the second embodiment. It is to be noted that a threshold value may increase as a distance from a present location to a destination is greater because greater the distance from the present location to the destination is, the higher a degree of similarity between pieces of information each regarding a corresponding one of routes is, even when a matching proportion is low. In addition, similarly, label availability may be determined when a distance of a portion matching in routes of predicted destinations is below a threshold value.

Furthermore, when pieces of route information each included by the corresponding one of the labels are not similar, the label is determined as unavailable in the second modification of the second embodiment. When directions from a present location to predicted destinations match, a degree of matching between routes is generally high. Hence, the label availability may be determined based on a degree of matching of directions included by descendants of a label. In particular, when the user is traveling on a major road such as a national road and traffic information regarding predicted destinations in a travelling direction is presented, the above determination is effective because simply matched directions often means a matched route. More specifically, a direction calculating unit obtains directions of predicted destinations based on a current position of a mobile terminal obtained by a position obtaining unit and on positions of the predicted destinations. A direction is, for instance, the true north direction angle in which the north is 0 degree. The availability determining unit determines whether or not the labels accumulated by the label accumulating unit 104 are available for the label selection, using a direction of each of the predicted destinations calculated by the direction calculating unit. More specifically, the availability determining unit determines that a label is unavailable when descendants of the label include predicted destinations and a difference between directions of the predicted destinations is large. In a case other than the above, the availability determining unit determines that the label is available.

Moreover, although the route calculating unit 1316 calculates, with the Dijkstra method and the like, each of the routes from the current position of the mobile terminal obtained by the position obtaining unit 114 to the corresponding one of the destinations obtained by the destination obtaining unit 1303, using the road information accumulated by the map accumulating unit 1315 in the second embodiment and the first and second modifications of the second embodiment, the destination predicting unit 1302 may predict each route to a corresponding one of predicted destinations and obtain the predicted route. This allows predicted destinations each having information common to the user to be efficiently combined because the pieces of information are compared using routes which the user is highly like to travel on.

Third Embodiment

Figure 65:
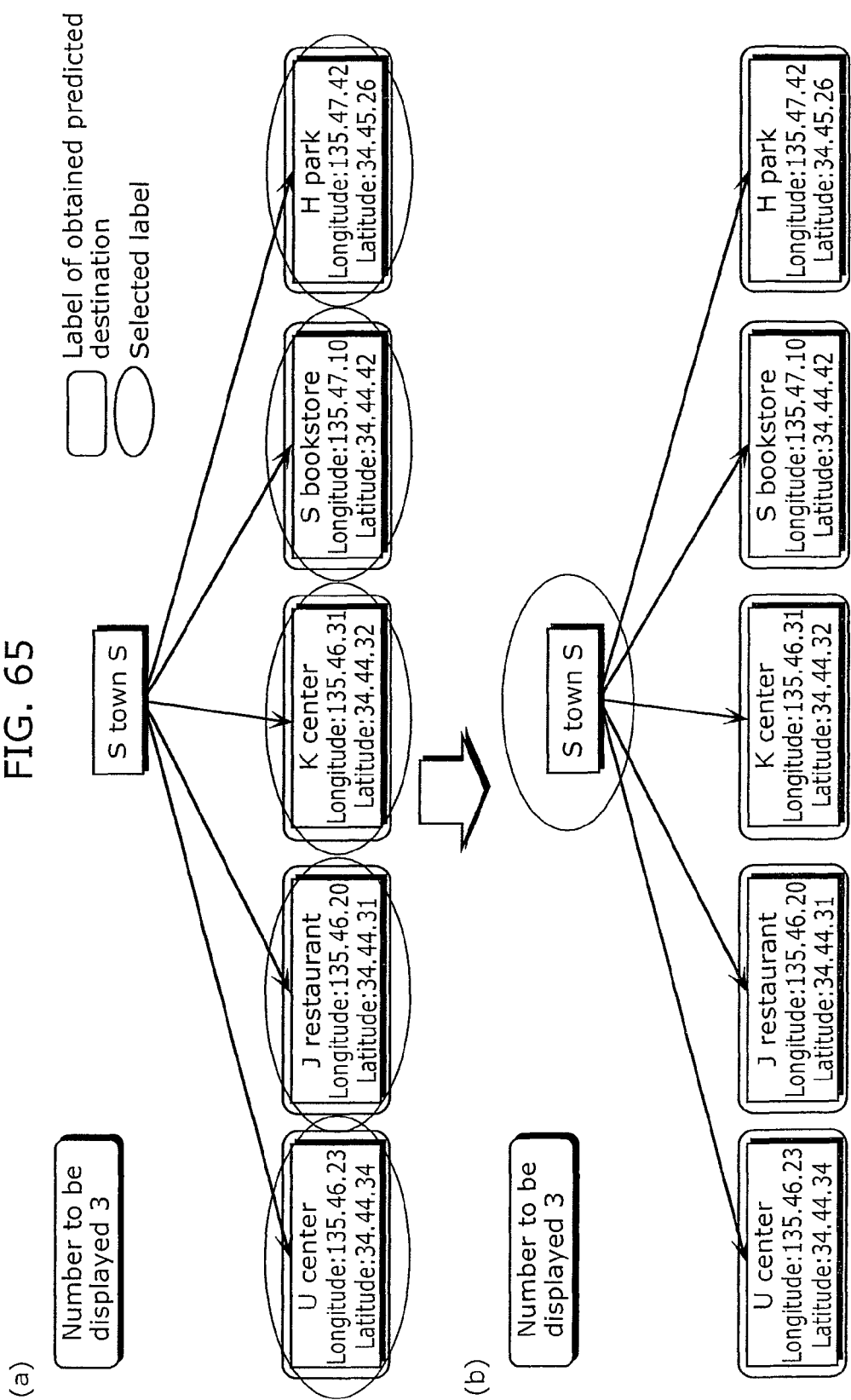
FIG. 65 is a diagram showing an example of excessive combining.
Figure 66:
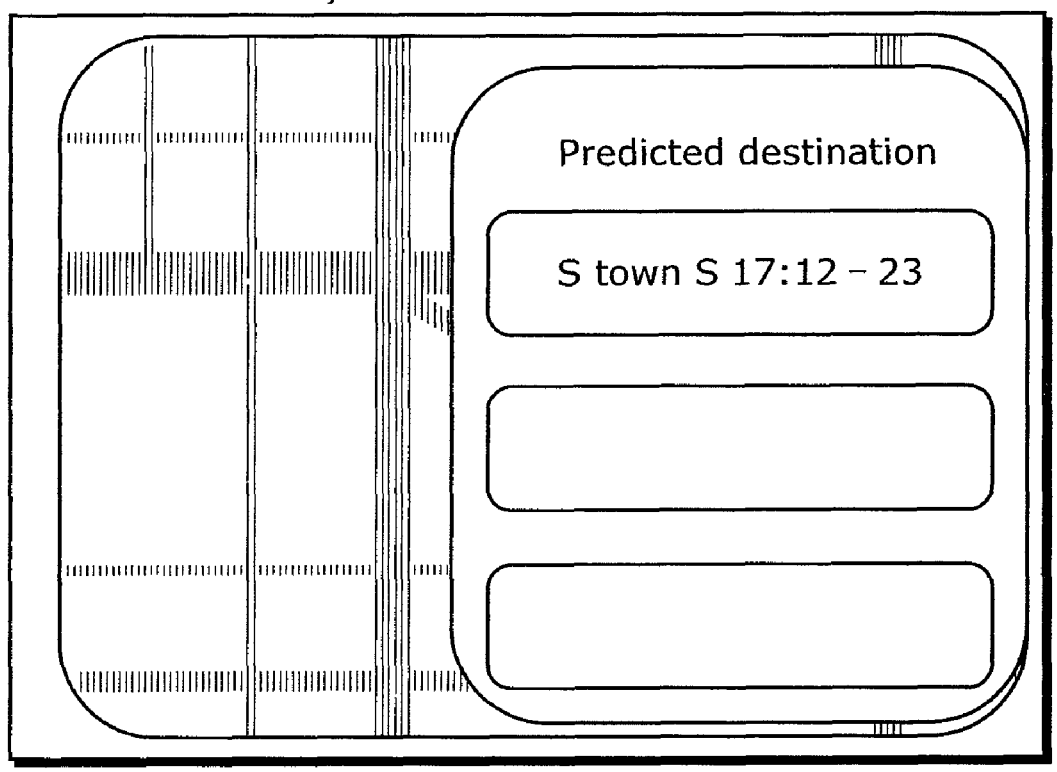
FIG. 66 is a diagram showing an example where the display unit displays a label in the case of excessive combining.

The label to be displayed is selected from the labels that have been accumulated by the label accumulating unit 104 in the first and second embodiments. However, there is a chance of reducing the accuracy of display information because, with only the labels that have been accumulated, excessively combining labels or excessively lowering a degree of detail for labels widens a map area indicated by a label and prevents the presentation of information unique to a place. For example, as shown in FIG. 65(*a*), it is assumed that the label accumulating unit 104 has accumulated a hierarchical structure, that predicted destinations, "U center", "J restaurant", "K center", "S bookstore", and "H park", and that the number of labels to be displayed is 3. Here, when a degree of detail is lowered in order to display all of the predicted destinations, all of the predicted destinations are combined into a label "S town S" as shown in FIG. 65(*b*). Thus, as shown in FIG. 66, although three labels can be displayed, only the label "S town S" is displayed. Therefore, the accuracy of display information is reduced. Accordingly, a label into which destinations having a similar short distance are combined may be dynamically generated depending on predicted destinations, and a label to be displayed may be selected from labels including the generated label. This allows a label having an appropriate degree of detail to be selected because the types of labels to be used increase. In addition, the user can easily understand a place indicated by a label because a label name of the label changes depending on predicted destinations. This is more effective because the user can easily understand label names when name labels of predicted destinations are familiar names registered by the user, for instance, especially when a predicted destination is "Home".

The following will describe a technique according to the third embodiment.

Figure 67:
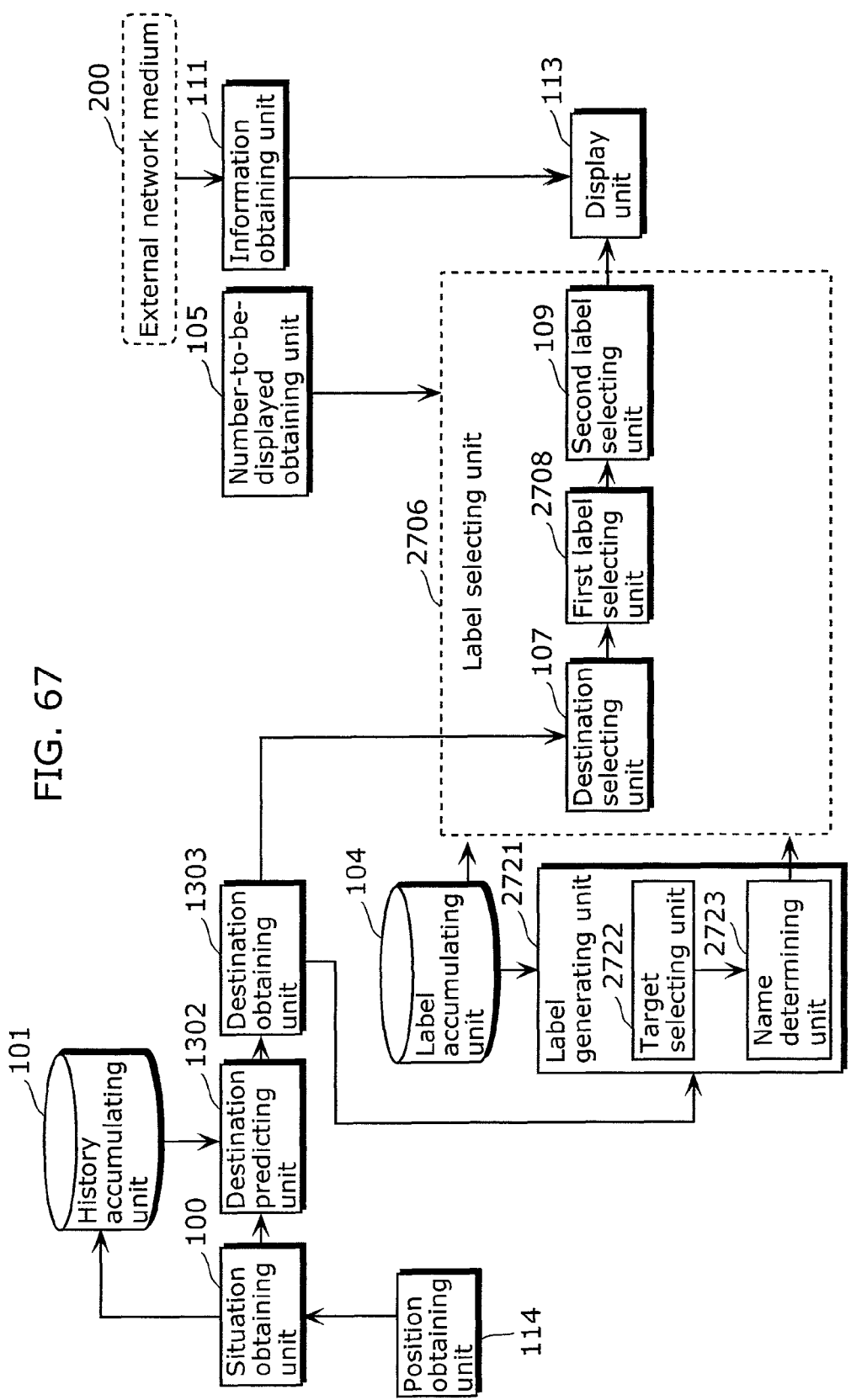
FIG. 67 is a block diagram showing a structure of a destination display apparatus according to a third embodiment of the present invention.

FIG. 67 is a block diagram showing a structure of a destination display apparatus according to the present embodiment. The same numerals are given to the same components indicated by the first and second embodiments, and description of the components is not repeated. Hereinafter, each of the components will be first described with reference to the drawings, and operations of the present device will be subsequently described.

The destination display apparatus is an apparatus for predicting destinations of a mobile terminal and displaying the predicted destinations, and, as shown in FIG. 67, includes: the position obtaining unit 114; the situation obtaining unit 100; the history accumulating unit 101; the destination predicting unit 1302; the destination obtaining unit 1303; a label generating unit 2721; the label accumulating unit 104; the number-to-be-displayed obtaining unit 105; a label selecting unit 2706; the information obtaining unit 111; and the display unit 113.

The label generating unit 2721 generates, in a hierarchical structure accumulated by the label accumulating unit 104, a new label and a parent-child relationship, using the predicted destinations obtained by the destination obtaining unit 1303 and rankings in prediction. The label generating unit 2721 includes: a target selecting unit 2722 which selects a target label to be a child of the new label; and a name determining unit 2723 which determines a name of the new label.

Figure 68:
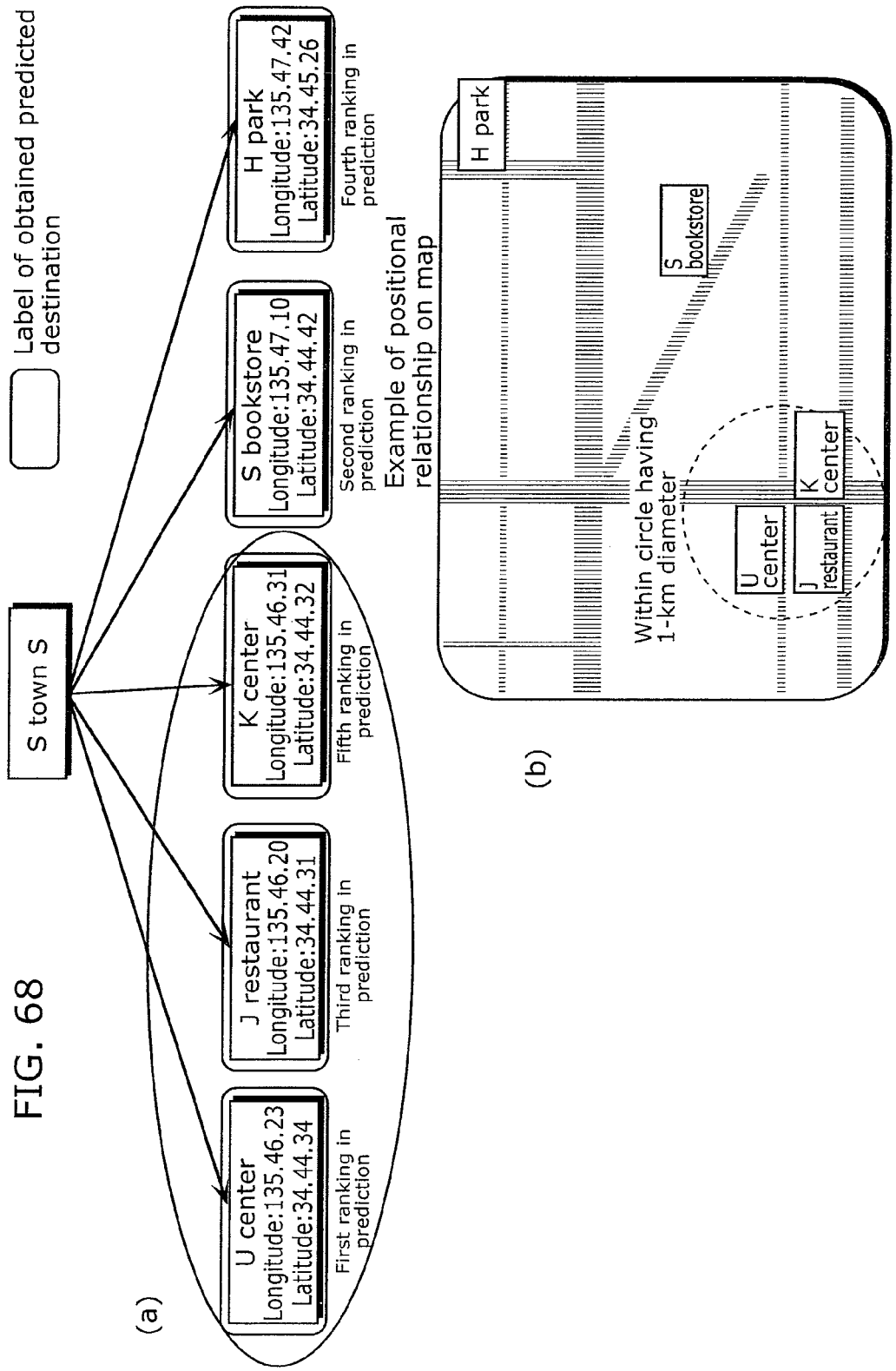
FIG. 68 is a diagram showing an example where a target selecting unit selects labels to be children of a new label.

The target selecting unit 2722 selects, from the hierarchical structure accumulated by the label accumulating unit 104, a target label to be a child of the generated new label. The target label is a name label corresponding to a predicted destination name of a predicted destination obtained by the destination obtaining unit 1303. Among predicted destinations, labels having a similar distance, that is, labels having positions within a predetermined range are target labels. For example, as shown in FIG. 68(*a*), it is assumed that the destination obtaining unit 1303 has obtained, as predicted destinations, "U center" (longitude 135. 46. 23, latitude 34. 44. 31), "J restaurant" (longitude 135. 46. 20, latitude 34. 44. 31), "K center" (longitude 135. 46. 31, latitude 34. 44. 32), "S bookstore" (longitude 135. 47. 10, latitude 34. 44. 42), and "H park" (longitude 135. 47. 42, latitude 34. 45. 26). It is to be noted that FIG. 68(*b*) shows a position relationship between the predicted destinations on a map. Here, labels having positions within a predetermined range are target labels. When a predetermined range is a circle having 1-km diameter, in the case of FIG. 68(*a*)(*b*), "U center", "J restaurant", and "K center" are selected as target labels to be children of a new label because "U center", "J restaurant", and "K center" have a close distance to each other and are within the circle having 1-km diameter.

Figure 69:
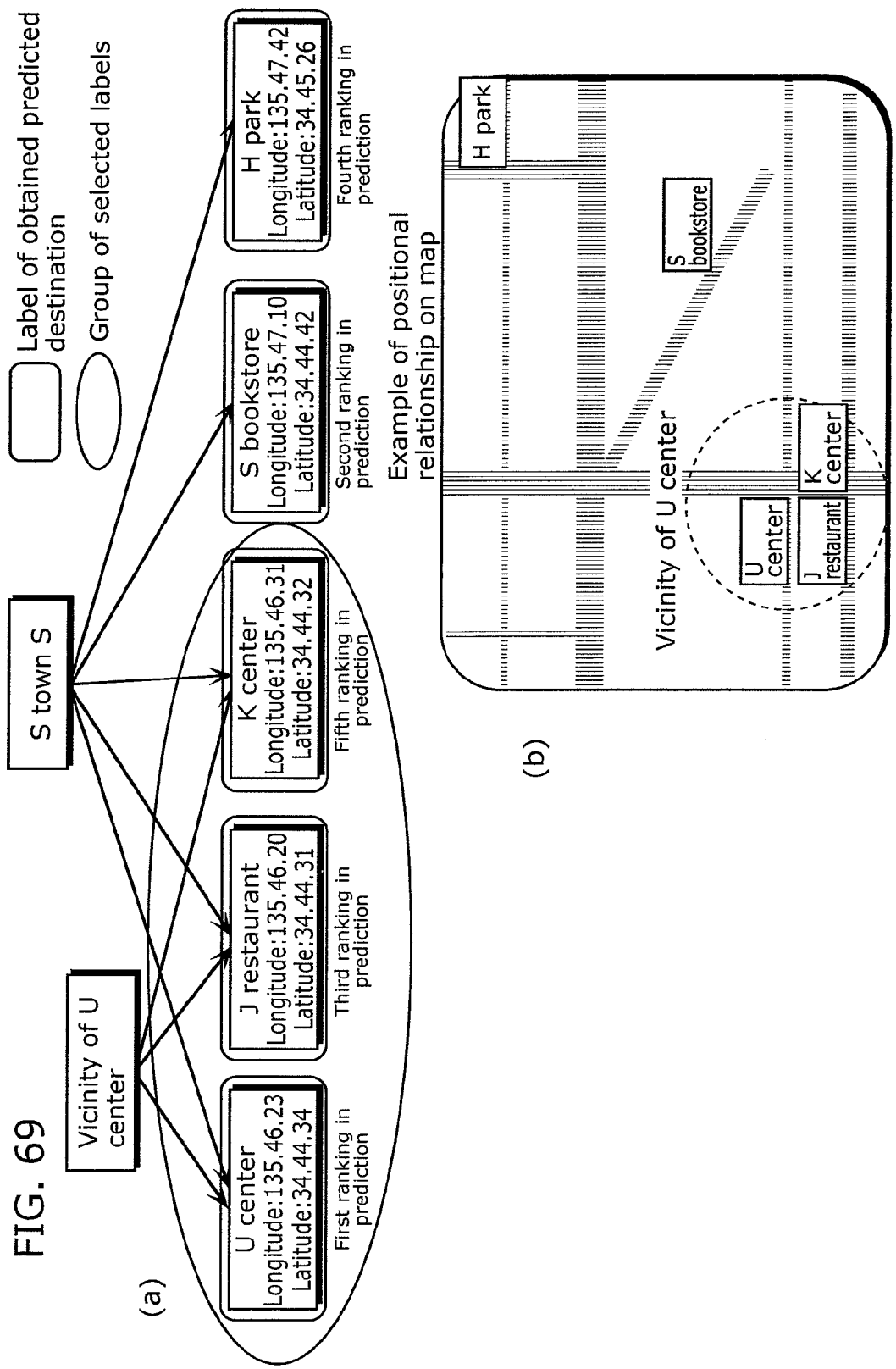
FIG. 69 is a diagram showing an example where a name determining unit generates a new label.

The name determining unit 2723 generates a parent label which has a parent-child relationship with one or more target labels selected by the target selecting unit 2722. A name of the parent label is generated by using a portion of a label name or an entire label name of a predicted destination having the highest ranking in prediction among the selected labels. For instance, as shown in FIG. 68(*a*), it is assumed that "U center" (first ranking in prediction), "3 restaurant" (third ranking in prediction), and "K center" (fifth ranking in prediction) have been selected as target labels. Here, as shown in FIG. 69(*a*), a parent label having a parent-child relationship with "U center", "J restaurant", and "K center" is generated. A name of the parent label is "U center", the label name of the label having the highest ranking in prediction among the target labels, plus "Vicinity". In other words, it is "Vicinity of U center". It is to be noted that FIG. 69(*b*) shows a position relationship between the predicted destinations on a map, and an area including "U center", "J restaurant", and "K center" is "Vicinity of U center".

The label selecting unit 2706 selects, from a hierarchical structure which is obtained by adding a label and a parent-child relationship generated by the label generating unit 2721 to a label hierarchical structure accumulated by the label accumulating unit 104, one or more labels in number equal to or below the number to be displayed obtained by the number-to-be-displayed obtaining unit 105, using the predicted destinations obtained by the destination obtaining unit 1303. The labels are selected so that the selected one or more labels or descendants of the one or more labels include all of the predicted destinations in the hierarchical structure. In addition, label selection is performed, starting from a lower-rank label having a high degree of detail, as much as possible. The label selecting unit 106 includes the destination selecting unit 107, a first label selecting unit 2708, and the second label selecting unit 109.

Figure 70:
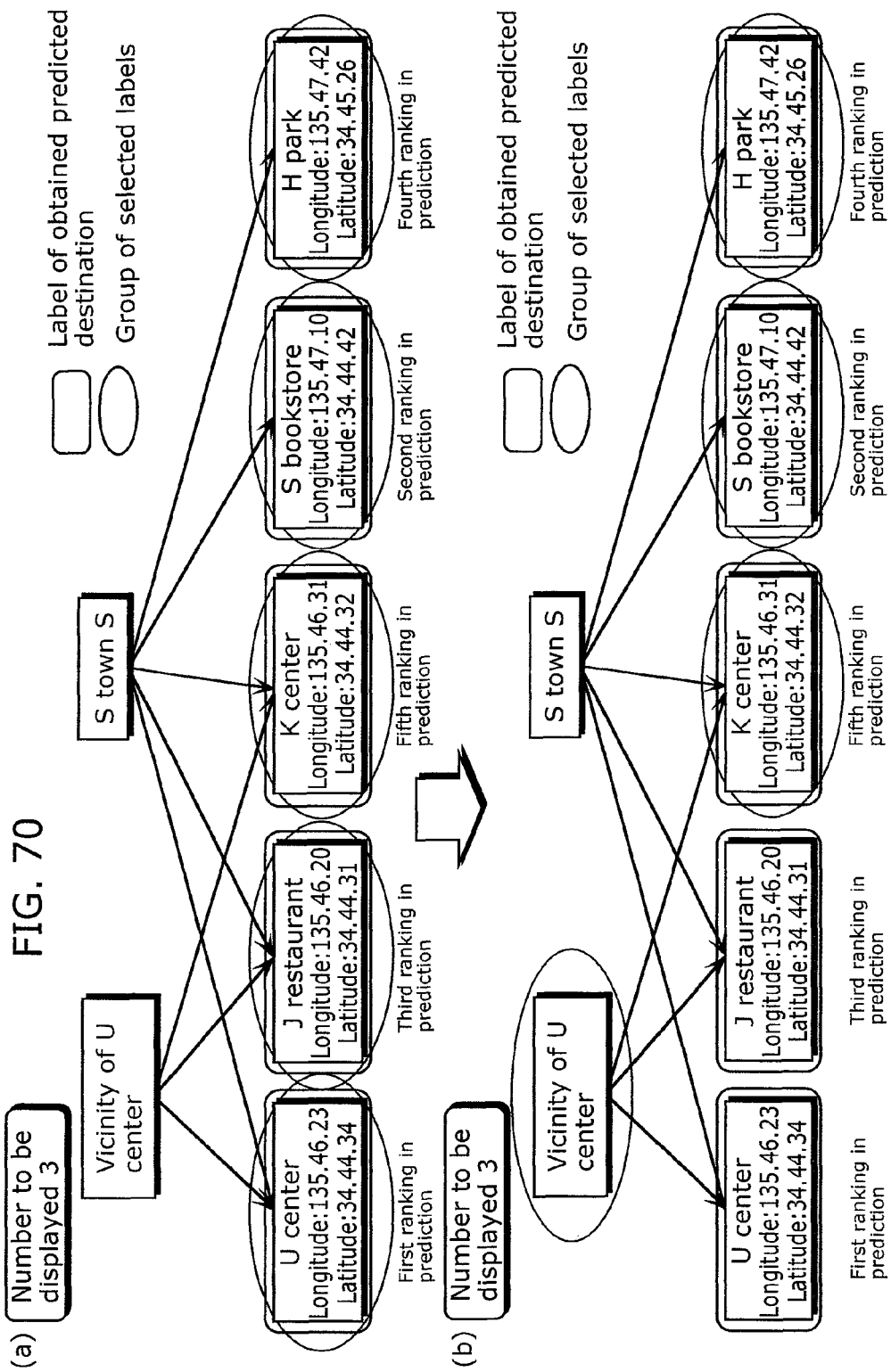
FIG. 70 is a diagram showing an example where the first label selecting unit lowers a degree of detail for each selected label.

The first label selecting unit 2708 lowers, for labels selected by the destination selecting unit 107, a degree of detail so that the number of the selected one or more labels becomes equal to or below the number to be displayed. More specifically, the first label selecting unit 2708 repeatedly selects, in a hierarchical structure which is obtained by adding a label and a parent-child relationship generated by the label generating unit 2721 to a label hierarchical structure accumulated by the label accumulating unit 104, a parent label of the selected one or more labels until the number of the selected one or more labels becomes equal to or below the number to be displayed. However, unlike the first embodiment, there is a case where one label has parents. When the one label has the parents, a label having a high degree of detail is preferentially selected. Stated differently, a label newly generated by the label generating unit 2721 is preferentially selected. When the number of the selected one or more labels does not becomes equal to or below the number to be displayed even though the newly generated label is selected, another parent is selected. For instance, as shown in FIG. 70(*a*), it is assumed that there is a hierarchical structure to which a new label is added and that the destination selecting unit 107 has selected five labels, "U center", "J restaurant", "K center", "S bookstore", and "H park". Assuming that a number to be displayed obtained by the number-to-be-displayed obtaining unit 105 is 3, a parent label of the selected labels is selected because the number of the selected labels 5 exceeds the number to be displayed 3. Here, labels having a parent that is the label newly generated by the label generating unit 2721 are preferentially selected. In the case of FIG. 70(*a*), a degree of detail is preferentially lowered for "U center", "J restaurant", and "K center" because these labels have the newly generated parent label. To put it differently, as shown in FIG. 70(*b*), three labels, "S bookstore", "H park", and "Vicinity of U center", the parent common to "U center", "3 restaurant", and "K center", are selected. In the case of this example, repeatedly selecting the parent label is terminated because the number of the selected labels is equal to or below the number to be displayed 3. Even so, when the number of the selected labels exceeds the number to be displayed, "S town S", another parent of "U center", "J restaurant", and "K center", is selected.

Figure 71:
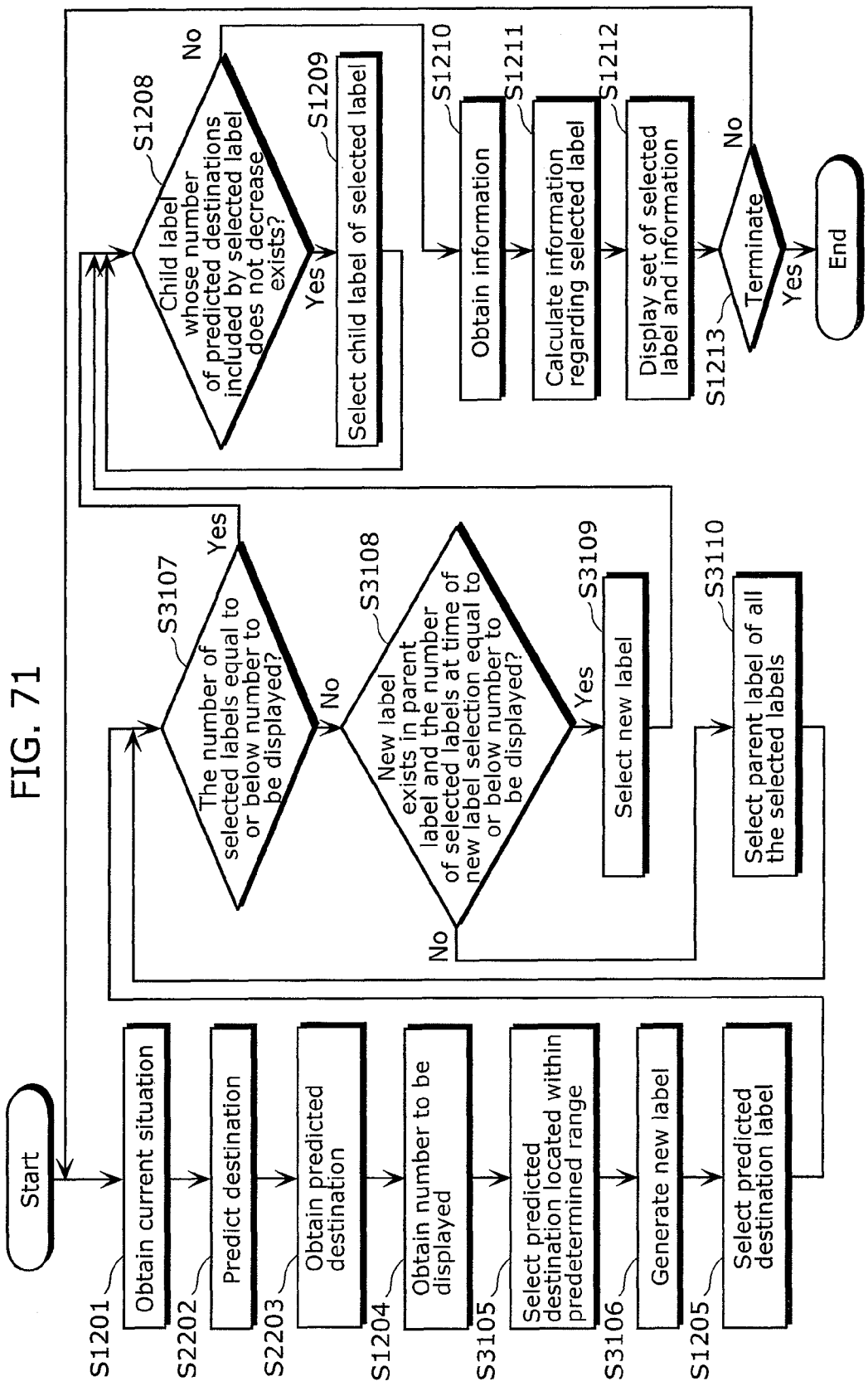
FIG. 71 is a flow chart showing an example of operations of the destination display apparatus according to the third embodiment of the present invention.

Hereinafter, operations of the destination display apparatus according to the third embodiment will be described with reference to the flow chart of FIG. 71. The flow described in the first and second embodiments is not described in detail again.

The situation obtaining unit 100 obtains a current situation of a mobile terminal (Step S1201). The destination predicting unit 1302 predicts destinations based on the current situation obtained by the situation obtaining unit 100 and histories accumulated by the history accumulating unit 101, and outputs positions, name labels, and rankings in prediction of the destinations (Step S2202). The destination obtaining unit 1303 obtains the destinations predicted by the destination predicting unit 1302. More specifically, the destination obtaining unit 1303 obtains the positions, the name labels, and the rankings in prediction of the predicted destinations (Step S2203). The number-to-be-displayed obtaining unit 105 obtains the number of destination name labels that the display unit 113 displays on a screen of a mobile terminal (Step S1204). The target selecting unit 2722 selects, in the hierarchical structure accumulated by the label accumulating unit 104, labels having positions within a predetermined range, from among the predicted destinations obtained by the destination obtaining unit 1303 (Step S3105). The name determining unit 2723 generates a parent label having a parent-child relationship with the target labels selected by the target selecting unit 2722 by using a portion of a label name or an entire label name of a label having the highest ranking in prediction among the target labels (Step S3106). The destination selecting unit 107 selects, in the hierarchical structure accumulated by the label accumulating unit 104, all of the destinations obtained by the destination obtaining unit 103 (Step S1205). The first label selecting unit 2708 determines whether the number of the selected labels is equal to or below the number to be displayed obtained by the number-to-be-displayed obtaining unit (Step S3107). When the number of the selected labels is equal to or below the number to be displayed, the flow advances to Step S1208 (Yes in Step S3107). When the number of the selected labels exceeds the number to be displayed, the flow advances to Step S3108 (No in Step S3107). When the number of the selected labels exceeds the number to be displayed, the first label selecting unit 2708 determines whether a label having as a parent label a label newly generated by the name determining unit 2723 exists among the selected labels, and determines whether or not the number of selected labels becomes equal to or below the number to be displayed in the case of selecting the new label instead of the selected labels (Step S3108). When the label having the new label as the parent label exists and the number of the selected labels is equal to or below the number to be displayed, the flow advances to Step S3109 (Yes in Step S3108). When the label having the new label as the parent does not exist or the number of the selected labels exceeds the number to be displayed, the flow advances to Step S3110 (No in Step S3108). When the label having the new label as the parent label exists and the number of the selected labels is equal to or below the number to be displayed, the first label selecting unit 2708 selects, instead of the selected labels having the new label as the parent, the parent label of the selected labels (Step S3109), and the flow advances to Step S1208. When the label having the new label as the parent does not exist or the number of the selected labels exceeds the number to be displayed, the first label selecting unit 2708 selects one or more parent labels of all of the selected labels (Step S3110), and the flow returns to Step S3107. Steps following the above are the same as the first embodiment.

Figure 72:
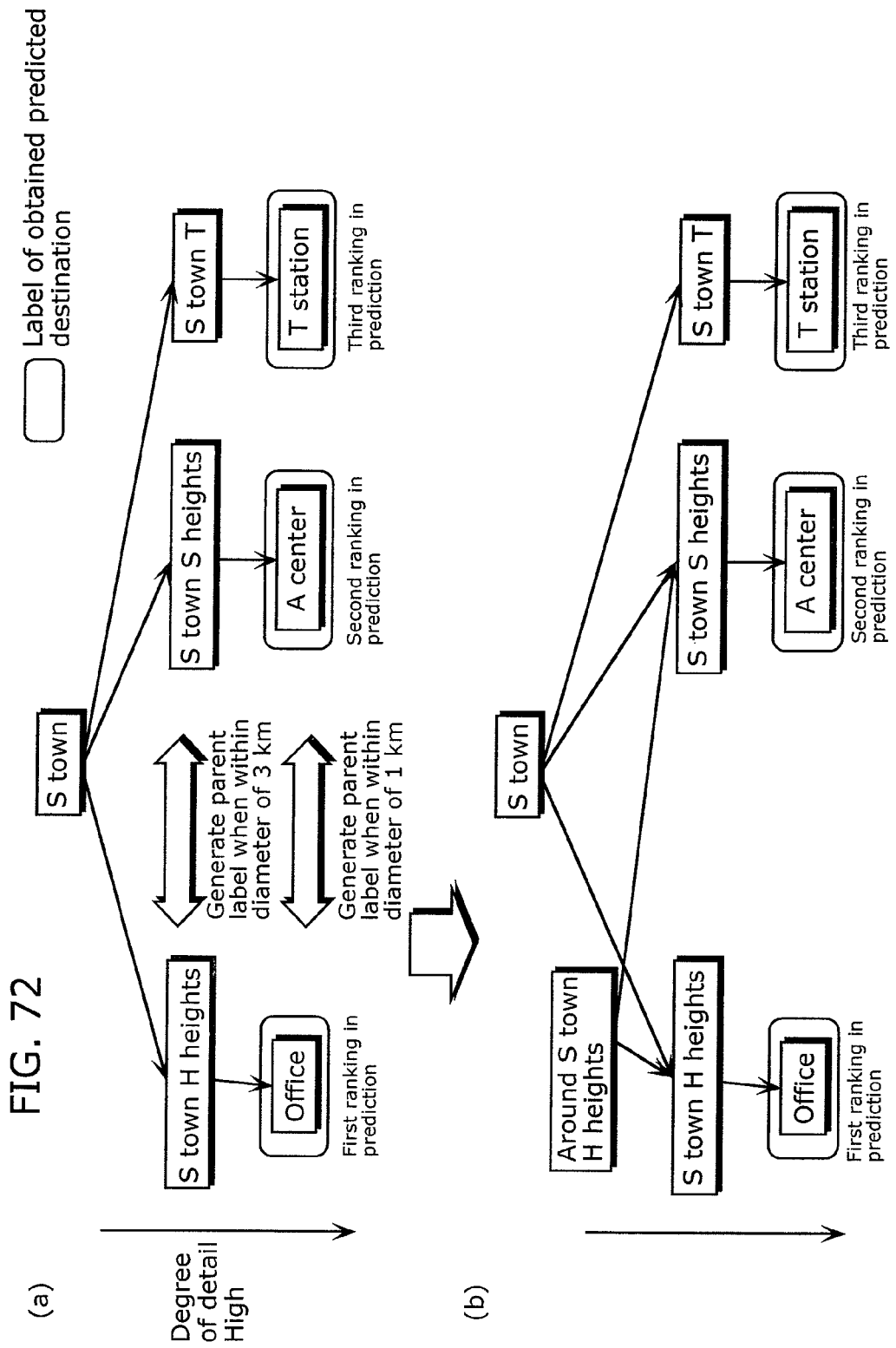
FIG. 72 is a diagram showing a label generating unit changes threshold values depending on a degree of detail held by each of labels.
Figure 73:
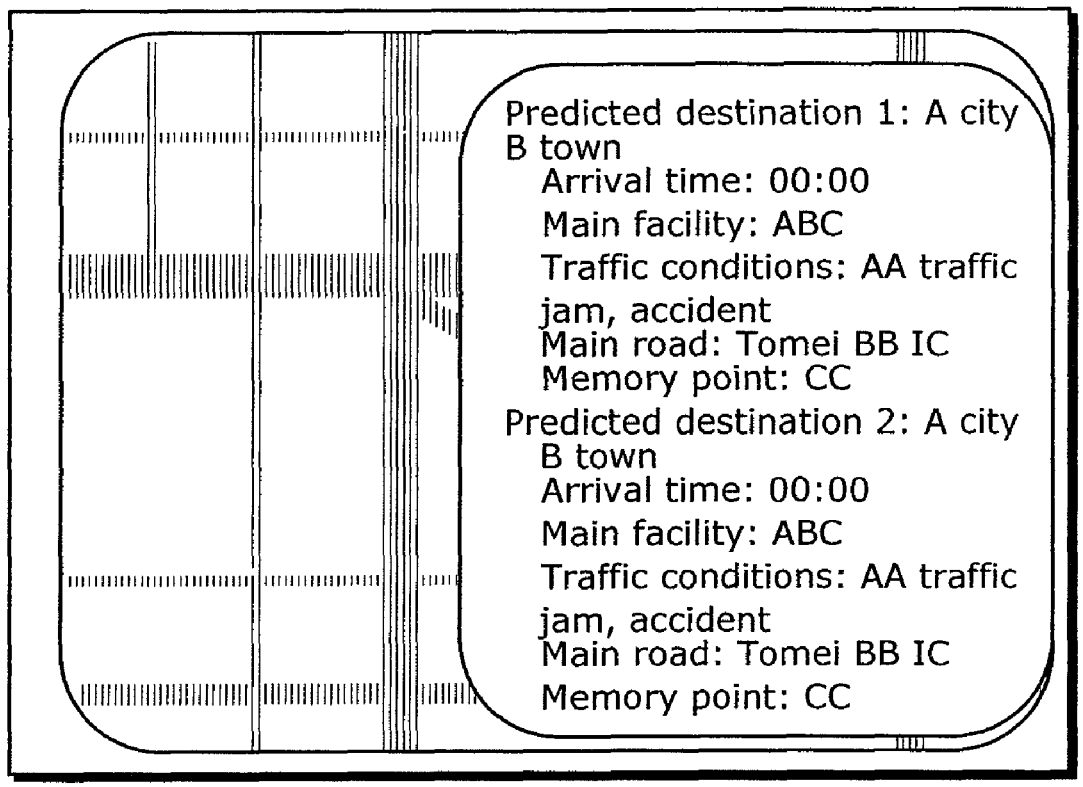
FIG. 73 is a diagram showing a destination display example of Patent Reference 1.
Figure 74:
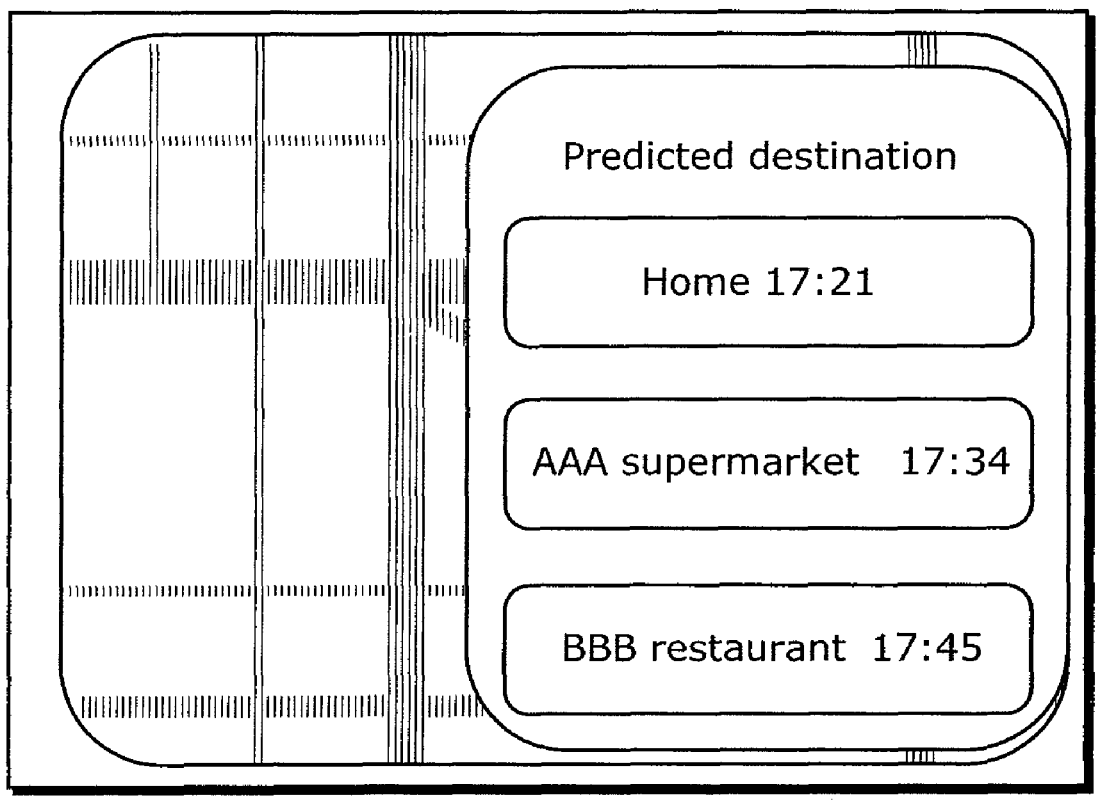
FIG. 74 is a diagram showing a conventional destination display example.
Figure 75:
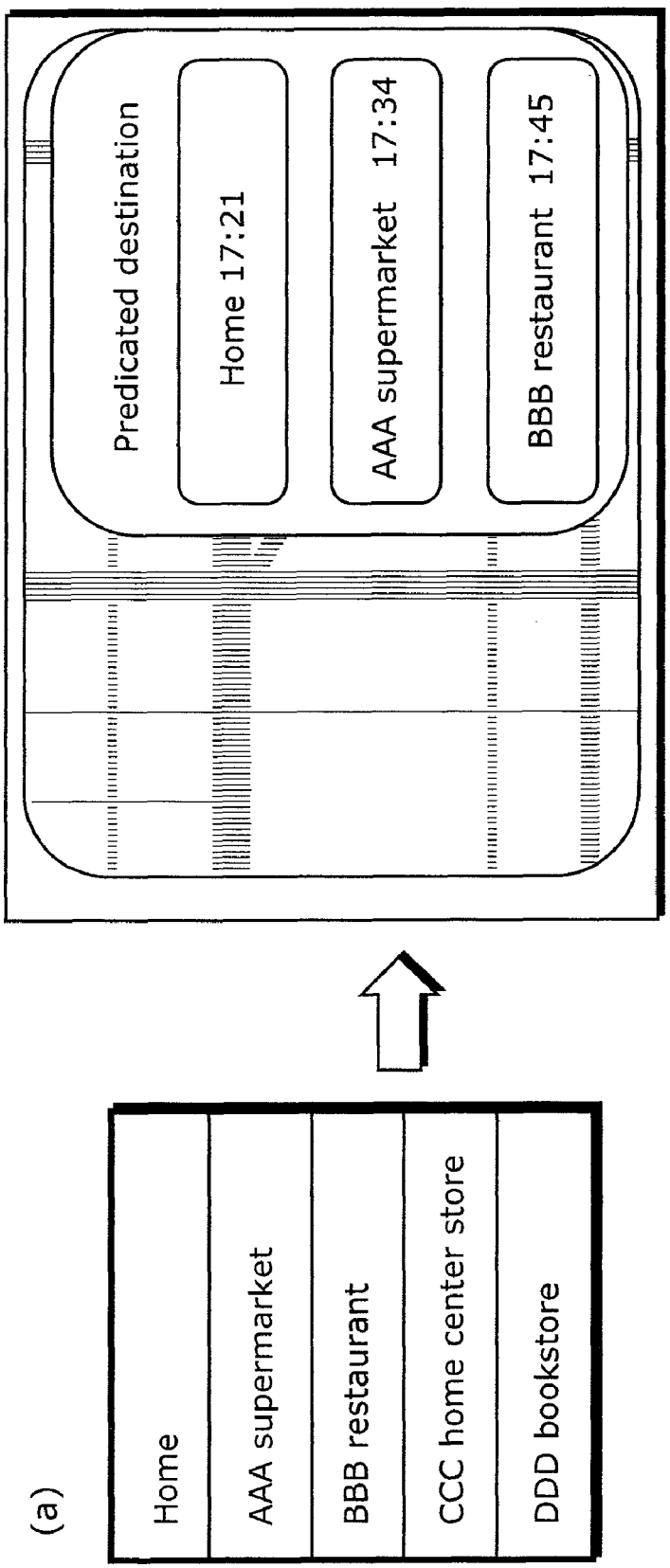
FIG. 75 is a diagram showing an example where destinations which the user is highly likely to head for are not displayed on the conventional destination display.
Figure 76:
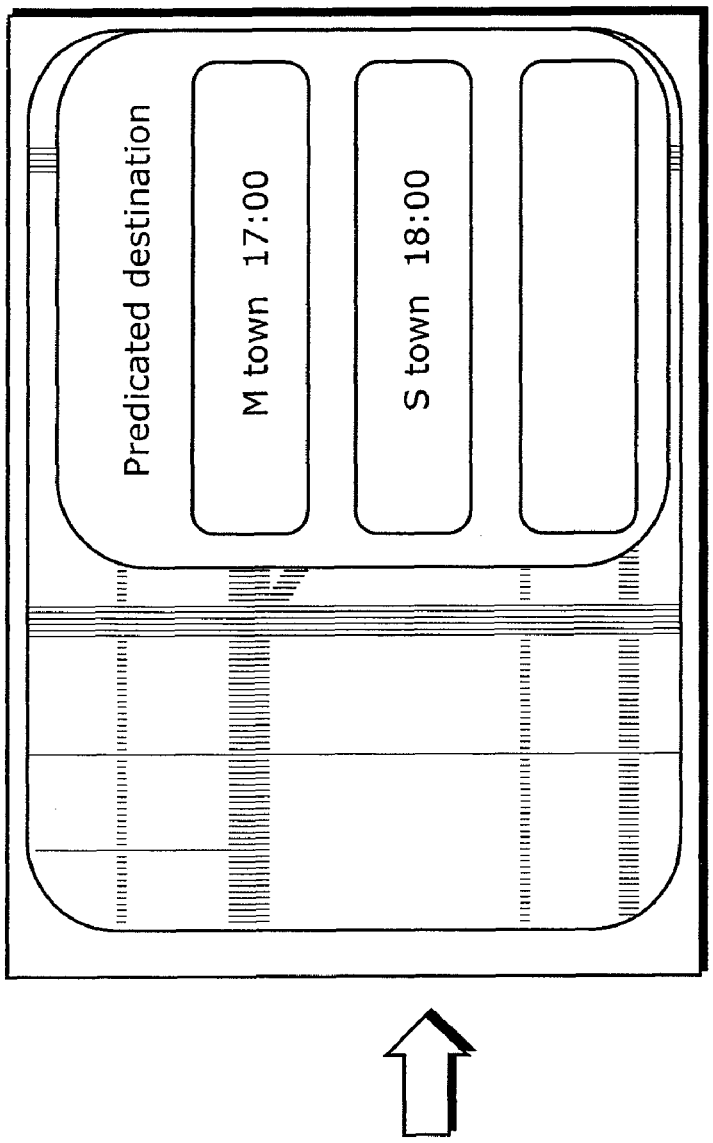
FIG. 76 is a diagram showing a destination display example based on municipality labels having a low degree of detail.

It is to be noted that the parent label is newly generated only for the labels corresponding to the predicted destinations obtained by the destination obtaining unit 1303 in the third embodiment. In other words, a parent label is generated for the lowest-layer label having the highest degree of detail. When the number to be displayed is small or the like, labels cannot be often combined in number equal to or below the number to be displayed because the parent label of the lowest-layer label has a too high degree of detail. Accordingly, a parent label may be generated by combining labels having a distance close to each other for a label other than the lowest-layer label. Here, the lower a degree of detail of a higher-rank label is, the greater a threshold value indicating a distance range, which is selected by the target selecting unit, is set for the higher-rank label. For example, as shown in FIG. 72(*a*), it is assumed that the label accumulating unit 104 has accumulated a hierarchical structure, and that "Office" (first ranking in prediction), "A center" (second ranking in prediction), and "T station" (third ranking in prediction) have been obtained as predicted destinations. Here, when the lowest-layer labels are within a circle having 1-km diameter, a parent label is generated by combining the lowest-layer labels. When parent labels of the lowest-layer labels, that is, second-layer labels are within a circle having 3-km diameter, a parent label is generated by combining the second-layer labels. It is assumed that a distance between "Office" and "A center" is in a range of 1 to 3 km. Here, the predicted destination "Office", a descendant of a label "S town H heights", and the predicted destination "A center", a descendant of a label "S town S heights", can be combined because "Office" and "A center" are within the circle having 3-km diameter. Thus, as shown in FIG. 72(b), a parent label having a parent-child relationship with "S town S heights" and "S town H heights" is generated. A name of the parent label is determined by using a name of a label having as a descendant a predicted destination having the highest ranking in prediction. Between "S town S heights" and "S town H heights", a label including as a descendant "Office" having the highest ranking in prediction is "S town H heights". Thus, a label name is determined as "Around S town H heights" according to the name of the label, plus around.

Although the embodiments and the modifications have been described above, the destination display apparatus according to the present invention is not limited to the embodiments and the modifications. The destination display apparatus according to the present invention may be an apparatus structured by combining each of functions included by the destination display apparatuses described in the above embodiments and the modifications, in so far as there is no inconsistency in the structure.

For instance, although the first embodiment has described the structure in which the label obtaining unit substitutes for the label accumulating unit as shown in FIG. 38, the label obtaining unit may substitute for the label accumulating unit in the other embodiments and the modifications.

INDUSTRIAL APPLICABILITY

As described above, the destination display apparatus according to the present invention is applicable to, for example, car navigation devices and devices which provide information regarding destinations of mobile terminals such as mobile phones including a GPS and a map.

The invention claimed is:

1. A destination display apparatus which displays a name of a destination of a mobile terminal and information regarding the destination, said destination display apparatus comprising:
  a destination obtaining unit configured to obtain a plurality of destinations of the mobile terminal;
  a label obtaining unit configured to obtain labels indicating display names of the plurality of destinations as a hierarchical structure based on degrees of detail of display patterns each regarding a position;
  a number-to-be-displayed determining unit configured to determine the number of the labels to be displayed on a display screen;
  a position obtaining unit configured to obtain a current position of the mobile terminal;
  a map accumulating unit configured to accumulate map information;
  a route calculating unit configured to calculate traffic jam information regarding each of routes from the current position to a corresponding one of the plurality of destinations, using the map information;
  an availability determining unit configured to determine that the labels obtained as the hierarchical structure by said label obtaining unit are unavailable when pieces of traffic jam information are not similar to each other, the pieces of traffic jam information each regarding the route to the corresponding one of the plurality of destinations, and the plurality of destinations being included in descendant labels of the labels, which are located at a low rank in the hierarchical structure of the labels,
  a label selecting unit configured to select, from the labels including the plurality of the destinations obtained by said destination obtaining unit, one or more labels using the hierarchical structure obtained by said label obtaining unit so that the number of labels becomes equal to or below the number of the labels to be displayed, the number of the labels to be displayed being obtained by said number-to-be-displayed determining unit;
  an information obtaining unit configured to obtain information regarding each of the plurality of destinations;
  an information calculating unit configured to calculate, from the information obtained by said information obtaining unit, traffic jam information regarding each route to the corresponding one of the plurality of destinations; and
  a display unit configured to display the information regarding each of the plurality of destinations, together with the one or more labels selected by said label selecting unit, the information being obtained by said information obtaining unit,
  wherein said label selecting unit is configured to select one or more labels other than the labels determined as unavailable by said availability determining unit,
  said availability determining unit is configured to determine the one or more labels as unavailable when the pieces of traffic jam information each regarding the route to the corresponding one of the plurality of destinations included in the descendant labels of the one or more labels do not match, and
  said display unit is configured to display the traffic jam information, together with the one or more labels selected by said label selecting unit.

* * * * *